United States Patent
Lee et al.

(10) Patent No.: US 11,336,343 B2
(45) Date of Patent: May 17, 2022

(54) METHOD AND DEVICE FOR PERFORMING COMMUNICATION USING ORTHOGONAL OR NONORTHOGONAL CODE MULTIPLE ACCESS SCHEME IN WIRELESS COMMUNICATION SYSTEM

(71) Applicant: LG ELECTRONICS INC., Seoul (KR)

(72) Inventors: Hojae Lee, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 16/622,857

(22) PCT Filed: Jun. 7, 2018

(86) PCT No.: PCT/KR2018/006440
§ 371 (c)(1),
(2) Date: Dec. 13, 2019

(87) PCT Pub. No.: WO2018/230878
PCT Pub. Date: Dec. 20, 2018

(65) Prior Publication Data
US 2020/0212973 A1    Jul. 2, 2020

Related U.S. Application Data

(60) Provisional application No. 62/519,140, filed on Jun. 13, 2017.

(51) Int. Cl.
*H04B 7/0456* (2017.01)
*H04L 5/00* (2006.01)
*H04L 27/26* (2006.01)

(52) U.S. Cl.
CPC ......... *H04B 7/0478* (2013.01); *H04L 5/0005* (2013.01); *H04L 27/2614* (2013.01); *H04L 27/2636* (2013.01)

(58) Field of Classification Search
None
See application file for complete search history.

(56) References Cited

U.S. PATENT DOCUMENTS

| 2016/0021652 A1 | 1/2016 | Han et al. |
| 2019/0132099 A1* | 5/2019 | Wu .................. H04L 5/0048 |

(Continued)

FOREIGN PATENT DOCUMENTS

| KR | 1020160091286 | 8/2016 |
| KR | 101719969 | 3/2017 |

(Continued)

*Primary Examiner* — Adnan Baig
(74) *Attorney, Agent, or Firm* — Lee Hong Degerman Kang Waimey

(57) ABSTRACT

Provided are a method and a device for transmitting uplink data by using a non-orthogonal code multiple access scheme in a wireless communication system. Specifically, a terminal receives information on a terminal-specific codebook from a base station. The terminal-specific codebook is included in a codebook for a predefined multi-dimensional modulation. The terminal performs multi-dimensional modulation-based encoding on an information bit on the basis of the terminal-specific codebook so as to generate a complex vector. The terminal performs DFT on the complex vector on the basis of the terminal-specific codebook so as to generate a frequency signal. The terminal transmits uplink data generated by performing IFFT on the frequency signal.

5 Claims, 49 Drawing Sheets

(56) References Cited

U.S. PATENT DOCUMENTS

2019/0222371 A1\* 7/2019 Sahin ................. H04L 27/3416
2019/0334676 A1\* 10/2019 Liu ....................... H04L 5/0094

FOREIGN PATENT DOCUMENTS

| KR | 1020170041896 | 4/2017 |
| WO | 2017026700 | 2/2017 |

\* cited by examiner

METHOD AND DEVICE FOR PERFORMING COMMUNICATION USING ORTHOGONAL OR NONORTHOGONAL CODE MULTIPLE ACCESS SCHEME IN WIRELESS COMMUNICATION SYSTEM

CROSS-REFERENCE TO RELATED APPLICATIONS

This application is the National Stage filing under 35 U.S.C. 371 of International Application No. PCT/KR2018/006440, filed on Jun. 7, 2018, which claims the benefit of U.S. Provisional Application No. 62/519,140, filed on Jun. 13, 2017, the contents of which are all hereby incorporated by reference herein in their entirety.

BACKGROUND

Field

The present specification relates to wireless communication, and more particularly, to a method of performing communication by using an orthogonal or non-orthogonal coded multiple access scheme, and a device using the method.

Related Art

A wireless communication system is widely deployed to provide various types of communication services, such as voice and data. An object of a wireless communication system is to enable a plurality of UEs to perform reliable communication regardless of their locations and mobility.

In general, a wireless communication system is a multiple access system capable of supporting communication with a plurality of UEs by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A requirement of a next-generation wireless communication system is to accommodate significantly explosive data traffic, to increase a dramatic increase in a transfer rate per user, to accommodate the significantly increased number of connected devices, and to support a very low end-to-end (E2E) latency and high energy efficiency. For this, there is ongoing research on various techniques such as dual connectivity, massive multiple input multiple output (MIMO), in-band full duplex, non-orthogonal multiple access (NOMA), super wideband support, device networking, or the like.

SUMMARY

Technical Objects

The present specification provides a method and apparatus for performing communication by using an orthogonal or non-orthogonal coded multiple access scheme in a wireless communication system.

Technical Solutions

The present specification proposes a method and apparatus for performing communication based on a non-orthogonal coded multiple access scheme in a wireless communication system.

The apparatus (or device) includes a transceiver transmitting and receiving radio signals and a processor being operatively connected to the transceiver.

More specifically, a wireless communication system environment using a Non-orthogonal Multiple Access (NoMA) scheme considering multi-dimensional modulation is assumed in the present embodiment. More specifically, proposed herein is a Non-orthogonal Multiple Access (NoMA) scheme as a method for performing superposed transmission of signals for multi-users to the same time-frequency resource. The Non-orthogonal Multiple Access (NoMA) scheme considering multi-dimensional modulation may correspond to a NoMA scheme spreading bitstreams being encoded based on a modulation scheme and a non-orthogonal codebook to complex symbol vectors.

A UE receives information on a UE specific codebook from a base station. The UE specific codebook is included in a codebook for pre-defined Multi-dimensional Modulation. The codebook for pre-defined Multi-dimensional Modulation may be pre-arranged in advance between the UE and the base station, or may be received via RRC signaling (a case where the UE is in a step of performing initial access to the base station, or in a RRC step). Alternatively, the codebook for Multi-dimensional Modulation may be received together with a UE specific codebook index via control signaling.

The UE performs Multi-dimensional Modulation based encoding on information bits based on the UE specific Codebook so as to generate a complex vector. The UE may generate a transmission signal by using a Multi-dimensional Modulation based encoder. As a time domain signal, the transmission signal may be configured of a complex modulation symbol and a zero symbol according to the UE specific Codebook. For example, the complex vector may be configured of four complex modulation symbols based on a coding bit having the information bits channel-coded therein.

The UE generates a frequency signal by performing Discrete Fourier Transform (DFT) based on the UE specific Codebook for the complex vector. More specifically, the UE may convert the previously generated transmission signal to a frequency domain signal by performing DFT.

The UE transmits uplink data, which is generated by performing Inverse Fast Fourier Transform (IFFT) on the frequency signal. The UE may perform IFFT once again on the frequency domain signal, so as to convert the frequency domain signal to a time domain signal, and may then transmit the converted time domain signal through a channel.

Effects

By using the propose method, PAPR performance for SC-FDMA of Legacy LTE may be enhanced or maintained. Accordingly, PAPR performance may be optimized for cell-edge UEs, in which PAPR performance is important.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present specification are not limited thereto.

Figure 1:
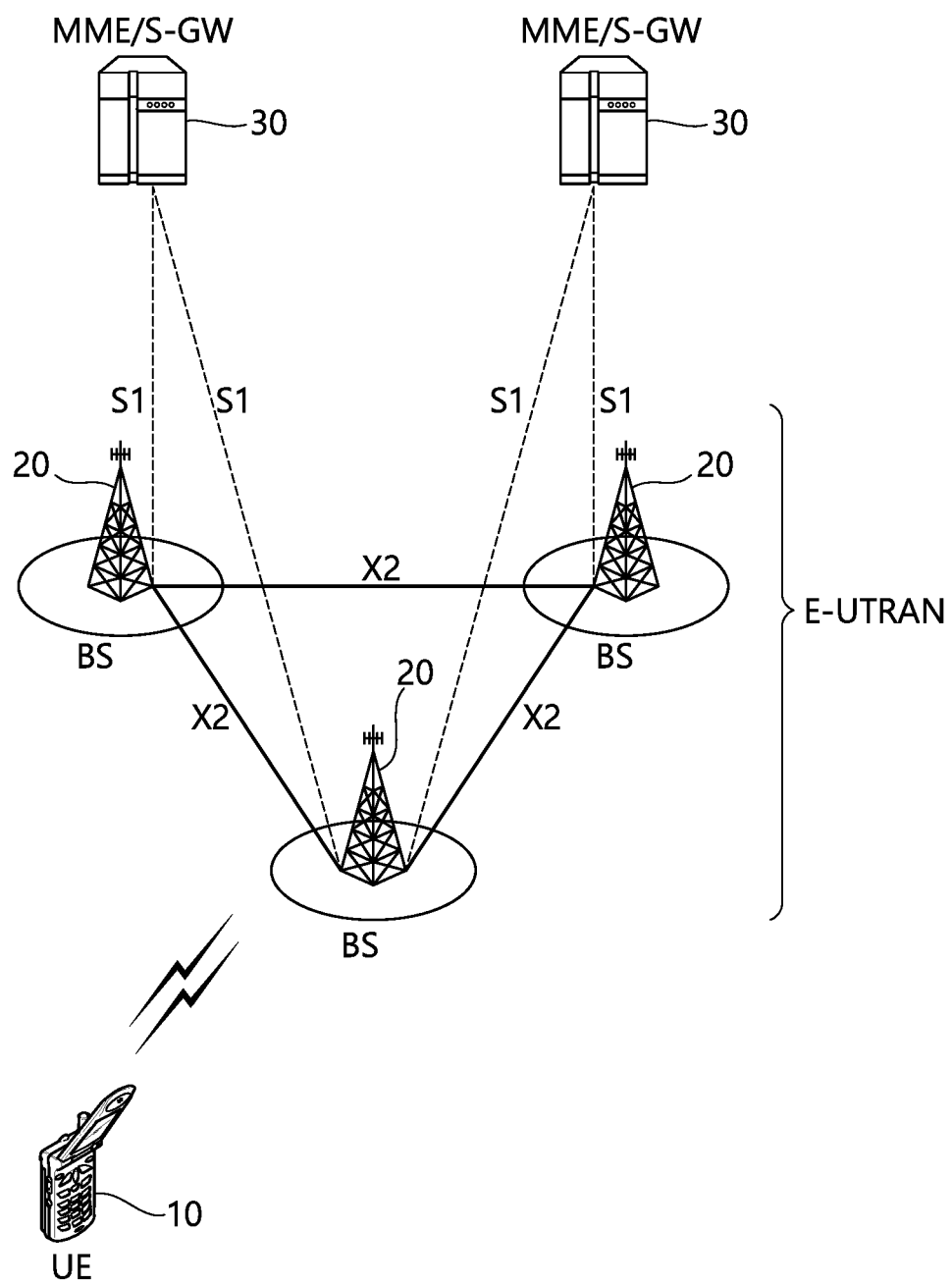
FIG. 1 shows a wireless communication system to which the present specification is applied.

FIG. 1 shows a wireless communication system to which the present specification is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, etc. The BS (20) is generally a fixed station that communicates with the UE (10) and may be referred to as another terminology, such as an evolved node-B (eNB), a base transceiver system (BTS), an access point, etc.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
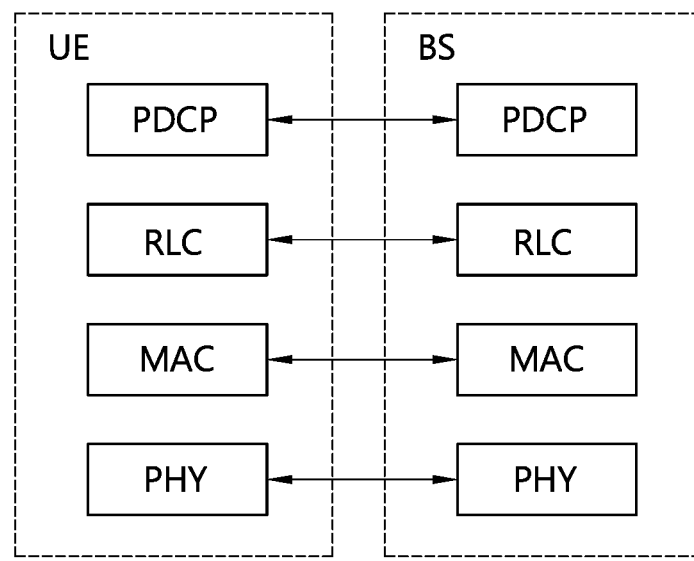
FIG. 2 is a diagram illustrating a radio protocol architecture for a user plane.
Figure 3:
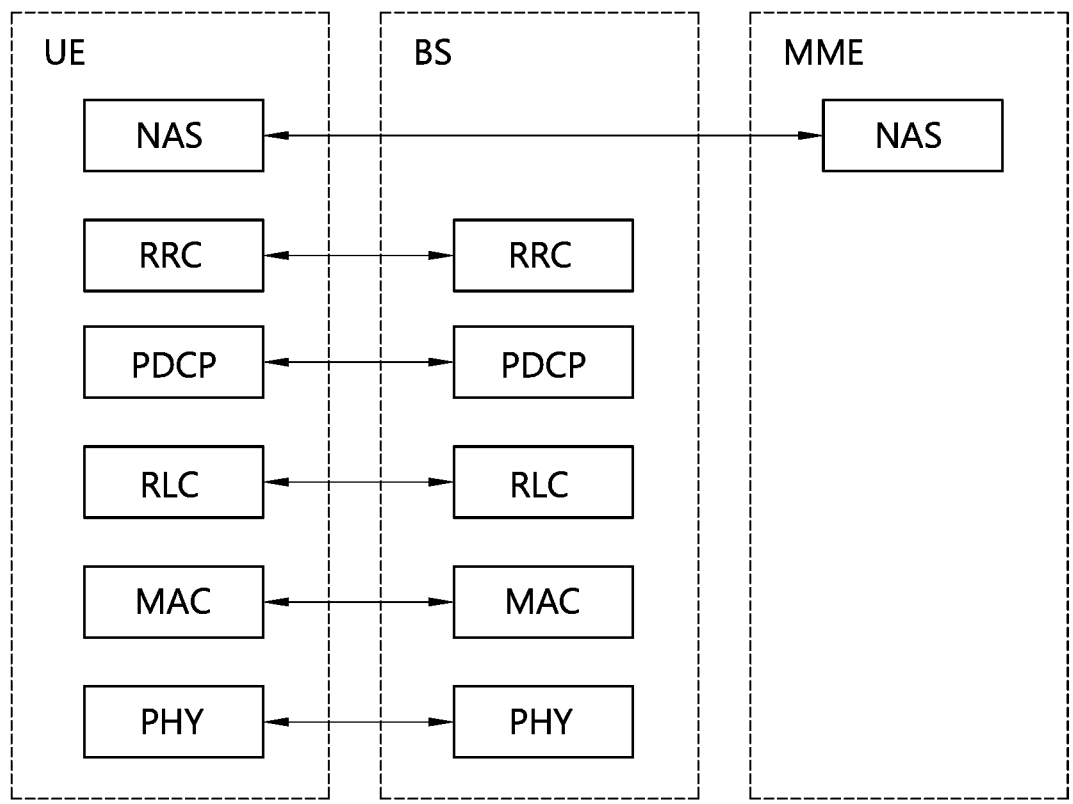
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
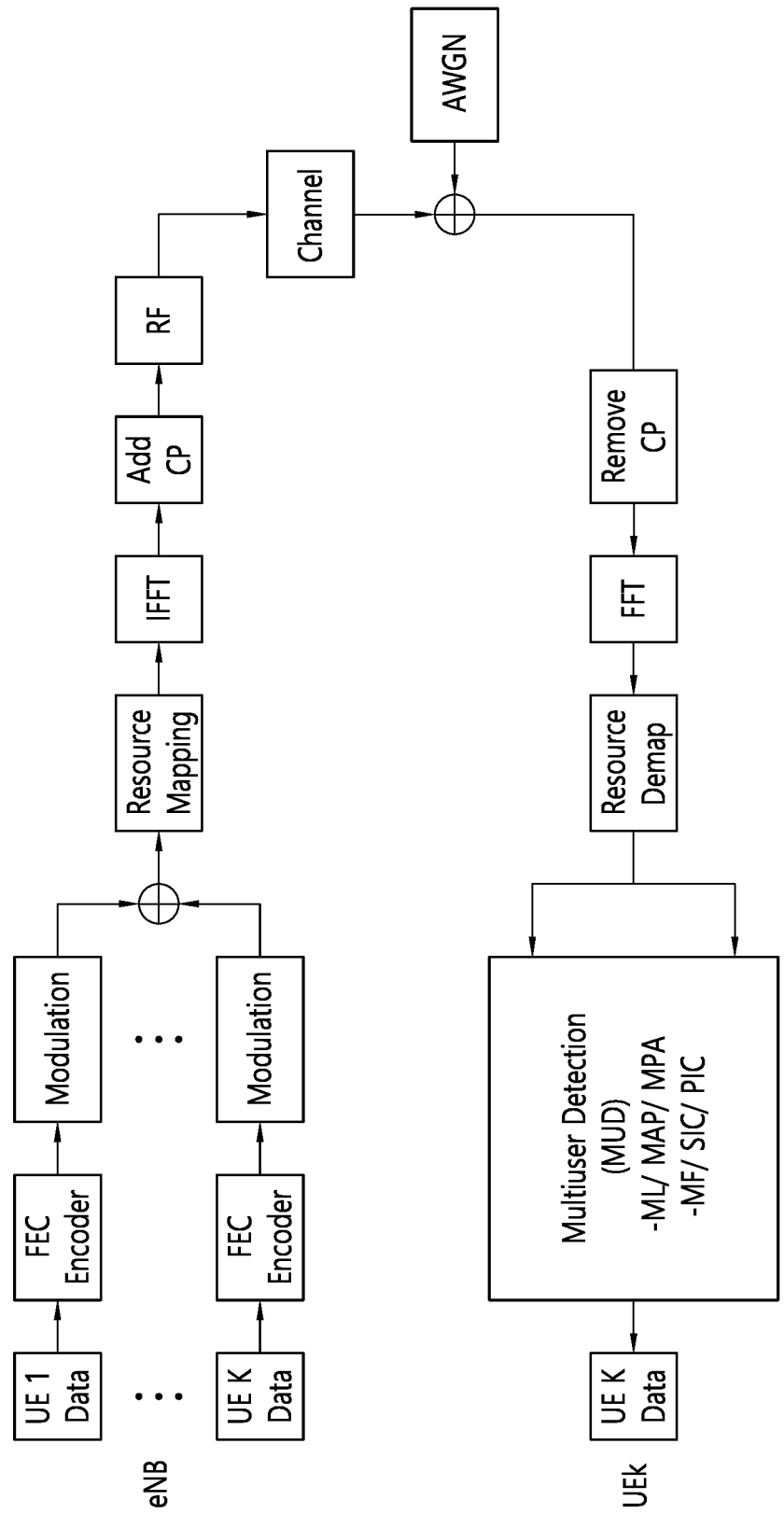
FIG. 4 is a block diagram illustrating NOMA based downlink transmission/reception (Tx/Rx) of a communication apparatus.

FIG. 4 is a block diagram illustrating NOMA based downlink transmission/reception (Tx/Rx) of a communication apparatus.

In a Non-orthogonal Coded Multiple Access (NCMA) scheme for transmitting multi-UE (or multi-user) information by allocating the multi-UE information to the same resource, a transmitter and receiver structure for downlink support as shown in FIG. 4 is general. The NOMA system may be referred to as Multiuser Superposition Transmission (MUST) in the 3GPP standardization task. The NOMA system is considered as the element technology of the next generation 5G system intended to obtain transmission capacity gain or increase the number of simultaneous accesses as compared with the LTE system by transmitting information for a plurality of UEs to the same time-frequency resource through superposition. Examples of the NOMA based technology of the next generation 5G system include MUST for identifying UEs based on a power level, Sparse Code Multiple Access (SCMA) that uses sparse complex codebook based modulation, and interleave division multiple access (IDMA) that uses a user-specific interleaver.

In case of the MUST system, the transmitter of FIG. 4 varies power allocation of each symbol after modulation of multi-UE data or transmits the multi-UE data by hierarchically modulating the multi-UE data based on hierarchical modulation, and the receiver demodulates the data of the multi-UE (hereinafter, referred to as multi-UE data) through multi-UE detection (or multiuser detection) (MUD).

In case of the SCMA system, the transmitter of FIG. 4 replaces a modulation procedure of a forward error correction (FEC) encoder and modulation procedure for multi-UE data with a sparse complex codebook modulation scheme which is previously scheduled, and the receiver demodulates the multi-UE data through MUD.

In case of the IDMA system, the transmitter of FIG. 4 modulates FEC encoding information for multi-UE data through a UE-specific interleaver, and the receiver demodulates the multi-UE data through MUD.

Each system may demodulate the multi-UE data in various MUD schemes. Examples of the various MUD schemes include Maximum Likelihood (ML), Maximum joint A posteriori Probability (MAP), Message Passing Algorithm (MPA), Matched Filtering (MF), Successive Interference Cancellation (SIC), Parallel Interference Cancellation (PIC), and Codeword Interference Cancellation (CWIC). There may be a difference in demodulation complexity and processing time delay based on each demodulation scheme or each demodulation attempt.

Figure 5:
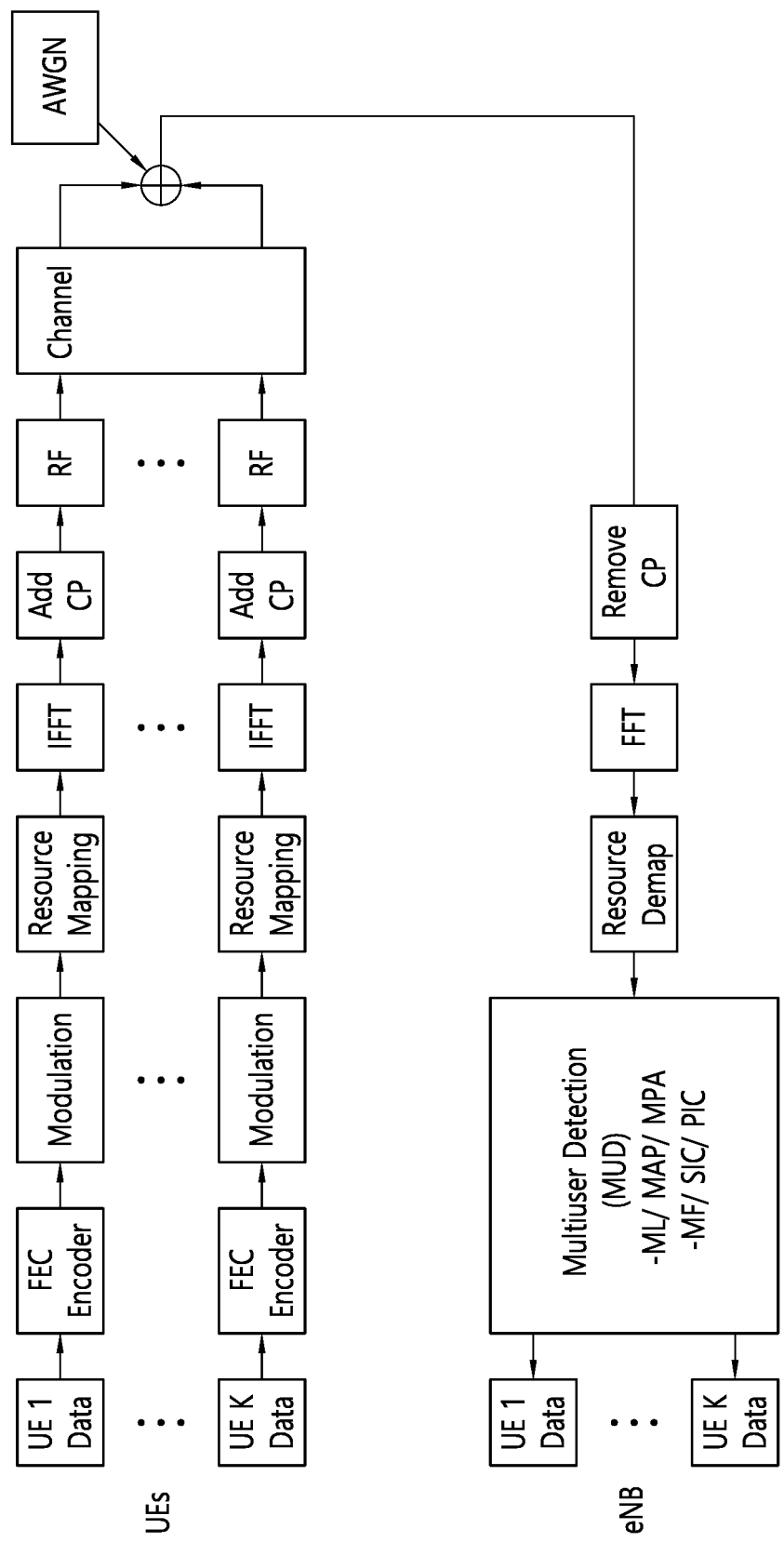
FIG. 5 is a block diagram illustrating NOMA based uplink transmission/reception (Tx/Rx) of a communication apparatus.

FIG. 5 is a block diagram illustrating NOMA based uplink transmission/reception (Tx/Rx) of a communication apparatus.

A transmitter and receiver structure for uplink support of the NOMA based system that transmits information of multi-UE (hereinafter, referred to as multi-UE information) by allocating the multi-UE information to the same resource is shown in FIG. 5. Each system may transmit multi-UE data in the same manner as the description of the downlink structure of FIG. 4 and modulate the multi-UE data through the receiver. Since the NOMA based systems transmit multi-UE signals to the same time-frequency resource through superposition, the systems have a higher decoding error rate as compared with the LTE system but may support higher frequency usage efficiency or more massive connectivity. The NOMA systems may achieve higher frequency usage efficiency or more massive connectivity while maintaining a decoding error through coding rate control based on a system environment.

Since the NOMA based systems allocate data of multi-UEs to the same resource, interference of multi-UE data is necessarily generated as compared with allocation of single-UE data. A signal of the kth receiver in the NOMA based system of FIG. 4 is simply expressed as illustrated in the following Equation 1.

$$y_k = \sum_{n=1}^{K} h_k s_n + n_k = h_k s_k + \sum_{n \neq k, n=1}^{K} h_k s_n + n_k \quad \text{[Equation 1]}$$

In this case, $h_k$ means a channel from the transmitter to the kth receiver, $s_k$ means a data symbol to the kth receiver, and $n_k$ means signal noise. K is the number of multiple UEs allocated to the same time-frequency resource.

The second term $$\sum_{n \neq k, n=1}^{K} h_k s_n$$

of the third formula of the Equation 1 indicates multiuser interference (MUI) signal according to a data symbol to another receiver. Therefore, transmission capacity according to the received signal is simply expressed as illustrated in the following Equation 2.

$$C = \sum_{k=1}^{K} R_k \quad \text{[Equation 2]}$$

$$R_k = \log_2\left(1 + \frac{|h_k s_k|^2}{\left|\sum_{n \neq k, n=1}^{K} h_k s_n\right|^2 + \sigma_k}\right) =$$

$$\log_2\left(1 + \frac{\text{Channel Gain}}{MUI + \text{Noise}}\right), \forall k$$

In transmission capacity of the above Equation 2, the number of Rk added based on increase of K may be increased, whereby increase of C may be expected. However, each Rk may be reduced due to increase of MUI based on increase of K, entire transmission capacity C may be reduced. Based on the MUD scheme, even though data of each UE may be demodulated while MUI is being effectively reduced, the presence of MUI reduces entire transmission capacity and requires MUD of high complexity. If MUI occurrence of data transmission of the multi-UE is minimized, higher transmission capacity may be expected. Alternatively, if MUI occurrence for data transmission of the multi-UE may be controlled quantitatively, higher transmission capacity may be planned by scheduling of data superposition of the multi-UE.

Figure 6:
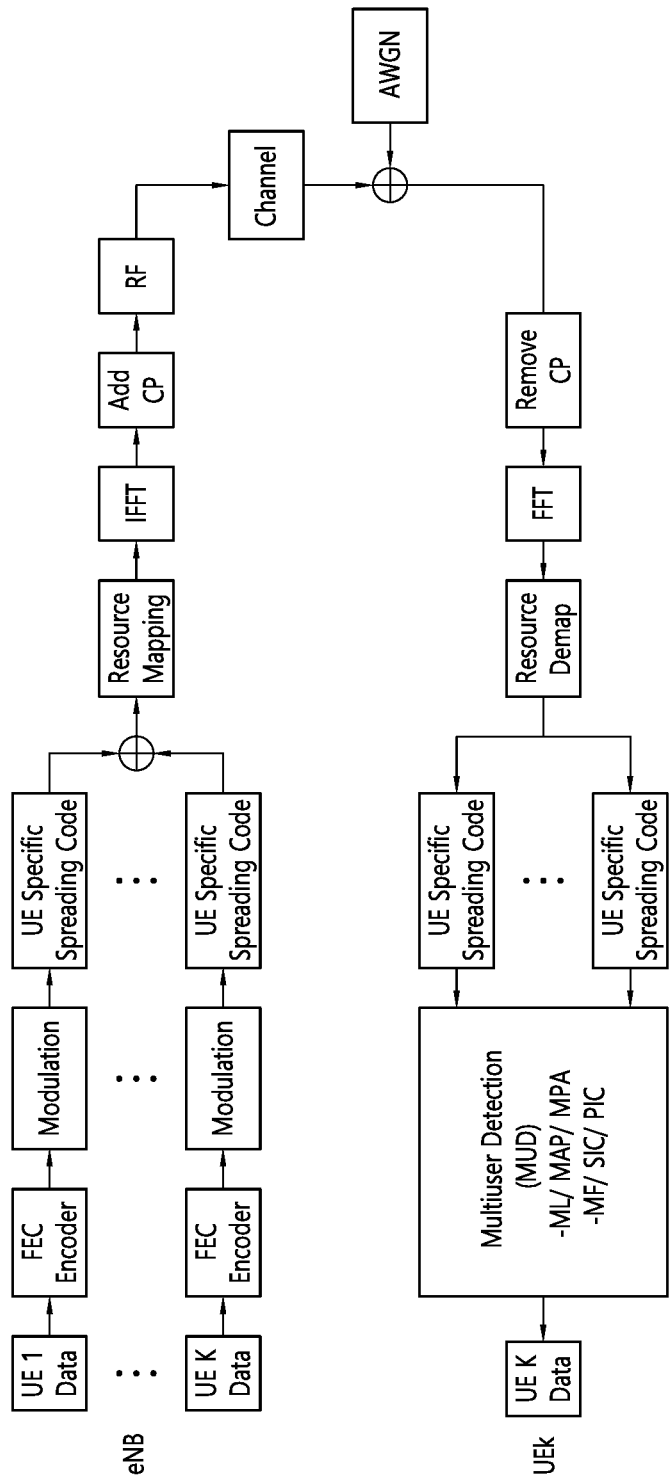
FIG. 6 shows an exemplary NOMA-based downlink transmission/reception (Tx/Rx) block diagram using a non-orthogonal spreading code of a communication device.
Figure 7:
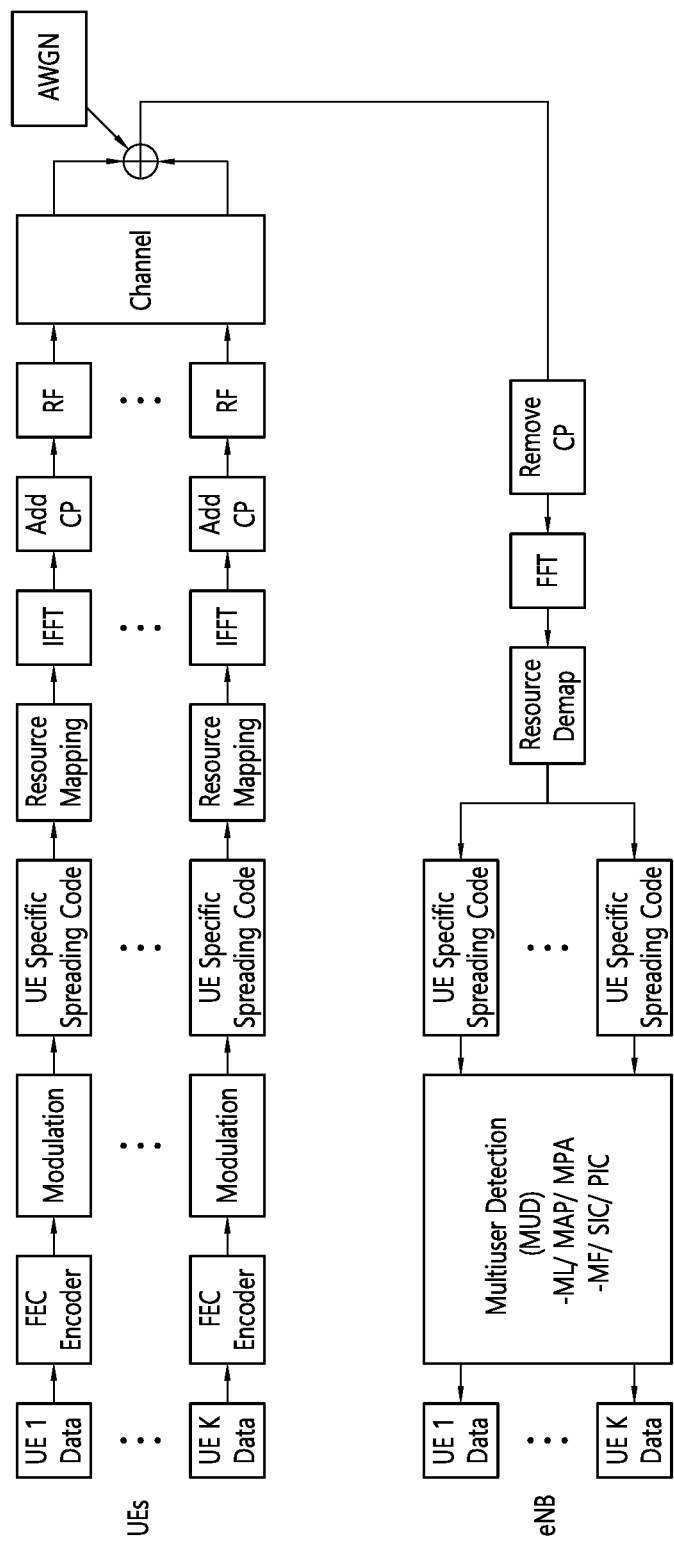
FIG. 7 shows an exemplary NOMA-based uplink transmission/reception (Tx/Rx) block diagram using a non-orthogonal spreading code of a communication device.

FIG. 6 shows an exemplary NOMA-based downlink transmission/reception (Tx/Rx) block diagram using a non-orthogonal spreading code of a communication device. And, FIG. 7 shows an exemplary NOMA-based uplink transmission/reception (Tx/Rx) block diagram using a non-orthogonal spreading code of a communication device.

When multi-user data is transmitted via overlay transmission to the same time-frequency resource by using a spreading method, among the NOMA technique, it is assumed that technique types (e.g., SCMA, CDMA, and so on) that are based on a Non-orthogonal Codebook is a multiple access method using the Non-orthogonal Spreading Code. FIG. 6 and FIG. 7 are downlink and uplink transmitting/receiving end structures of a NOMA system performing overlay transmission by using a UE-specific spreading code. Although the UE-specific spreading code is used in a frequency axis in FIG. 6 and FIG. 7, the UE-specific spreading code may also be used in a time axis.

Among other NoMA schemes, a NoMA scheme which spreads an encoded bits stream to a complex symbol vector based on modulation and a non-orthogonal codebook may also be considered. The scheme is a multi-dimensional modulation based NoMA scheme based on NoMA, and sparsity may exist or may not exist. Examples of the aforementioned operation are as follows.

Figure 8:
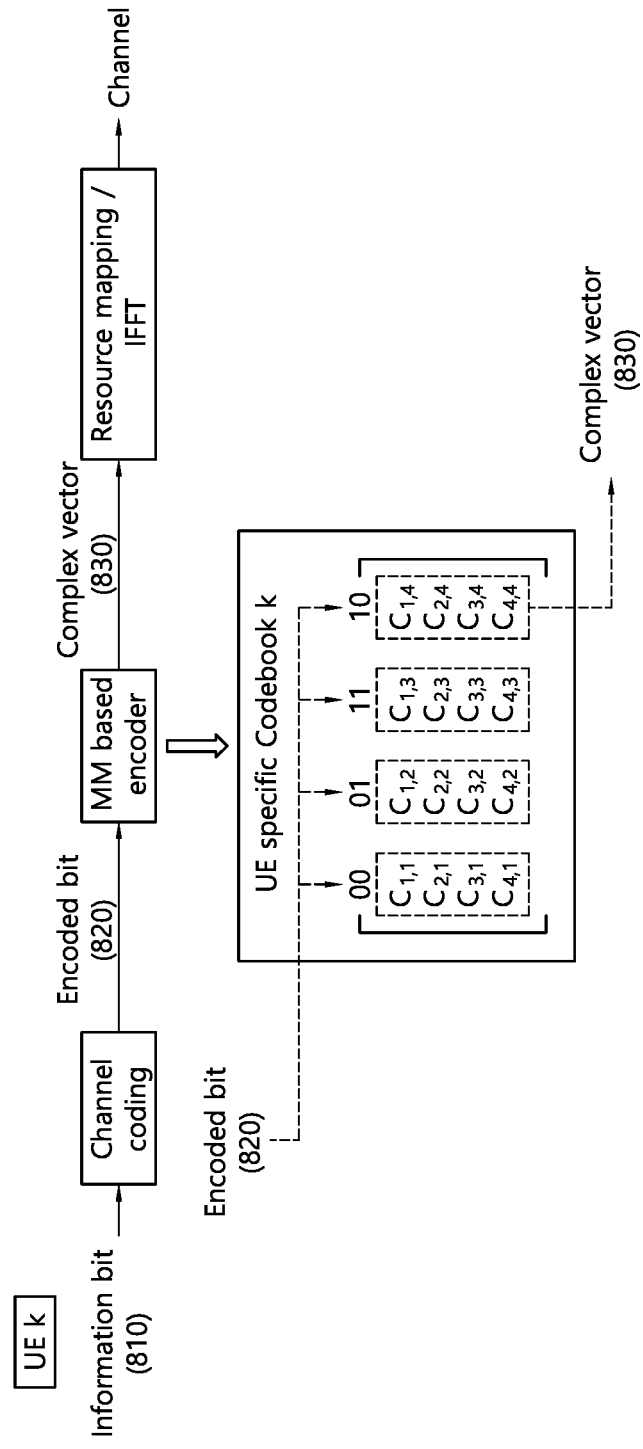
FIG. 8 is a diagram showing an example of a NOMA operation of a transmitting end applying multi-dimensional modulation (MM) according to the present embodiment.

FIG. 8 is a diagram showing an example of a NOMA operation of a transmitting end applying multi-dimensional modulation (MM) according to the present embodiment.

Figure 10:
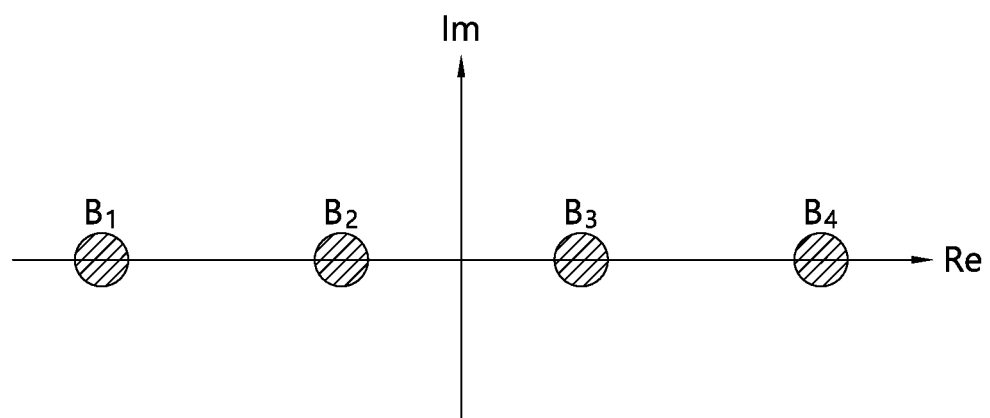
FIG. 10 shows an example of a Base Constellation and a Phase Rotation for an optimization of Rule 2.

Among the extension based multiple access schemes, a NoMA scheme that is based on Multi-dimensional Modulation (MM) may also be encoded based on a UE specific codeword (or codebook), and extension may be applied accordingly. An example of the operation of a MM based NoMA may be given as shown in FIG. 10.

Referring to FIG. 8, a k-th UE performing uplink transmission generates an information bitstream (810) by generated traffic and converts the generated information bitstream into an encoded bitstream (820) encoded by channel coding. Thereafter, bits encoded by a multi-dimensional modulation (MM)-based encoder is converted into a complex vector (830) based on UE specific codebook (or codeword) k. In the example of FIG. 8, when 2-bit encoded bits are converted into a complex vector configured of by four complex symbols. For example, when the encoded bits are [0 0], the encoded bits are converted into complex vector $[c_{1,1},c_{2,1},c_{3,1},c_{4,1}]^T$, when the encoded bits are [0 1], the encoded bits are converted into complex vector $[c_{1,2},c_{2,2},c_{3,2},c_{4,2}]^T$, when the encoded bits are [1 1], the encoded bits are converted into complex vector $[c_{1,3},c_{2,3},c_{3,3},c_{4,3}]^T$, and when the encoded bits are [1 0], the encoded bits are converted into complex vector $[c_{1,4},c_{2,4},c_{3,4},c_{4,4}]^T$.

The converted complex vector is processed with IFFT and then transmitted via resource mapping. The operation is similarly applied even to a downlink transmission operation, and the receiving end decodes the complex vector into the encoded bits through MUD, such as a Message Passing Algorithm (MPA), and so on.

In the above-described operation, a UE specific codebook may be applied to a multi-user superposed access method. In this case, when performing a decoding operation through MPA, each coefficient of the converted complex vectors of another user may act as an interference. Therefore, a codebook design that is capable of minimizing interference from another user is needed. Notations for describing the method procedures are as listed below.

J: Cardinality of Codewords (or Expected connected UEs)=The number of Function Nodes K: Dimension of Codeword (or the number of resources)=The number of Variable Nodes M: Order of Multi-dimensional Modulation (for log 2(M) bits transmission)

$d_v$: Sparsity of Codeword (or the number of Non-zero coefficients)

$d_f$: The number of Superposed coefficients (or the number of UEs connected to the same resource)

OF: Overloading Factor=J/K

A design method for an overall Codebook Set of a UE specific codebook for an MM based Encoder and an exchange method and signaling method for an optimization codebook set and codebook information of the Multi-dimensional Modulation based NoMA scheme are as described below.

Method 1. Codebook Design for MM Based Encoder

For a Codebook of the above-described MM based NoMA, the Codebook shall be designed based on the following procedure.

1. (Rule 1) Bipartite Matching Rule Design for Reducing Complexity in MPA

A. Each coefficient of a UE specific codebook influences an amount of arithmetic calculations for the MPA operations. Among the coefficients, as a number of zeros (0's) becomes larger, the complexity in the MPA operation may be reduced.

B. (Rule 1-1) Complete Bipartite Matching is defined as described below.

$$F_c = \begin{matrix} & \begin{matrix} FN_1 & \cdots & FN_J \end{matrix} \\ \begin{matrix} VN_1 \\ \vdots \\ VN_K \end{matrix} & \begin{bmatrix} 1 & \cdots & 1 \\ \vdots & \ddots & \vdots \\ 1 & \cdots & 1 \end{bmatrix} \end{matrix}.$$

C. At this point, $d_v$=K, and $d_f$=J. Since the complexity of MPA is influenced by $d_v$ and $d_f$, decoding performance shall be ensured by reducing $d_v$ and $d_f$.

For example, in case of supporting multi-user superposed access for 6 users (J=6) through 4 complex coefficients (K=4), in order to reduce complexity a Factor Graph may be defined as follows.

$$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix}.$$

In this case, since $d_v$=2 and $d_f$=3, a low complexity may be expected as compared to complete bipartite matching.

D. (Rule 1-2) More specifically, based on the Factor Graph, a UE specific codebook is generated for UE1 by a vector corresponding to a first column of the matrix. For example, UE specific codebook 1 may be configured by $$F(UE=1) = \begin{bmatrix} 0 \\ 1 \\ 0 \\ 1 \end{bmatrix},$$

and when Modulation order M=4, a codebook for the MM based Encoder may be designed as follows.

$$UE \text{ specific } Codebook\ 1 = \begin{matrix} \begin{matrix} 00 & 01 & 11 & 10 \end{matrix} \\ \begin{bmatrix} 0 & 0 & 0 & 0 \\ c_{2,1} & c_{2,2} & c_{2,3} & c_{2,4} \\ 0 & 0 & 0 & 0 \\ c_{4,1} & c_{4,2} & c_{4,3} & c_{4,4} \end{bmatrix} \end{matrix}.$$

A. (Rule 1-3) Based on a distance between complex column vectors within a UE specific Codebook, and according to a Gray mapping rule, a MM based encoder shall determine a mapping relation between the encoded bits and the complex vector. When considering channel coding, a Euclidean distance in a bit domain and a Euclidean distance between complex symbol vectors shall be derived by using the same method in order to allow the decoding performance to become excellent. For example, in the UE specific Codebook, if column vector 1 has a longest Euclidean distance from vector 4, vector 1 may correspond to encoded bits [0 0], and vector 4 may correspond to encoded bits [1 1], so that the Euclidean distance can be maximized even in a bit domain. Similarly, if vector 2 and vector 3 have a longest Euclidean distance, vector 2 may correspond to encoded bits [0 1], and vector 3 may correspond to encoded bits [1 0], so that the Euclidean distance can be maximized even in a bit domain.

Figure 9:
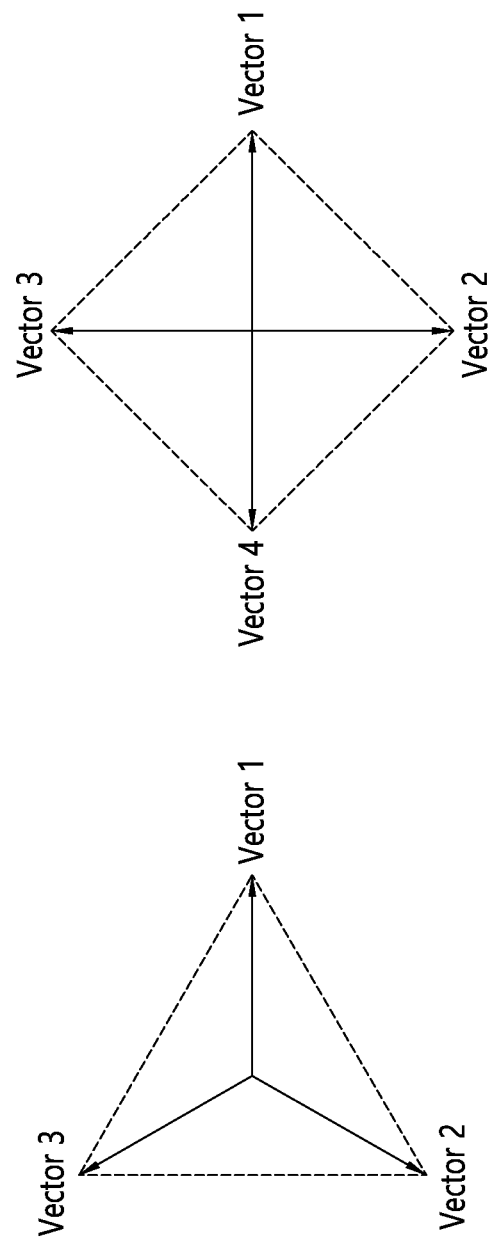
FIG. 9 shows an example of a complex vector in a UE specific codebook wherein a Euclidean Distance is maximized.

2. (Rule 2) Base Constellation design for enhancing UE specific Codebook decoding performance of each user A. In order to decode encoded bits that are transmitted when performing decoding through MPA, detection shall be performed through a complex vector. Accordingly, a Euclidean Distance between the complex vectors within the UE specific codebook of each user shall be maximized. For example, in a 2D plane, in case the number of vectors is equal to 3 or 4, complex vectors may be schematized as shown in FIG. 9. FIG. 9 shows an example of a complex vector in a UE specific codebook wherein a Euclidean Distance is maximized.

B. For example, in order to maximize the Euclidean Distance of an exemplary UE specific codebook $1(=[C_1 \ C_2 \ C_3 \ C_4])$, which is shown in Rule 1, max min distance $(c_i, c_j)$, where $i, \neq j, i, j = 1, \ldots, 4$ shall be satisfied. More specifically, in a 2D plane, when vector 1 and vector 2 are orthogonal, and when vector 1 and vector 4, vector 2 and vector 3 are in a phase inversion relationship, the Euclidean Distance may be maximized. For example, if UE specific codebook $$1 = \begin{bmatrix} 1 & 1 & -1 & -1 \\ -1 & 1 & -1 & 1 \end{bmatrix},$$

vector 1 and vector 2 may be orthogonal, and vector 1 and vector 4, vector 2 and vector 3 may be in a phase inversion relationship. An endless number of vector sets satisfying the above-mentioned condition may exist, and it will be apparent that the vector sets shall be combined with other design rules.

2. (Rule 3) Mother Constellation Design for Interference Control Between Multi-Users A. Multi-users transmit different complex coefficients by the UE specific codebook. Therefore, a $d_f - 1$ number of interferences exist according to the bipartite matching. In order to achieve interference minimization and enhancement in the decoding performance of MPA, the Euclidean Distance between the complex coefficients shall be maximized. For example, when considering an exemplary factor graph for bipartite matching, shown in Rule 1, and $$F(K=4, \ J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

a UE specific codebook is generated for UE 1 by a vector corresponding to a first column of the matrix. Accordingly, when the UE specific codebook is generated by $$F(UE = 1) = \begin{bmatrix} 0 \\ 1 \\ 0 \\ 1 \end{bmatrix},$$

interference exists from another user, wherein complex coefficients exist in a second row.

$$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix}$$

Therefore, a constellation design maximizing the Euclidean distance between the complex coefficients of each UE specific codebook of the multi-users is needed. For example, as shown in the example, in case $d_f = 3$ and M=4, 3 UE users transmit complex coefficients from one resource. At this point, since each UE configures 4 constellations by M, a total of 12 complex coefficients may exist. When a constellation used by UE 1 is referred to as [a(1), a(2), a(3), a(4)], when a constellation used by UE 2 is referred to as |b(1), b(2), b(3), b(4)|, and when a constellation used by UE 3 is referred to as |c(1), c(2), c(3), c(4)|, a complex symbol being superposed in one resource may indicate the following format: superposition of constellation (i, j, k)=a(i)+b(j)+c(k), where i, j, k=1, . . . , M. Accordingly, for superposition of constellation (i, j, k), a total of $M^{\hat{}}(d_f)$ number ($4^3$=64) of combinations may be indicated. And, in order to achieve minimization of interference between multi-users (or decoding of superposing signals), a constellation design for maximizing the Euclidean distance between superpositions of constellations shall be performed.

3. (Rule 4) Mother Constellation Design Considering a Contention Based Transmission Operation A. In case of Rule 3, when superposed transmission is performed by Scheduling, and so on, interferences from all of the other users are optimized. However, in case of Contention based transmission, not all of the users may perform transmission. In this case, since superposed transmission may not be performed on multiple complex symbols on a resource, the optimization of the Euclidean distance between constellations that may be transmitted on the resource may influence the decoding performance Therefore, the Constellation design shall be performed by optimizing the Euclidean distance between constellations that can be expressed on the resource.

B. More specifically, for the Bipartite Matching that is determined in Rule 1, the Euclidean distance between all Mother constellations that are used by optimizing Rule 2 is maximized.

4. (Rule 5) Bipartite Matching Rule Extension Method Design for Providing High Connectivity A. In the above-described Rule 1, a codebook design simultaneously satisfying Rules 2, 3, and 4 is a NP-hard Problem as a Non-convex optimization problem. Therefore, performing a Codebook design according to an increase in J and K is a very difficult problem. In order to simplify this, proposed herein is a Bipartite matching Rule Extension method.

B. It will be assumed that a smallest unit $F(K=4, J=6)$ of Bipartite Matching is designed by Rule 1 to Rule 3. Accordingly, a Bipartite matching pattern is extended by a Cartesian Product of $F(K=4, J=6)$, which is designed with an Identity matrix.

$$F(K=8, J=12) = F(K=4*2, J=6*2) =$$
$$I_{2\times 2} \times F(K=4, J=6) = \begin{bmatrix} F(K=4, J=6) & 0 \\ 0 & F(K=4, J=6) \end{bmatrix}.$$

C. This may be generalized as shown below.

$$F(mK, mJ) = I_{m\times m} \times F(K, J) = \begin{bmatrix} F(K, J) & \cdots & 0 \\ \vdots & \ddots & \vdots \\ 0 & \cdots & F(K, J) \end{bmatrix}$$

In the above-described codebook design simultaneously satisfying Rules 2, 3, and 4 is a NP-hard Problem as a Non-convex optimization problem. Therefore, it is difficult to perform an optimal Codebook design that can satisfy all conditions. Therefore, through the following embodiments, a method of enhancing a decoding rate of a multi-user superposed signal through MPA of the receiving end by performing Relaxation on part of the rules may be considered.

Embodiment 1. Optimization of Rules 1 and 2 and Relaxation of Rule 3 (Single Base Constellation Based Codebook Design)

In this embodiment, Rule 1 is optimized for a case where, as described above, $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the Factor Graph, which is presented above, it will be apparent that the properties of Rule 1 do not change even though Rule 1 is changed by a linear combination of each column vector or row vector.

Firstly, in order to optimize Rule 2, a single Base Constellation and a Phase Rotation are proposed as shown below. FIG. 10 shows an example of a Base Constellation and a Phase Rotation for an optimization of Rule 2.

Base Constellation: $B=[B_1, B_2, B_3, B_4]$, where $B_1=-3$, $B_2=-1$, $B_3=1$, $B_4=3$.

Phase Rotation:

$$\theta_i = \frac{i-1}{d_f} * \pi, \text{ where } i = 1, \ldots d_f$$

Accordingly, the following Mother Constellation may be configured by the Base Constellation and Phase Rotation.

Figure 11:
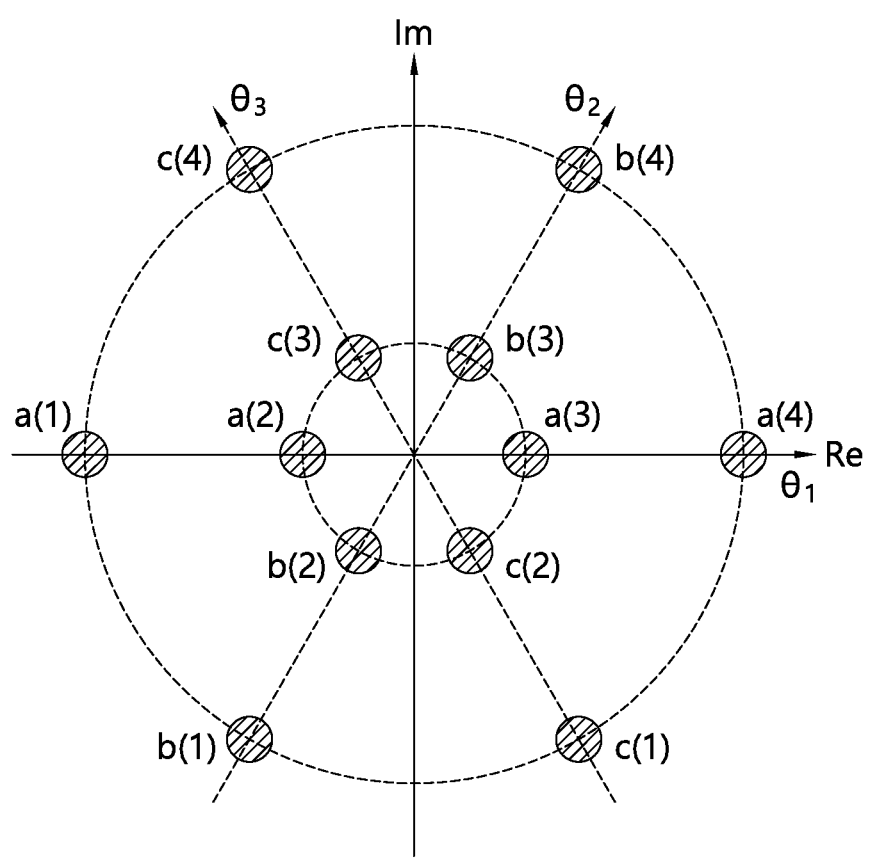
FIG. 11 shows an example of a Mother Constellation being configured by the Base Constellation and the Phase Rotation of FIG. 10.

FIG. 11 shows an example of a Mother Constellation being configured by the Base Constellation and the Phase Rotation of FIG. 10.

Mother Constellation 1: $a=B*\exp(j*\theta_1)=B=[a(1), a(2), a(3), a(4)]$

Mother Constellation 2: $b=B*\exp(j*\theta_2)=B*\exp(j*\frac{1}{3}\pi)=[b(1), b(2), b(3), b(4)]$ Mother Constellation 3: $c=B*\exp(j*\theta_3)=B*\exp(j*\frac{2}{3}\pi)=[c(1), c(2), c(3), c(4)]$ For the optimization of Rule 2, the Constellation may be mapped to the UE specific Codebook of each user, as shown below.

Since $F(UE=1) = \begin{bmatrix} 0 \\ 1 \\ 0 \\ 1 \end{bmatrix}$, UE specific Codebook $1 = \begin{bmatrix} 0 \\ P*c^T \\ 0 \\ a \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=2) = \begin{bmatrix} 1 \\ 0 \\ 1 \\ 0 \end{bmatrix}$, UE specific Codebook $2 = \begin{bmatrix} a \\ 0 \\ P*c^T \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=3) = \begin{bmatrix} 1 \\ 1 \\ 0 \\ 0 \end{bmatrix}$, UE specific Codebook $3 = \begin{bmatrix} P*b^T \\ a \\ 0 \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=4) = \begin{bmatrix} 0 \\ 0 \\ 1 \\ 1 \end{bmatrix}$, UE specific Codebook $4 = \begin{bmatrix} 0 \\ 0 \\ b \\ P*c^T \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$.

Since $F(UE=5) = \begin{bmatrix} 1 \\ 0 \\ 0 \\ 1 \end{bmatrix}$, UE specific Codebook $5 = \begin{bmatrix} P*c^T \\ 0 \\ 0 \\ b \end{bmatrix}$, -continued $$\text{where } P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$$

Since $F(UE=6) = \begin{bmatrix} 0 \\ 1 \\ 1 \\ 0 \end{bmatrix}$, UE specific Codebook $6 = \begin{bmatrix} 0 \\ P*b^T \\ a \\ 0 \end{bmatrix}$, $$\text{where } P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}.$$

As described above, in order to enhance the UE specific Codebook decoding performance of each user, according to Rule 2, Permutation matrix P allows a Euclidean Distance between the complex vectors within the UE specific Codebook of each user to be maximized. For example, since $$UE \text{ specific Codebook } 1 = \begin{bmatrix} 0 \\ P*c^T \\ 0 \\ a \end{bmatrix} = \begin{bmatrix} 0 & 0 & 0 & 0 \\ c(2) & c(4) & c(1) & c(3) \\ 0 & 0 & 0 & 0 \\ a(1) & a(2) & a(3) & a(4) \end{bmatrix},$$

if the column vectors within the Codebook are given as vectors 1, 2, 3, and 4, since $c(1)=-c(4)$, $c(2)=-c(3)$, $a(1)=-a(4)$, and $a(2)=-a(3)$, vector 1 and vector 4, vector 2 and vector 3 are in a phase inversion relationship. Additionally, since conjugate$(c(2))*c(4)$+conjugate$(a(1))*a(2)=0$, vector 1 and vector 2 are in an orthogonal relationship. Since the relationship between the vectors are equally applied to all UE specific codebooks, Rule 2 is optimized.

This may be arranged in a Factor Graph for bipartite matching, which is acquired in Rule 1, as shown below.

$$F(K=4, J=6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

Figure 12:
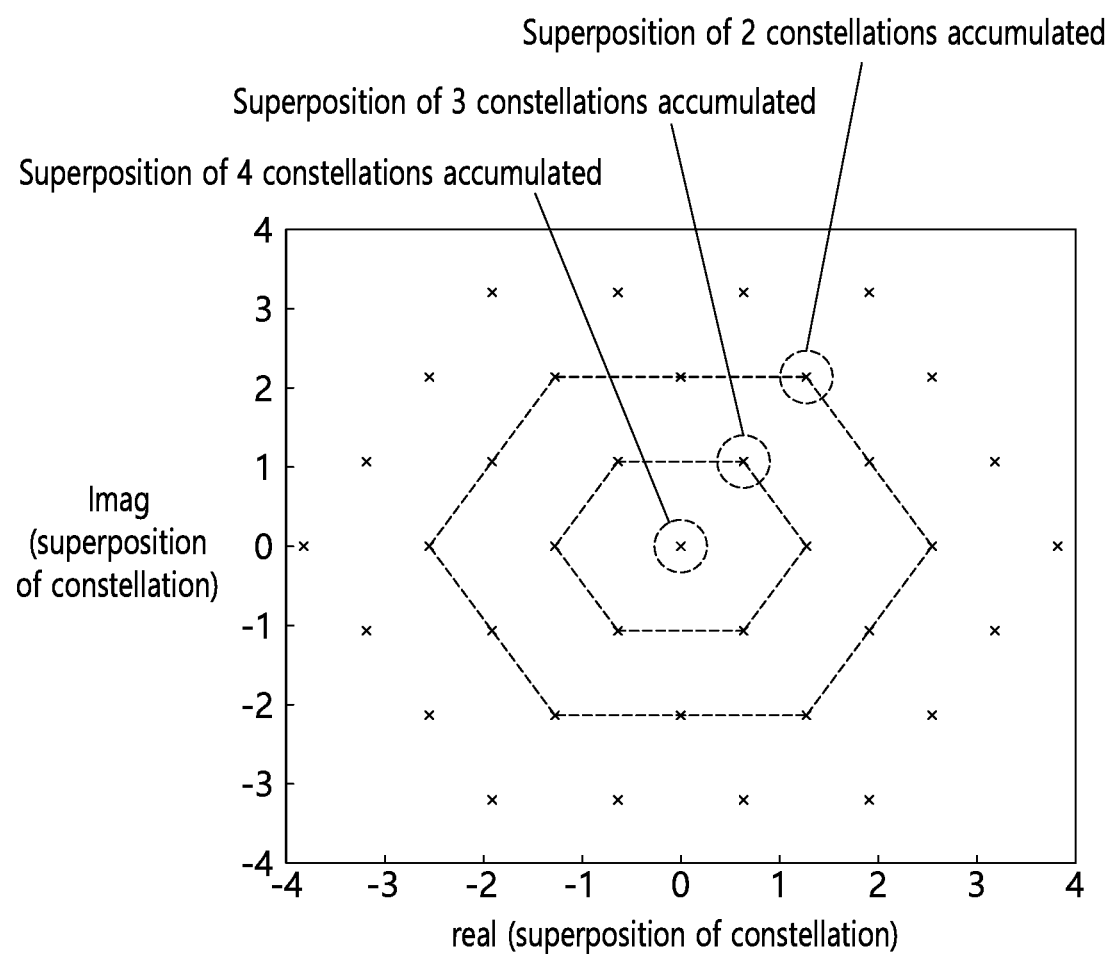
FIG. 12 shows an exemplary combination of a superposition of constellation (i, j, k) according to Rule 3.

Conversely, in case of Rule 3, for the superposition of constellation (i, j, k), a total of $M^{\wedge}(d_f)$ number ($4^3=64$) of combinations may be indicated, as shown in FIG. 12. FIG. 12 shows an exemplary combination of a superposition of constellation (i, j, k) according to Rule 3. (In FIG. 12, the x-axis is a real domain of the superposition of constellation, and the y-axis is an imaginary domain of the superposition of constellation.)

By using the superposition of constellation pattern, which is presented above, part of the superposition of constellation may be verified. More specifically, in case of Rule 3, optimization may not be performed based on a generated traffic combination of each user.

The overall codebook may be arranged as shown below.

$$F(K=4, J=6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

$$a = \lfloor -3, -1, 1, 3 \rfloor,$$

$$b = \lfloor -3, -1, 1, 3 \rfloor * \exp\left(j * \frac{1}{3}\pi\right),$$

$$c = \lfloor -3, -1, 1, -3 \rfloor * \exp\left(j * \frac{2}{3}\pi\right),$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

UE specific Codebook k=$k^{th}$ column of F matrix (e.g., UE specific Codebook 1=$1^{st}$ column of $$F \text{ matrix} = \begin{bmatrix} 0 \\ P*c^T \\ 0 \\ a \end{bmatrix})$$

Normalized Codebook Sets

| UE index k | UE specific Codebook $k = \begin{matrix} 00 & 01 & 10 & 11 \\ [vec\,1 & vec\,2 & vec\,3 & vec\,4] \end{matrix} * P_{no}$ | | | |
|---|---|---|---|---|
| UE 1 | $\begin{bmatrix} 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ -3 & -1 & 1 & 3 \end{bmatrix} * P_{no}$ | | | |
| UE 2 | $\begin{bmatrix} -3 & -1 & 1 & 3 \\ 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \end{bmatrix} * P_{no}$ | | | |
| UE 3 | $\begin{bmatrix} -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ -3 & -1 & 1 & 3 \\ 0 & 0 & 0 & 0 \\ 0 & 0 & 0 & 0 \end{bmatrix} * P_{no}$ | | | |
| UE 4 | $\begin{bmatrix} 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \end{bmatrix} * P_{no}$ | | | |
| UE 5 | $\begin{bmatrix} -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \end{bmatrix} * P_{no}$ | | | |

-continued

| UE index k | UE specific Codebook $k = \begin{bmatrix} 00 & 01 & 10 & 11 \\ vec\,1 & vec\,2 & vec\,3 & vec\,4 \end{bmatrix} * P_{no}$ |
|---|---|
| UE 6 | $\begin{bmatrix} 0 & 0 & 0 & 0 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ -3 & -1 & 1 & 3 \\ 0 & 0 & 0 & 0 \end{bmatrix} * P_{no}$ |

Herein, $P_{no}$ is a matrix (M×M) that is normalized for power restriction. $P_{no}$ may be expressed in the form of an equation as follows:

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}..$$

At this point, $P_{no,m} = (1/|vec\,m|) \times \sqrt{K}$, for m=1, ..., M, where K=4, M=4.

Embodiment 2. Optimization of Rules 1 and 3 and Relaxation of Rule 2 Relaxation (Multiple Base Constellation Based Codebook Design)

In the present embodiment, Rule 1 is optimized for a case where, as described above, $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the Factor Graph, which is presented above, it will be apparent that the properties of Rule 1 do not change even though Rule 1 is changed by a linear combination of each column vector or row vector.

Figure 13:
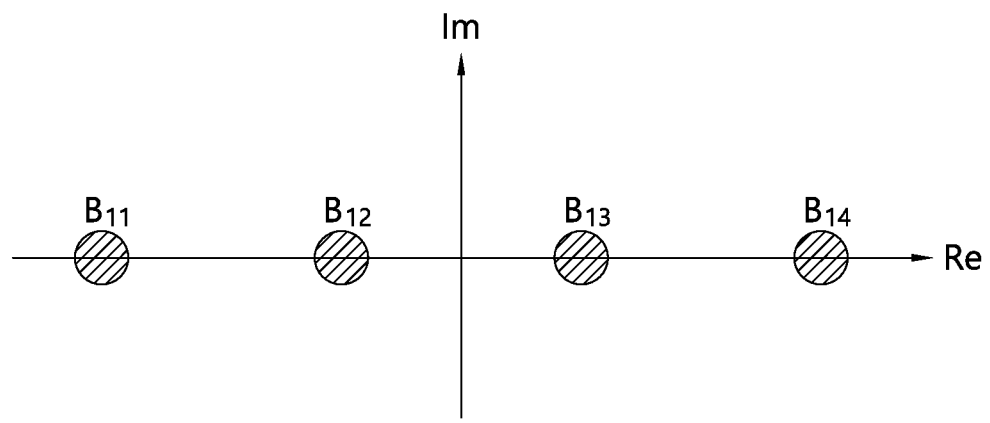
FIG. 13 shows an example of a Base Constellation and a Phase Rotation for an optimization of Rule 3.
Figure 14:
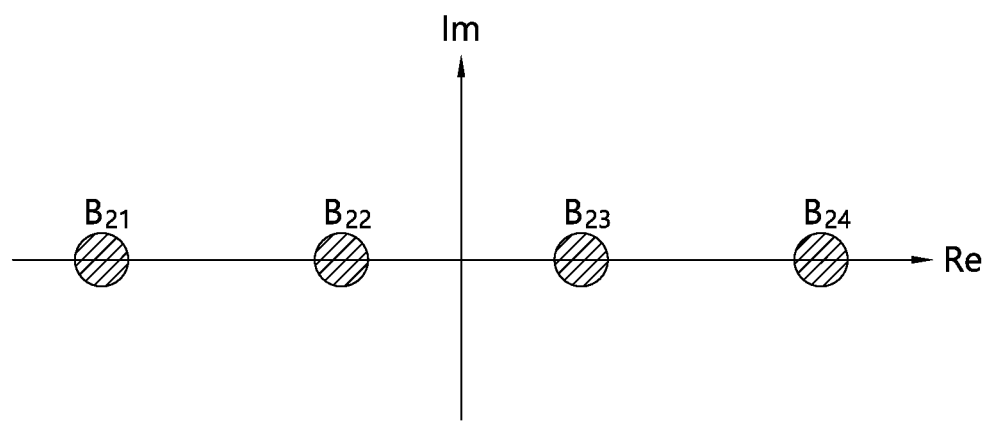
FIG. 14 shows an example of a Base Constellation and a Phase Rotation for an optimization of Rule 3.

Firstly, in order to optimize Rule 3, two Base Constellations and a Phase Rotation are proposed as shown below. FIG. 13 and FIG. 14 show examples of a Base Constellation and a Phase Rotation for an optimization of Rule 3.

Base Constellation 1: B1=[$B_{11}$, $B_{12}$, $B_{13}$, $B_{14}$], where $B_{11}$=−3, $B_{12}$=−1, $B_{13}$=1, $B_{14}$=3.
Base Constellation 2: B2=[$B_{21}$, $B_{22}$, $B_{23}$, $B_{24}$], where $B_{21}$=−3*$\sqrt{5}$, $B_{22}$=−1*$\sqrt{5}$, $B_{23}$=1*$\sqrt{5}$, $B_{24}$=3*$\sqrt{5}$.
Phase Rotation:

$$\theta_i = \frac{i-1}{d_f} * \pi, \text{ where } i = 1, \ldots d_f$$

Figure 15:
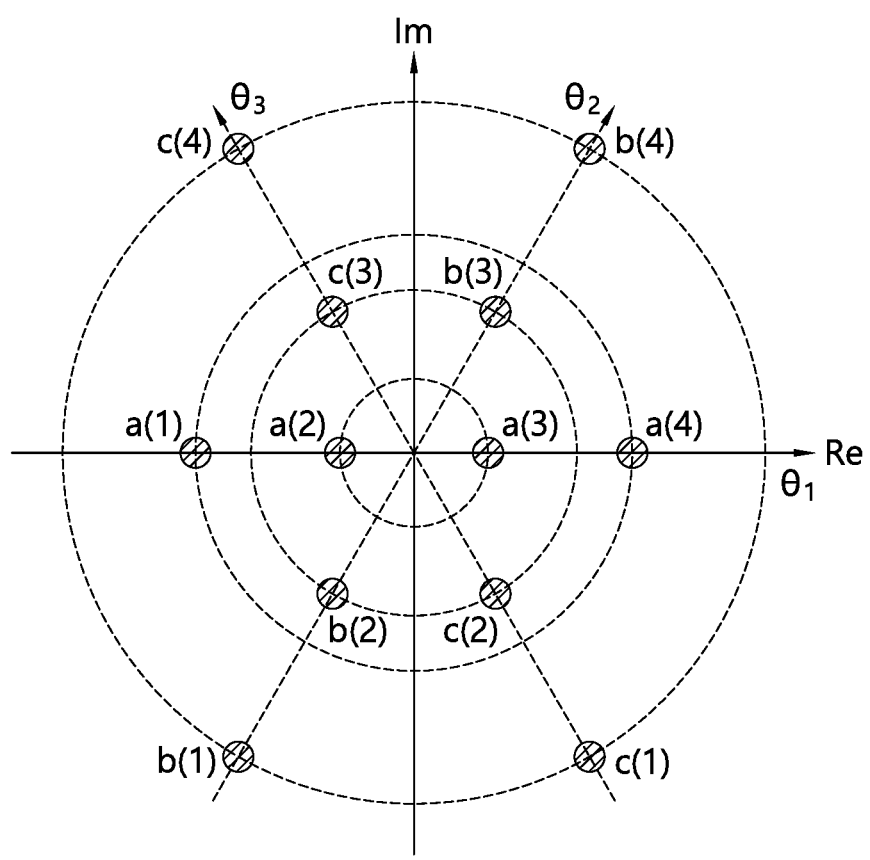
FIG. 15 shows an example of a Mother Constellation being configured by the Base Constellations 1 and 2 and the Phase Rotation of FIG. 13 and FIG. 14.

Accordingly, the following Mother Constellation may be configured by the Base Constellations 1 and 2 and Phase Rotation, as shown in FIG. 15. FIG. 15 shows an example of a Mother Constellation being configured by the Base Constellations 1 and 2 and the Phase Rotation of FIG. 13 and FIG. 14.

Mother Constellation 1: a=B1*exp(j*$\theta_1$)=B1=[a(1), a(2), a(3), a(4)]

Mother Constellation 2: b=B2*exp(j*$\theta_2$)= B2*exp(j*⅓π)=[b(1), b(2), b(3), b(4)]

Mother Constellation 3: c=B2*exp(j*$\theta_3$)= B2*exp(j*⅔π)=[c(1), c(2), c(3), c(4)]

For the optimization of Rule 2, the Constellation may be mapped to the UE specific Codebook of each user, as shown below.

Since $F(UE = 1) = \begin{bmatrix} 0 \\ 1 \\ 0 \\ 1 \end{bmatrix}$, UE specific Codebook 1 = $\begin{bmatrix} 0 \\ P*c^T \\ 0 \\ a \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE = 2) = \begin{bmatrix} 1 \\ 0 \\ 1 \\ 0 \end{bmatrix}$, UE specific Codebook 2 = $\begin{bmatrix} a \\ 0 \\ P*c^T \\ 0 \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE = 3) = \begin{bmatrix} 1 \\ 1 \\ 0 \\ 0 \end{bmatrix}$, UE specific Codebook 3 = $\begin{bmatrix} P*b^T \\ a \\ 0 \\ 0 \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE = 4) = \begin{bmatrix} 0 \\ 0 \\ 1 \\ 1 \end{bmatrix}$, UE specific Codebook 4 = $\begin{bmatrix} 0 \\ 0 \\ b \\ P*c^T \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE = 5) = \begin{bmatrix} 1 \\ 0 \\ 0 \\ 1 \end{bmatrix}$, UE specific Codebook 5 = $\begin{bmatrix} P*c^T \\ 0 \\ 0 \\ b \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

-continued $$\text{Since } F(UE=6) = \begin{bmatrix} 0 \\ 1 \\ 1 \\ 0 \end{bmatrix}, \text{ } UE \text{ specific Codebook } 6 = \begin{bmatrix} 0 \\ P*b^T \\ a \\ 0 \end{bmatrix}, \text{ where}$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

As described above, in order to enhance the UE specific Codebook decoding performance of each user, according to Rule 2, Permutation matrix P allows a Euclidean Distance between the complex vectors within the UE specific Codebook of each user to be maximized. For example, since $$UE \text{ specific Codebook } 1 = \begin{bmatrix} 0 \\ P*c^T \\ 0 \\ a \end{bmatrix} = \begin{bmatrix} 0 & 0 & 0 & 0 \\ c(2) & c(4) & c(1) & c(3) \\ 0 & 0 & 0 & 0 \\ a(1) & a(2) & a(3) & a(4) \end{bmatrix},$$

if the column vectors within the Codebook are given as vectors 1, 2, 3, and 4, since $c(1)=-c(4)$, $c(2)=-c(3)$, $a(1)=-a(4)$, and $a(2)=-a(3)$, vector 1 and vector 4, vector 2 and vector 3 are in a phase inversion relationship. Conversely, unlike in Embodiment 1, since conjugate$(c(2))*c(4)$+conjugate$(a(1))*a(2) \neq 0$, vector 1 and vector 2 are in a non-orthogonal relationship. However, since conjugate$(c(2))*c(4)$+conjugate$(b(1))*b(2)=0$, UE specific Codebooks 5 and 6 are optimized in view of Rule 2. More specifically, UE specific Codebooks 5 and 6 may be optimized for Rule 2, and UE specific codebooks 1 to 4 may not be optimized.

Therefore, proposed herein is a Codebook allocation Rule for first allocating UE specific Codebooks 5 and 6 to the user and then allocating the remaining UE specific codebooks 1 to 4, when a NoMA service through the Codebook is performed in UL. Through the above-described operation, the decoding performance of the receiving end may be further enhanced.

This may be arranged in a Factor Graph for bipartite matching, which is acquired in Rule 1, as shown below.

$$F(K=4, J=6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

Figure 16:
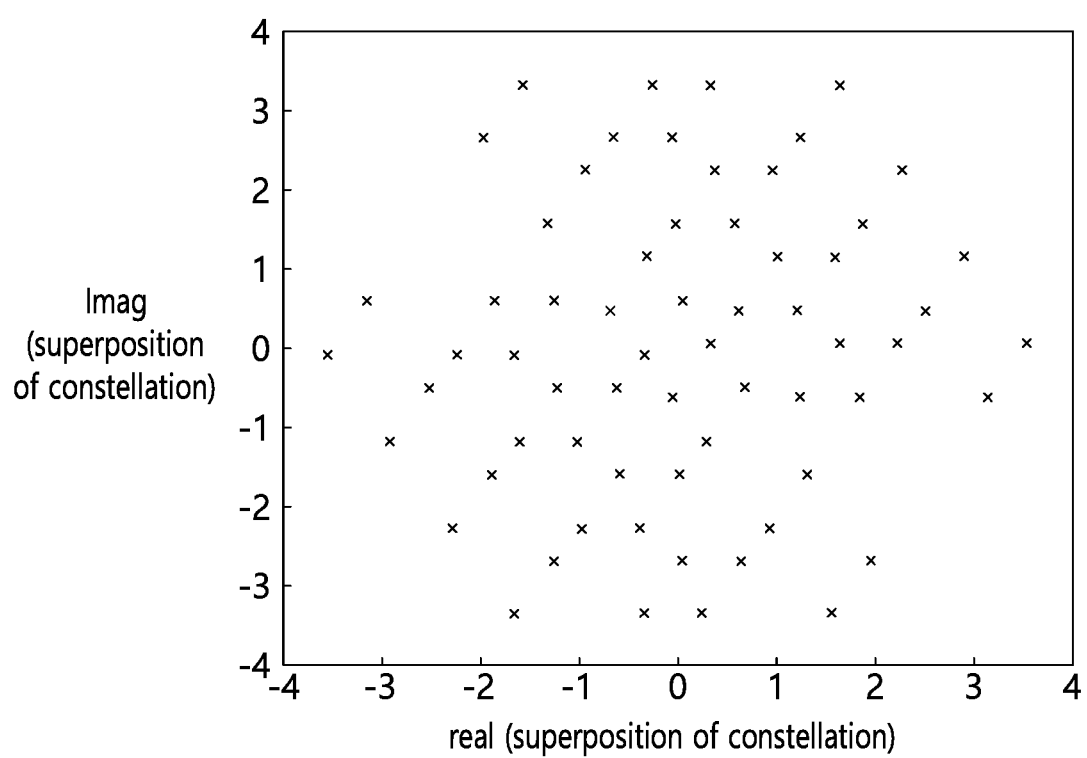
FIG. 16 shows an exemplary combination of a superposition of constellation (i, j, k) according to Rule 3.

In case of Rule 3, for the superposition of constellation (i, j, k), a total of $M^{d_f}$ number ($4^3=64$) of combinations may be indicated by the Mother Constellation and bipartite matching, as shown in FIG. 16. FIG. 16 shows an exemplary combination of a superposition of constellation (i, j, k) according to Rule 3. (In FIG. 16, the x-axis is a real domain of the superposition of constellation, and the y-axis is an imaginary domain of the superposition of constellation.)

By using the superposition of constellation pattern, which is shown in FIG. 16, it may be verified that all 64 constellations have a constant Euclidean Distance without superposition. More specifically, in case of Rule 3, the Euclidean Distance may be designed to be near to an optimal state regardless of a generated traffic combination of each user.

The overall codebook may be arranged as shown below.

$$F(K=4, J=6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

$$a = [-3, -1, 1, 3],$$

$$b = [-3*\sqrt{5}, -1*\sqrt{5}, 1*\sqrt{5}, 3*\sqrt{5}] * \exp(J*1/3\pi),$$

$$c = [-3*\sqrt{5}, -1*\sqrt{5}, 1*\sqrt{5}, 3*\sqrt{5}] * \exp(j*2/3\pi),$$

$$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

UE specific Codebook k=kth column of F matrix (e.g., UE specific Codebook 1=1st column of $$F \text{ matrix} = \begin{bmatrix} 0 & 0 & 1 & 0 \\ 1 & 0 & 0 & 0 \\ 0 & 0 & 0 & 1 \\ 0 & 1 & 0 & 0 \end{bmatrix})$$

Normalized Codebook Sets

| UE index k | UE specific Codebook $k = \dfrac{\begin{array}{cccc}00 & 01 & 10 & 11\end{array}}{[vec\,1 \quad vec\,2 \quad vec\,3 \quad vec\,4]*P_{no}}$ |
|---|---|
| UE 1 | $\begin{bmatrix} 0 & 0 & 0 & 0 \\ -\sqrt{5}*e^{j*\frac{2}{3}\pi} & 3\sqrt{5}*e^{j*\frac{2}{3}\pi} & -3\sqrt{5}*e^{j*\frac{2}{3}\pi} & \sqrt{5}*e^{j*\frac{2}{3}\pi} \\ 0 & 0 & 0 & 0 \\ -3 & -1 & 1 & 3 \end{bmatrix} * P_{no}$ |

-continued

| UE index k | UE specific Codebook $k = \begin{matrix} 00 & 01 & 10 & 11 \\ [vec\,1 & vec\,2 & vec\,3 & vec\,4] \end{matrix} * P_{no}$ |
|---|---|
| UE 2 | $\begin{bmatrix} -3 & -1 & 1 & 3 \\ 0 & 0 & 0 & 0 \\ -\sqrt{5}*e^{j*\frac{2}{3}\pi} & 3\sqrt{5}*e^{j*\frac{2}{3}\pi} & -3\sqrt{5}*e^{j*\frac{2}{3}\pi} & \sqrt{5}*e^{j*\frac{2}{3}\pi} \\ 0 & 0 & 0 & 0 \end{bmatrix} * P_{no}$ |
| UE 3 | $\begin{bmatrix} -\sqrt{5}*e^{j*\frac{1}{3}\pi} & 3\sqrt{5}*e^{j*\frac{1}{3}\pi} & -3\sqrt{5}*e^{j*\frac{1}{3}\pi} & \sqrt{5}*e^{j*\frac{1}{3}\pi} \\ -3 & -1 & 1 & 3 \\ 0 & 0 & 0 & 0 \\ 0 & 0 & 0 & 0 \end{bmatrix} * P_{no}$ |
| UE 4 | $\begin{bmatrix} 0 & 0 & 0 & 0 \\ 0 & 0 & 0 & 0 \\ -3\sqrt{5}*e^{j*\frac{1}{3}\pi} & -\sqrt{5}*e^{j*\frac{1}{3}\pi} & \sqrt{5}*e^{j*\frac{1}{3}\pi} & 3\sqrt{5}*e^{j*\frac{1}{3}\pi} \\ -\sqrt{5}*e^{j*\frac{2}{3}\pi} & 3\sqrt{5}*e^{j*\frac{2}{3}\pi} & -3\sqrt{5}*e^{j*\frac{2}{3}\pi} & \sqrt{5}*e^{j*\frac{2}{3}\pi} \end{bmatrix} * P_{no}$ |
| UE 5 | $\begin{bmatrix} -\sqrt{5}*e^{j*\frac{2}{3}\pi} & 3\sqrt{5}*e^{j*\frac{2}{3}\pi} & -3\sqrt{5}*e^{j*\frac{2}{3}\pi} & \sqrt{5}*e^{j*\frac{2}{3}\pi} \\ 0 & 0 & 0 & 0 \\ 0 & 0 & 0 & 0 \\ -3\sqrt{5}*e^{j*\frac{1}{3}\pi} & -\sqrt{5}*e^{j*\frac{1}{3}\pi} & \sqrt{5}*e^{j*\frac{1}{3}\pi} & 3\sqrt{5}*e^{j*\frac{1}{3}\pi} \end{bmatrix} * P_{no}$ |
| UE 6 | $\begin{bmatrix} 0 & 0 & 0 & 0 \\ -\sqrt{5}*e^{j*\frac{1}{3}\pi} & 3\sqrt{5}*e^{j*\frac{1}{3}\pi} & -3\sqrt{5}*e^{j*\frac{1}{3}\pi} & \sqrt{5}*e^{j*\frac{1}{3}\pi} \\ -3 & -1 & 1 & 3 \\ 0 & 0 & 0 & 0 \end{bmatrix} * P_{no}$ |

Herein, $P_{no}$ is a matrix (M×M) that is normalized for power restriction. $P_{no}$ may be expressed in the form of an equation as follows:

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}..$$

At this point, $P_{no,m} = (1/|vec\,m|) \times \sqrt{K}$, for m=1, ..., M, where K=4, M=4.

Embodiment 3. Optimization of Rules 1 and 4 and Relaxation of Rules 2 and 3 (Asymmetric Base Constellation Based Codebook Design)

In the present embodiment, Rule 1 is optimized for a case where, as described above, $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the Factor Graph, which is presented above, it will be apparent that the properties of Rule 1 do not change even though Rule 1 is changed by a linear combination of each column vector or row vector.

Figure 17:
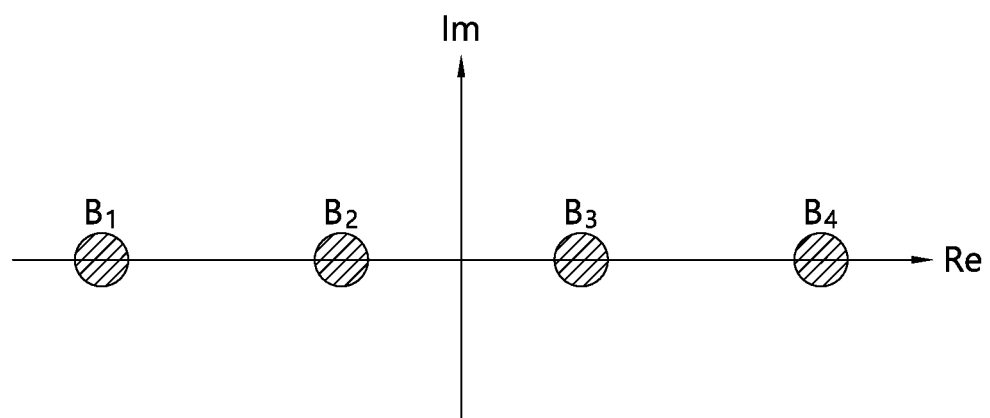
FIG. 17 shows an example of a single Asymmetric Base Constellation and a Phase Rotation for an optimization of Rule 4.

Firstly, in order to optimize Rule 4, a single Asymmetric Base Constellation and a Phase Rotation of FIG. 17 are proposed. FIG. 17 shows an example of a single Asymmetric Base Constellation and a Phase Rotation for an optimization of Rule 4.

Asymmetric Base Constellation: $B = [B_1, B_2, B_3, B_4]$, where $B_1 = -4$, $B_2 = -1$, $B_3 = 2$, $B_4 = 5$.

$$\theta_i = \frac{i-1}{d_f} * 2\pi, \text{ where } i = 1, \dots d_f.$$

Figure 18:
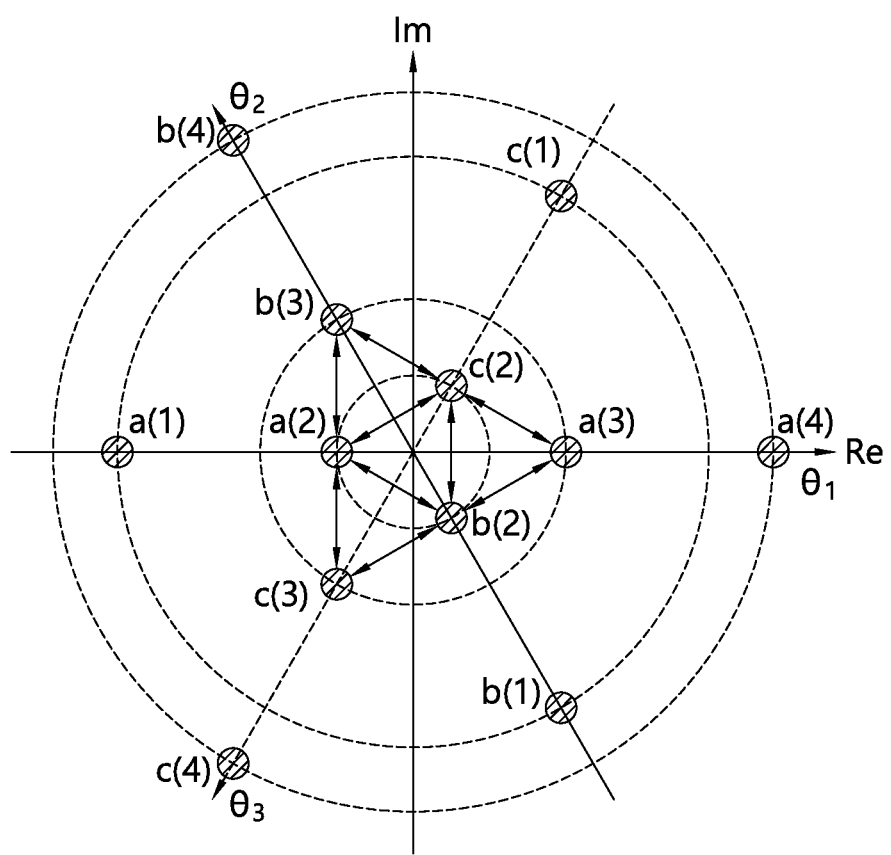
FIG. 18 shows an example of a Mother Constellation being configured by the symmetric Base Constellation and the Phase Rotation of FIG. 17.

Phase Rotation:

Accordingly, the following Mother Constellation may be configured by the Asymmetric Base Constellation and Phase Rotation. FIG. 18 shows an example of a Mother Constellation being configured by the symmetric Base Constellation and the Phase Rotation of FIG. 17.

Mother Constellation 1: $a = B*\exp(j*\theta_1) = B = [a(1), a(2), a(3), a(4)]$

Mother Constellation 2: $b = B*\exp(j*\theta_2) = B*\exp(j*\frac{2}{3}\pi) = [b(1), b(2), b(3), b(4)]$ Mother Constellation 3: $c = B*\exp(j*\theta_3) = B*\exp(j*\frac{4}{3}\pi) = [c(1), c(2), c(3), c(4)]$ More specifically, the Euclidean distance of the Mother constellations is optimized. However, the Euclidean distance is not optimized for all of the Mother constellations. Herein, when a constellation is obtained by an ML approach, only the Euclidean distance of the most dominant internal constellations is optimized. Thus, when constellation superposition does not occur in a single resource by multi-users, it may be said that the Euclidean distance of a constellation is optimized.

For the optimization of Rule 2, the Constellation may be mapped to the UE specific Codebook of each user, as shown below.

Since $F(UE=1) = \begin{bmatrix} 0 \\ 1 \\ 0 \\ 1 \end{bmatrix}$, UE specific Codebook 1 = $\begin{bmatrix} 0 \\ P*c^T \\ 0 \\ a \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE=2) = \begin{bmatrix} 1 \\ 0 \\ 1 \\ 0 \end{bmatrix}$, UE specific Codebook 2 = $\begin{bmatrix} a \\ 0 \\ P*c^T \\ 0 \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE=3) = \begin{bmatrix} 1 \\ 1 \\ 0 \\ 0 \end{bmatrix}$, UE specific Codebook 3 = $\begin{bmatrix} P*b^T \\ a \\ 0 \\ 0 \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE=4) = \begin{bmatrix} 0 \\ 0 \\ 1 \\ 1 \end{bmatrix}$, UE specific Codebook 4 = $\begin{bmatrix} 0 \\ 0 \\ b \\ P*c^T \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE=5) = \begin{bmatrix} 1 \\ 0 \\ 0 \\ 1 \end{bmatrix}$, UE specific Codebook 5 = $\begin{bmatrix} P*c^T \\ 0 \\ 0 \\ b \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Since $F(UE=6) = \begin{bmatrix} 0 \\ 1 \\ 1 \\ 0 \end{bmatrix}$, UE specific Codebook 6 = $\begin{bmatrix} 0 \\ P*b^T \\ a \\ 0 \end{bmatrix}$, where $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

As described above, in order to enhance the UE specific Codebook decoding performance of each user, according to Rule 2, Permutation matrix P allows a Euclidean Distance between the complex vectors within the UE specific Codebook of each user to be maximized. For example, since $$\text{UE specific Codebook 1} = \begin{bmatrix} 0 \\ P*c^T \\ 0 \\ a \end{bmatrix} = \begin{bmatrix} 0 & 0 & 0 & 0 \\ c(2) & c(4) & c(1) & c(3) \\ 0 & 0 & 0 & 0 \\ a(1) & a(2) & a(3) & a(4) \end{bmatrix},$$

if the column vectors within the Codebook are given as vectors 1, 2, 3, and 4, since $c(1) \ne -c(4)$, $c(2) \ne -c(3)$, $a(1) \ne -a(4)$, and $a(2) \ne -a(3)$, a phase inversion relationship is not established between the vectors. Additionally, unlike in Embodiment 1, since conjugate($c(2)$)*$c(4)$+conjugate($a(1)$)*$a(2) \ne 0$, vector 1 and vector 2 are in a non-orthogonal relationship. More specifically, UE specific Codebooks may not be optimized. However, each vector may be in a near-orthogonal relationship and may have a Euclidean distance close to a Phase inversion relationship.

This may be arranged in a Factor Graph for bipartite matching, which is acquired in Rule 1, as shown below.

$$F(K=4, J=6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

In case of Rule 3, for the superposition of constellation (i, j, k), a total of $M^{\wedge}(d_f)$ number ($4^3 = 64$) of combinations may be indicated by the Mother Constellation and bipartite matching. These may not be optimized as in Embodiment 1.

The overall codebook may be arranged as shown below.

$$F(K=4, J=6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

$$a = [-4, -1, 2, 5], b = [-4, -1, 2, 5]*\exp\left(j*\frac{2}{3}\pi\right),$$

$$c = [-4, -1, 2, 5]*\exp\left(j*\frac{4}{3}\pi\right), P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

UE specific Codebook k=$k^{th}$ column of F matrix (e.g., UE specific Codebook 1=$1^{st}$ column of $$F \text{ matrix} = \begin{bmatrix} 0 \\ P*c^T \\ 0 \\ a \end{bmatrix})$$

Normalized Codebook Sets

| UE index k | UE specific Codebook $k = \begin{matrix} 00 & 01 & 10 & 11 \\ [vec\,1 & vec\,2 & vec\,3 & vec\,4] \end{matrix} * P_{no}$ |
|---|---|
| UE 1 | $\begin{bmatrix} 0 & 0 & 0 & 0 \\ -1*e^{j*\frac{4}{3}\pi} & 5*e^{j*\frac{4}{3}\pi} & -4*e^{j*\frac{4}{3}\pi} & 2*e^{j*\frac{4}{3}\pi} \\ 0 & 0 & 0 & 0 \\ -4 & -1 & 2 & 5 \end{bmatrix} * P_{no}$ |
| UE 2 | $\begin{bmatrix} -4 & -1 & 2 & 5 \\ 0 & 0 & 0 & 0 \\ -1*e^{j*\frac{4}{3}\pi} & 5*e^{j*\frac{4}{3}\pi} & -4*e^{j*\frac{4}{3}\pi} & 2*e^{j*\frac{4}{3}\pi} \\ 0 & 0 & 0 & 0 \end{bmatrix} * P_{no}$ |
| UE 3 | $\begin{bmatrix} -1*e^{j*\frac{2}{3}\pi} & 5*e^{j*\frac{2}{3}\pi} & -4*e^{j*\frac{2}{3}\pi} & 2*e^{j*\frac{2}{3}\pi} \\ -4 & -1 & 2 & 5 \\ 0 & 0 & 0 & 0 \\ 0 & 0 & 0 & 0 \end{bmatrix} * P_{no}$ |
| UE 4 | $\begin{bmatrix} 0 & 0 & 0 & 0 \\ 0 & 0 & 0 & 0 \\ -4*e^{j*\frac{2}{3}\pi} & -1*e^{j*\frac{2}{3}\pi} & 2*e^{j*\frac{2}{3}\pi} & 5*e^{j*\frac{2}{3}\pi} \\ -1*e^{j*\frac{4}{3}\pi} & 5*e^{j*\frac{4}{3}\pi} & -4*e^{j*\frac{4}{3}\pi} & 2*e^{j*\frac{4}{3}\pi} \end{bmatrix} * P_{no}$ |
| UE 5 | $\begin{bmatrix} -1*e^{j*\frac{4}{3}\pi} & 5*e^{j*\frac{4}{3}\pi} & -4*e^{j*\frac{4}{3}\pi} & 2*e^{j*\frac{4}{3}\pi} \\ 0 & 0 & 0 & 0 \\ 0 & 0 & 0 & 0 \\ -4*e^{j*\frac{2}{3}\pi} & -1*e^{j*\frac{2}{3}\pi} & 2*e^{j*\frac{2}{3}\pi} & 5*e^{j*\frac{2}{3}\pi} \end{bmatrix} * P_{no}$ |
| UE 6 | $\begin{bmatrix} 0 & 0 & 0 & 0 \\ -1*e^{j*\frac{2}{3}\pi} & 5*e^{j*\frac{2}{3}\pi} & -4*e^{j*\frac{2}{3}\pi} & 2*e^{j*\frac{2}{3}\pi} \\ -4 & -1 & 2 & 5 \\ 0 & 0 & 0 & 0 \end{bmatrix} * P_{no}$ |

Herein, $P_{no}$ is a matrix (M×M) that is normalized for power restriction. $P_{n0}$ may be expressed in the form of an equation as follows:

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}..$$

At this point, $P_{no,m}=(1/|vec\,m|)\times\sqrt{K}$, for m=1, ..., M, where K=4, M=4.

Embodiment 4. Optimization of Rules 1 and 4 and Relaxation of Rules 2 and 3 (Asymmetric 2D Base Constellation Based Codebook Design)

In the present embodiment, Rule 1 is optimized for a case where, as described above, $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the Factor Graph, which is presented above, it will be apparent that the properties of Rule 1 do not change even though Rule 1 is changed by a linear combination of each column vector or row vector.

Figure 19:
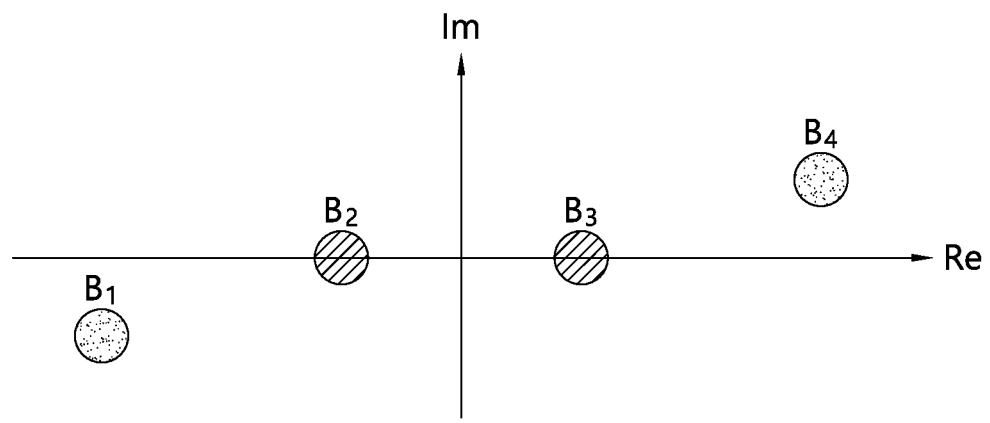
FIG. 19 shows an example of a single Asymmetric 2D Base Constellation and a Phase Rotation for an optimization of Rule 4.

Firstly, in order to optimize Rule 4, a single Asymmetric 2D Base Constellation and a Phase Rotation are proposed, as shown below. FIG. 19 shows an example of a single Asymmetric 2D Base Constellation and a Phase Rotation for an optimization of Rule 4.

Asymmetric 2D Base Constellation: $B=[B_1, B_2, B_3, B_4]$, wherein $$B_1 = -2.5 - \frac{\sqrt{3}}{2}i, B_2 = -1, B_3 = 2, B_4 = 3.5 + \frac{\sqrt{3}}{2}i.$$

Phase Rotation:

$$\theta_i = \frac{i-1}{d_f} * 2\pi, \text{ where } i = 1, \ldots d_f.$$

Figure 20:
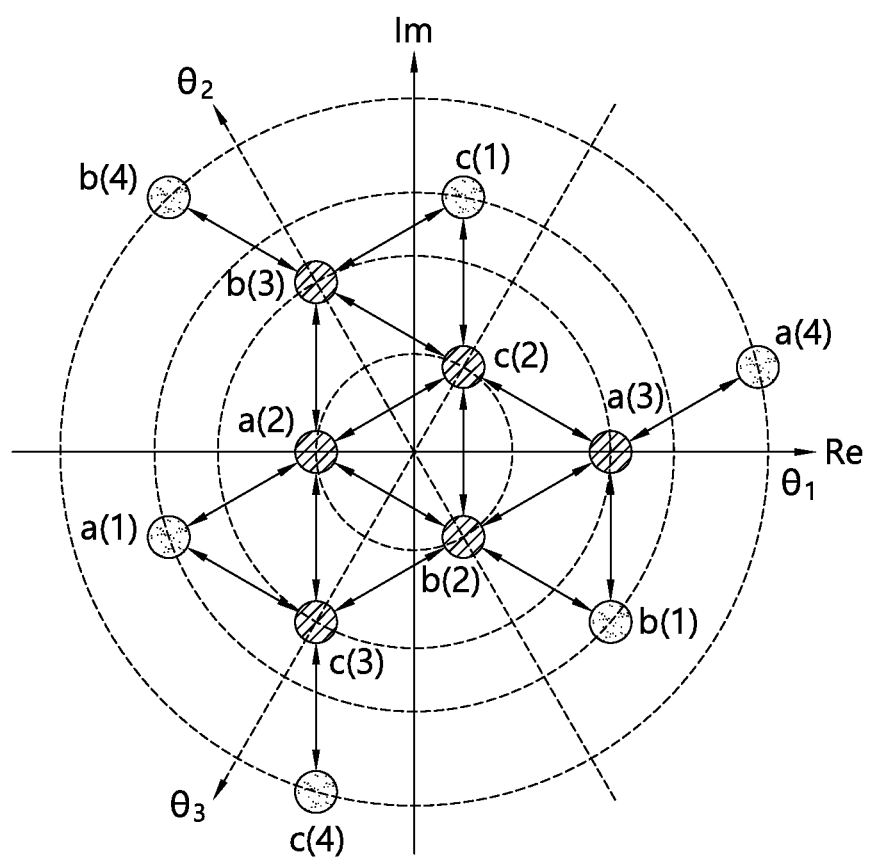
FIG. 20 shows and example of a Mother Constellation being configured by the single Asymmetric 2D Base Constellation and the Phase Rotation of FIG. 19.

Accordingly, the following Mother Constellation may be configured by the Asymmetric 2D Base Constellation and Phase Rotation. FIG. 20 shows and example of a Mother Constellation being configured by the single Asymmetric 2D Base Constellation and the Phase Rotation of FIG. 19.

Mother Constellation 1: $a=B*\exp(j*\theta_1)=B=[a(1), a(2), a(3), a(4)]$

Mother Constellation 2: $b=B*\exp(j*\theta_2)=B*\exp(j*2/3\pi)= [b(1), b(2), b(3), b(4)]$ Mother Constellation 3: $c=B*\exp(j*\theta_3)=B*\exp(j*4/3\pi)= [c(1), c(2), c(3), c(4)]$ More specifically, the Euclidean distance of the Mother constellations is optimized. Unlike in Embodiment 3, the Euclidean distance is optimized for all of the Mother constellations. When a constellation is obtained by an ML approach, the Euclidean distance is optimized for all of the constellations. Thus, when constellation superposition does not occur in a single resource by multi-users, it may be said that the Euclidean distance of a constellation is optimized.

For the optimization of Rule 2, the Constellation may be mapped to the UE specific Codebook of each user, as shown below.

Since $F(UE=1) = \begin{bmatrix} 0 \\ 1 \\ 0 \\ 1 \end{bmatrix}$, UE specific Codebook $1 = \begin{bmatrix} 0 \\ P*c^T \\ 0 \\ a \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ Since $F(UE=2) = \begin{bmatrix} 1 \\ 0 \\ 1 \\ 0 \end{bmatrix}$, UE specific Codebook $2 = \begin{bmatrix} a \\ 0 \\ P*c^T \\ 0 \end{bmatrix}$, -continued Since $F(UE = 3) = \begin{bmatrix} 1 \\ 1 \\ 0 \\ 0 \end{bmatrix}$, UE specific Codebook 3 = $\begin{bmatrix} P*b^T \\ a \\ 0 \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ Since $F(UE = 4) = \begin{bmatrix} 0 \\ 0 \\ 1 \\ 1 \end{bmatrix}$, UE specific Codebook 4 = $\begin{bmatrix} 0 \\ 0 \\ b \\ P*c^T \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ Since $F(UE = 5) = \begin{bmatrix} 1 \\ 0 \\ 0 \\ 1 \end{bmatrix}$, UE specific Codebook 5 = $\begin{bmatrix} P*c^T \\ 0 \\ 0 \\ b \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ Since $F(UE = 6) = \begin{bmatrix} 0 \\ 1 \\ 1 \\ 0 \end{bmatrix}$, UE specific Codebook 6 = $\begin{bmatrix} 0 \\ P*b^T \\ a \\ 0 \end{bmatrix}$, where $P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$ As described above, in order to enhance the UE specific Codebook decoding performance of each user, according to Rule 2, Permutation matrix P allows a Euclidean Distance between the complex vectors within the UE specific Codebook of each user to be maximized. For example, since UE specific Codebook 1 = $\begin{bmatrix} 0 \\ P*c^T \\ 0 \\ a \end{bmatrix}$, where $P = \begin{bmatrix} 0 & 0 & 0 & 0 \\ c(2) & c(4) & c(1) & c(3) \\ 0 & 0 & 0 & 0 \\ a(1) & a(2) & a(3) & a(4) \end{bmatrix}$, if the column vectors within the Codebook are given as vectors 1, 2, 3, and 4, since c(1)≠−c(4), c(2)≠−c(3), a(1)≠−a(4), and a(2)≠−a(3), a phase inversion relationship is not established between the vectors. Additionally, unlike in Embodiment 1, since conjugate(c(2))*c(4)+conjugate (a(1))*a(2)≠0, vector 1 and vector 2 are in a non-orthogonal relationship. More specifically, UE specific Codebooks may not be optimized. However, each vector may be in a near-orthogonal relationship and may have a Euclidean distance close to a Phase inversion relationship.

This may be arranged in a Factor Graph for bipartite matching, which is acquired in Rule 1, as shown below.

$$F(K = 4, J = 6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

In case of Rule 3, for the superposition of constellation (i, j, k), a total of $M^{d_f}$ number ($4^3$=64) of combinations may be indicated by the Mother Constellation and bipartite matching. These may not be optimized as in Embodiment 1.

The overall codebook may be arranged as shown below.

$$F(K = 4, J = 6) = \begin{bmatrix} 0 & a & P*b^T & 0 & P*c^T & 0 \\ P*c^T & 0 & a & 0 & 0 & P*b^T \\ 0 & P*c^T & 0 & b & 0 & a \\ a & 0 & 0 & P*c^T & b & 0 \end{bmatrix}$$

$$a = \left[-2.5 - \frac{\sqrt{3}}{2}i, -1, 2, 3.5 + \frac{\sqrt{3}}{2}i\right],$$

$$b = \left[-2.5 - \frac{\sqrt{3}}{2}i, -1, 2, 3.5 + \frac{\sqrt{3}}{2}i\right] * \exp\left(j * \frac{2}{3}\pi\right),$$

$$c = \left[-2.5 - \frac{\sqrt{3}}{2}i, -1, 2, 3.5 + \frac{\sqrt{3}}{2}i\right] * \exp\left(j * \frac{4}{3}\pi\right), P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

UE specific Codebook k=$k^{th}$ column of F matrix (e.g., UE specific Codebook 1=$1^{st}$ column of $$F \text{ matrix} = \begin{bmatrix} 0 \\ P*c^T \\ 0 \\ a \end{bmatrix})$$

Normalized Codebook Sets

| UE index k | UE specific Codebook $k = \begin{matrix} 00 & 01 & 10 & 11 \\ [vec\,1 & vec\,2 & vec\,3 & vec\,4] \end{matrix} * P_{no}$ |
|---|---|
| UE 1 | $\begin{bmatrix} 0 & 0 & 0 & 0 \\ -1*e^{j*\frac{4}{3}\pi} & \left(3.5+\frac{\sqrt{3}}{2}i\right)*e^{j*\frac{4}{3}\pi} & \left(-2.5-\frac{\sqrt{3}}{2}i\right)*e^{j*\frac{4}{3}\pi} & 2*e^{j*\frac{4}{3}\pi} \\ 0 & 0 & 0 & 0 \\ -2.5-\frac{\sqrt{3}}{2}i & -1 & 2 & 3.5+\frac{\sqrt{3}}{2}i \end{bmatrix} * P_{no}$ |
| UE 2 | $\begin{bmatrix} -2.5-\frac{\sqrt{3}}{2}i & -1 & 2 & 3.5+\frac{\sqrt{3}}{2}i \\ 0 & 0 & 0 & 0 \\ -1*e^{j*\frac{4}{3}\pi} & \left(3.5+\frac{\sqrt{3}}{2}i\right)*e^{j*\frac{4}{3}\pi} & \left(-2.5-\frac{\sqrt{3}}{2}i\right)*e^{j*\frac{4}{3}\pi} & 2*e^{j*\frac{4}{3}\pi} \\ 0 & 0 & 0 & 0 \end{bmatrix} * P_{no}$ |
| UE 3 | $\begin{bmatrix} -1*e^{j*\frac{2}{3}\pi} & \left(3.5+\frac{\sqrt{3}}{2}i\right)*e^{j*\frac{2}{3}\pi} & \left(-2.5-\frac{\sqrt{3}}{2}i\right)*e^{j*\frac{2}{3}\pi} & 2*e^{j*\frac{2}{3}\pi} \\ -2.5-\frac{\sqrt{3}}{2}i & -1 & 2 & 3.5+\frac{\sqrt{3}}{2}i \\ 0 & 0 & 0 & 0 \\ 0 & 0 & 0 & 0 \end{bmatrix} * P_{no}$ |
| UE 4 | $\begin{bmatrix} 0 & 0 & 0 & 0 \\ 0 & 0 & 0 & 0 \\ \left(-2.5-\frac{\sqrt{3}}{2}i\right)*e^{j*\frac{2}{3}\pi} & -1*e^{j*\frac{2}{3}\pi} & 2*e^{j*\frac{2}{3}\pi} & \left(3.5+\frac{\sqrt{3}}{2}i\right)*e^{j*\frac{2}{3}\pi} \\ -1*e^{j*\frac{4}{3}\pi} & \left(3.5+\frac{\sqrt{3}}{2}i\right)*e^{j*\frac{4}{3}\pi} & \left(-2.5-\frac{\sqrt{3}}{2}i\right)*e^{j*\frac{4}{3}\pi} & 2*e^{j*\frac{4}{3}\pi} \end{bmatrix} * P_{no}$ |
| UE 5 | $\begin{bmatrix} -1*e^{j*\frac{4}{3}\pi} & \left(3.5+\frac{\sqrt{3}}{2}i\right)*e^{j*\frac{4}{3}\pi} & \left(-2.5-\frac{\sqrt{3}}{2}i\right)*e^{j*\frac{4}{3}\pi} & 2*e^{j*\frac{4}{3}\pi} \\ 0 & 0 & 0 & 0 \\ 0 & 0 & 0 & 0 \\ \left(-2.5-\frac{\sqrt{3}}{2}i\right)*e^{j*\frac{2}{3}\pi} & -1*e^{j*\frac{2}{3}\pi} & 2*e^{j*\frac{2}{3}\pi} & \left(3.5+\frac{\sqrt{3}}{2}i\right)*e^{j*\frac{2}{3}\pi} \end{bmatrix} * P_{no}$ |
| UE 6 | $\begin{bmatrix} 0 & 0 & 0 & 0 \\ -1*e^{j*\frac{2}{3}\pi} & \left(3.5+\frac{\sqrt{3}}{2}i\right)*e^{j*\frac{2}{3}\pi} & \left(-2.5-\frac{\sqrt{3}}{2}i\right)*e^{j*\frac{2}{3}\pi} & 2*e^{j*\frac{2}{3}\pi} \\ -2.5-\frac{\sqrt{3}}{2}i & -1 & 2 & 3.5+\frac{\sqrt{3}}{2}i \\ 0 & 0 & 0 & 0 \end{bmatrix} * P_{no}$ |

Herein, $P_{no}$ is a matrix (M×M) that is normalized for power restriction. $P_{no}$ may be expressed in the form of an equation as follows:

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix} ..$$

At this point, $P_{no,m}=(1/|vec\,m|)\times\sqrt{K}$, for m=1, ..., M, where K=4, M=4

Embodiment 5. Codebook Extension Through Rule 5

In order to provide higher connectivity, an example of a case for extending a Bipartite matching Rule is shown. As mentioned in Rule 5, a Factor Graph of Bipartite matching derived through Embodiments 1, 2, 3 or 4 may be extended by using an Identity matrix and a Cartesian Product.

For example, since $$F(K=8, J=12) = I_{2\times 2} \times F(K=4, J=6) = \begin{bmatrix} F(K=4, J=6) & 0 \\ 0 & F(K=4, J=6) \end{bmatrix},$$

extension may be performed to $$F(K=8, J=12) = \begin{bmatrix} 0 & a & P*b^T & 0 & P*c^T & 0 & 0 & 0 & 0 & 0 & 0 & 0 \\ P*c^T & 0 & a & 0 & 0 & P*b^T & 0 & 0 & 0 & 0 & 0 & 0 \\ 0 & P*c^T & 0 & b & 0 & a & 0 & 0 & 0 & 0 & 0 & 0 \\ a & 0 & 0 & P*c^T & b & 0 & 0 & 0 & 0 & 0 & 0 & 0 \\ 0 & 0 & 0 & 0 & 0 & 0 & 0 & a & P*b^T & 0 & P*c^T & 0 \\ 0 & 0 & 0 & 0 & 0 & 0 & P*c^T & 0 & a & 0 & 0 & P*b^T \\ 0 & 0 & 0 & 0 & 0 & 0 & 0 & P*c^T & 0 & b & 0 & a \\ 0 & 0 & 0 & 0 & 0 & 0 & a & 0 & 0 & P*c^T & b & 0 \end{bmatrix}.$$

By using the same method, extension may to performed to $$F(mK, mJ) = I_{m\times m} \times F(K, J) = \begin{bmatrix} F(K, J) & \cdots & 0 \\ \vdots & \ddots & \vdots \\ 0 & \cdots & F(K, J) \end{bmatrix}.$$

By performing the above-described operation, a large-sized Factor Graph of Bipartite matching according to an increase in J and K may be used, and, although decoding complexity of the receiving end may be linearly increased, the Factor Graph of Bipartite matching may be extended without loss in the decoding performance.

The above-described Codebook Extension may be directly applied to Embodiments 1, 2, 3, and 4, and, when configuring a Normalized Codebook Set, only the Normalized values may be changed based on the K value.

Embodiment 6. Codebook Design of K=6 and J=9 by Embodiments 1, 2, 3 or 4

The Codebook design being proposed, as described above, may be equally applied to Embodiments 1, 2, and 3, according to the increase in the K value, even in a case where $$F(K=6, J=9) = \begin{bmatrix} 1 & 1 & 1 & 0 & 0 & 0 & 0 & 0 & 0 \\ 1 & 0 & 0 & 1 & 1 & 0 & 0 & 0 & 0 \\ 0 & 1 & 0 & 1 & 0 & 1 & 0 & 0 & 0 \\ 0 & 0 & 0 & 0 & 1 & 0 & 1 & 1 & 0 \\ 0 & 0 & 1 & 0 & 0 & 0 & 1 & 0 & 1 \\ 0 & 0 & 0 & 0 & 0 & 1 & 0 & 1 & 1 \end{bmatrix},$$

$d_v=2$, and $d_f=3$. However, when K=6, since a Factor Graph having a largest size maintaining $d_v=2$ is $$F(K=6, J=15) = \begin{bmatrix} 1 & 1 & 1 & 0 & 0 & 0 & 0 & 0 & 0 & 1 & 1 & 0 & 0 & 0 & 0 \\ 1 & 0 & 0 & 1 & 1 & 0 & 0 & 0 & 0 & 0 & 0 & 1 & 1 & 0 & 0 \\ 0 & 1 & 0 & 1 & 0 & 1 & 0 & 0 & 0 & 0 & 0 & 0 & 0 & 1 & 1 \\ 0 & 0 & 0 & 0 & 1 & 0 & 1 & 1 & 0 & 1 & 0 & 0 & 0 & 1 & 0 \\ 0 & 0 & 1 & 0 & 0 & 0 & 1 & 0 & 1 & 0 & 0 & 1 & 0 & 0 & 1 \\ 0 & 0 & 0 & 0 & 0 & 1 & 0 & 1 & 1 & 0 & 1 & 0 & 1 & 0 & 0 \end{bmatrix},$$

$d_f=5$. Therefore, the number of cases for selecting 9 column vectors in F(K=6, J=15) so that $d_f=3$ may become various. However, regardless of which column vector combination is selected, it will be apparent that the selected column vector combination may be equally applied to the Embodiments 1, 2, 3, and 4.

When it is said that the Codebook design is performed as $$F(K=6, J=9) = \begin{bmatrix} 1 & 1 & 1 & 0 & 0 & 0 & 0 & 0 & 0 \\ 1 & 0 & 0 & 1 & 1 & 0 & 0 & 0 & 0 \\ 0 & 1 & 0 & 1 & 0 & 1 & 0 & 0 & 0 \\ 0 & 0 & 0 & 0 & 1 & 0 & 1 & 1 & 0 \\ 0 & 0 & 1 & 0 & 0 & 0 & 1 & 0 & 1 \\ 0 & 0 & 0 & 0 & 0 & 1 & 0 & 1 & 1 \end{bmatrix},$$

the overall Codebook may be designed, as shown below, through the exemplary Base Constellation and Phase Rotation shown in Embodiments 1 and 2.

$$F(K=6, J=9) = \begin{bmatrix} a & b & P*c^T & 0 & 0 & 0 & 0 & 0 & 0 \\ P*b^T & 0 & 0 & P*c^T & a & 0 & 0 & 0 & 0 \\ 0 & P*c^T & 0 & b & 0 & a & 0 & 0 & 0 \\ 0 & 0 & 0 & 0 & P*b^T & 0 & a & P*c^T & 0 \\ 0 & 0 & a & 0 & 0 & 0 & P*c^T & 0 & b \\ 0 & 0 & 0 & 0 & 0 & P*b^T & 0 & a & P*c^T \end{bmatrix}$$

Method of Embodiment 1: a=[−3, −1, 1, 3], b=[−3, −1, 1, 3]*exp(j*⅓π), c=[−3, −1, 1, 3]*exp(j*⅔π), $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Method of Embodiment 2: a=[−3, −1, 1, 3], b=[−3*√5, −1*√5, 1*√5, 3*√5]*exp(j*⅓π), c=[−3*√5, −1*√5, 1*√5, 3*√5]*exp(j*⅔π), $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Method of Embodiment 3: a=[−4, −1, 2, 5], b=[−4, −1, 2, 5]*exp(j*⅔π), c=[−4, −1, 2, 5]*exp(j*⁴⁄₃π), $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

Method of Embodiment 4: a=[−2.5−√3⁄2 i, −1, 2, 3.5+√3⁄2 i], b=[−2.5−√3⁄2 i, −1, 2, 3.5+√3⁄2 i]*exp(j*⅔π), c=[−2.5−√3⁄2 i, −1, 2, 3.5+√3⁄2 i]*exp(j*⁴⁄₃π), $$P = \begin{bmatrix} 0 & 0 & 1 & 0 \\ 1 & 0 & 0 & 0 \\ 0 & 0 & 0 & 1 \\ 0 & 1 & 0 & 0 \end{bmatrix}$$

UE specific Codebook k=kth column of F matrix (e.g., UE specific Codebook 1=1st column of $$F \text{ matrix} = \begin{bmatrix} a \\ P*b^T \\ 0 \\ 0 \\ 0 \\ 0 \end{bmatrix})$$

Normalized Codebook Sets (in Case of Embodiment 1)

UE specific Codebook $k = \begin{matrix} 00 & 01 & 10 & 11 \\ [vec\,1 & vec\,2 & vec\,3 & vec\,4] \end{matrix} * P_{no}$ UE index k UE 1
$$\begin{bmatrix} -3 & -1 & 1 & 3 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ 0 & 0 & 0 & 0 \\ 0 & 0 & 0 & 0 \\ 0 & 0 & 0 & 0 \\ 0 & 0 & 0 & 0 \end{bmatrix} * P_{no}$$

UE 2
$$\begin{bmatrix} -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ 0 & 0 & 0 & 0 \\ 0 & 0 & 0 & 0 \end{bmatrix} * P_{no}$$

UE 3
$$\begin{bmatrix} -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ 0 & 0 & 0 & 0 \\ 0 & 0 & 0 & 0 \\ -3 & -1 & 1 & 3 \\ 0 & 0 & 0 & 0 \end{bmatrix} * P_{no}$$

UE 4
$$\begin{bmatrix} 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ 0 & 0 & 0 & 0 \\ 0 & 0 & 0 & 0 \\ 0 & 0 & 0 & 0 \end{bmatrix} * P_{no}$$

UE 5
$$\begin{bmatrix} 0 & 0 & 0 & 0 \\ -3 & -1 & 1 & 3 \\ 0 & 0 & 0 & 0 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \\ 0 & 0 & 0 & 0 \\ 0 & 0 & 0 & 0 \end{bmatrix} * P_{no}$$

UE 6
$$\begin{bmatrix} 0 & 0 & 0 & 0 \\ 0 & 0 & 0 & 0 \\ -3 & -1 & 1 & 3 \\ 0 & 0 & 0 & 0 \\ 0 & 0 & 0 & 0 \\ -1*e^{j*\frac{1}{3}\pi} & 3*e^{j*\frac{1}{3}\pi} & -3*e^{j*\frac{1}{3}\pi} & 1*e^{j*\frac{1}{3}\pi} \end{bmatrix} * P_{no}$$

-continued $$\text{UE specific Codebook } k = \begin{matrix} & 00 & 01 & 10 & 11 \\ & [vec\,1 & vec\,2 & vec\,3 & vec\,4] * P_{no} \end{matrix}$$

UE index k

UE 7
$$\begin{bmatrix} 0 & 0 & 0 & 0 \\ 0 & 0 & 0 & 0 \\ 0 & 0 & 0 & 0 \\ -3 & -1 & 1 & 3 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \end{bmatrix} * P_{no}$$

UE 8
$$\begin{bmatrix} 0 & 0 & 0 & 0 \\ 0 & 0 & 0 & 0 \\ 0 & 0 & 0 & 0 \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \\ 0 & 0 & 0 & 0 \\ -3 & -1 & 1 & 3 \end{bmatrix} * P_{no}$$

UE 9
$$\begin{bmatrix} 0 & 0 & 0 & 0 \\ 0 & 0 & 0 & 0 \\ 0 & 0 & 0 & 0 \\ 0 & 0 & 0 & 0 \\ -3*e^{j*\frac{1}{3}\pi} & -1*e^{j*\frac{1}{3}\pi} & 1*e^{j*\frac{1}{3}\pi} & 3*e^{j*\frac{1}{3}\pi} \\ -1*e^{j*\frac{2}{3}\pi} & 3*e^{j*\frac{2}{3}\pi} & -3*e^{j*\frac{2}{3}\pi} & 1*e^{j*\frac{2}{3}\pi} \end{bmatrix} * P_{no}$$

Herein, $P_{n0}$ is a matrix (M×M) that is normalized for power restriction. $P_{no}$ may be expressed in the form of an equation as follows:

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix} ..$$

At this point, $P_{no,m} = (1/|vec\,m|) \times \sqrt{K}$, for m=1, ..., M, where K=4, M=4.

The Normalized Codebook Set may be equally applied to Embodiments 2, 3, and 4, and when configuring a Normalized Codebook Set, only the Normalized values may be changed based on the K value.

Embodiment 7. MPA Decoder Performance Results by Embodiment 1 and Embodiments 2, 3, and 4

Figure 21:
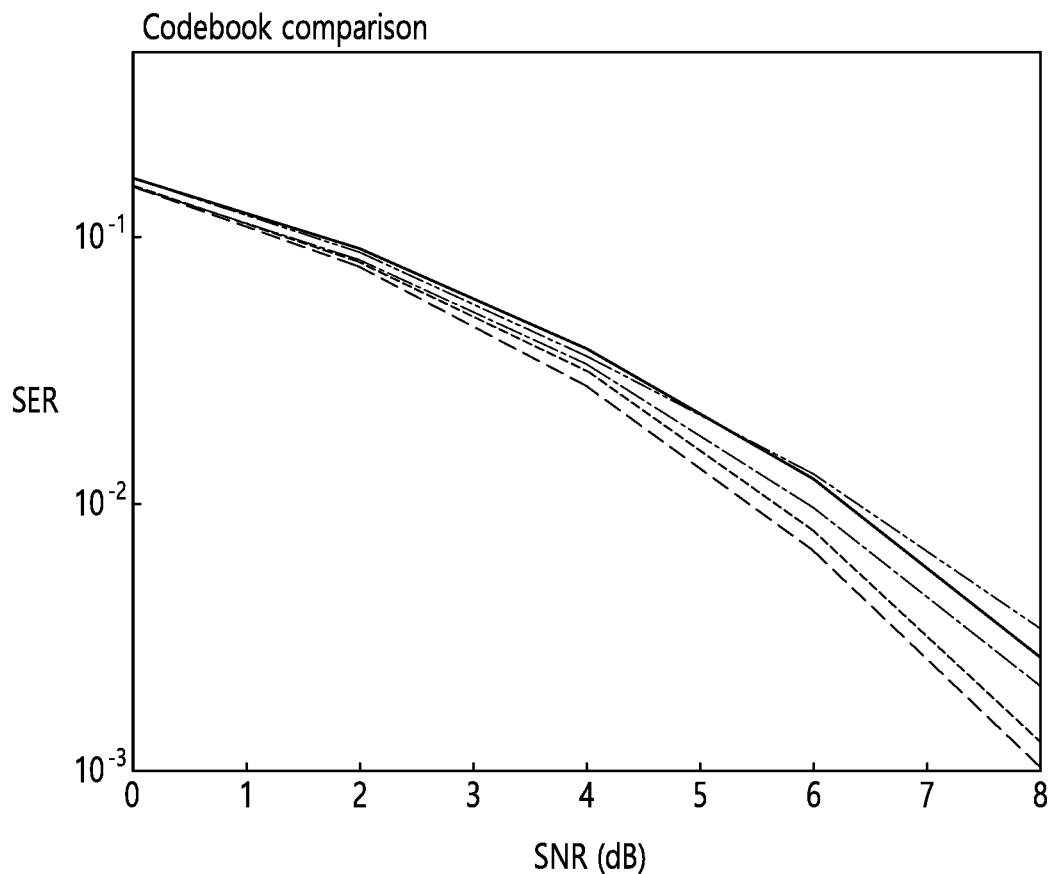
FIG. 21 is a graph showing MPA decoder performance results according first to fourth embodiments.

FIG. 21 is a graph showing MPA decoder performance results according first to fourth embodiments. (Reference System—conventional codebook, A type—Embodiment 1, B type—Embodiment 2, C type—Embodiment 3, D type—Embodiment 4)

The results of FIG. 21 indicate a Symbol Error Rate (SER) of an AWGN environment, when using a multi-user superposed access method through a Codebook according to Embodiment 1 and Embodiments 2, 3, and 4. The proposed codebooks have more outstanding SER performances as compared to the already-presented codebooks, which are derived through computer simulation.

It will be apparent that all of the above-described embodiments can generate a Codebook not only as a single Codebook but also through a combination among the embodiments. For example, a Codebook design may be performed based on an Asymmetric Multiple Base Constellation according to a combination of the Asymmetric Base Constellation of Embodiment 3 and the Multiple Base Constellation of Embodiment 2.

In all of the above-described methods and examples, it will be apparent that a codeword, which is a column vector of the Codebook being used by the transmitting end, is normalized by a transmission power.

It will be apparent that the Codebook design method, which is proposed in all of the above-described embodiments, will not be limited only to the above-described embodiments. Therefore, it will be apparent that anyone being skilled and having ordinary knowledge in the field may derive other combination results (Linear Combination of a Factor Graph, or Linear Scaling of a Mother Constellation, and so on) by using the same design method.

Method 2. Signal Flow for Multi-Dimensional Modulation Based NoMA

In order to perform Method 1, a method of performing Codebook information exchange and Signaling for Multi-dimensional Modulation based NoMA is needed. Proposed in the present method is the method of performing Codebook information exchange and Signaling for Multi-dimensional Modulation based NoMA, which is proposed in Method 1.

2.1. Scheduling Based Transmission

Figure 22:
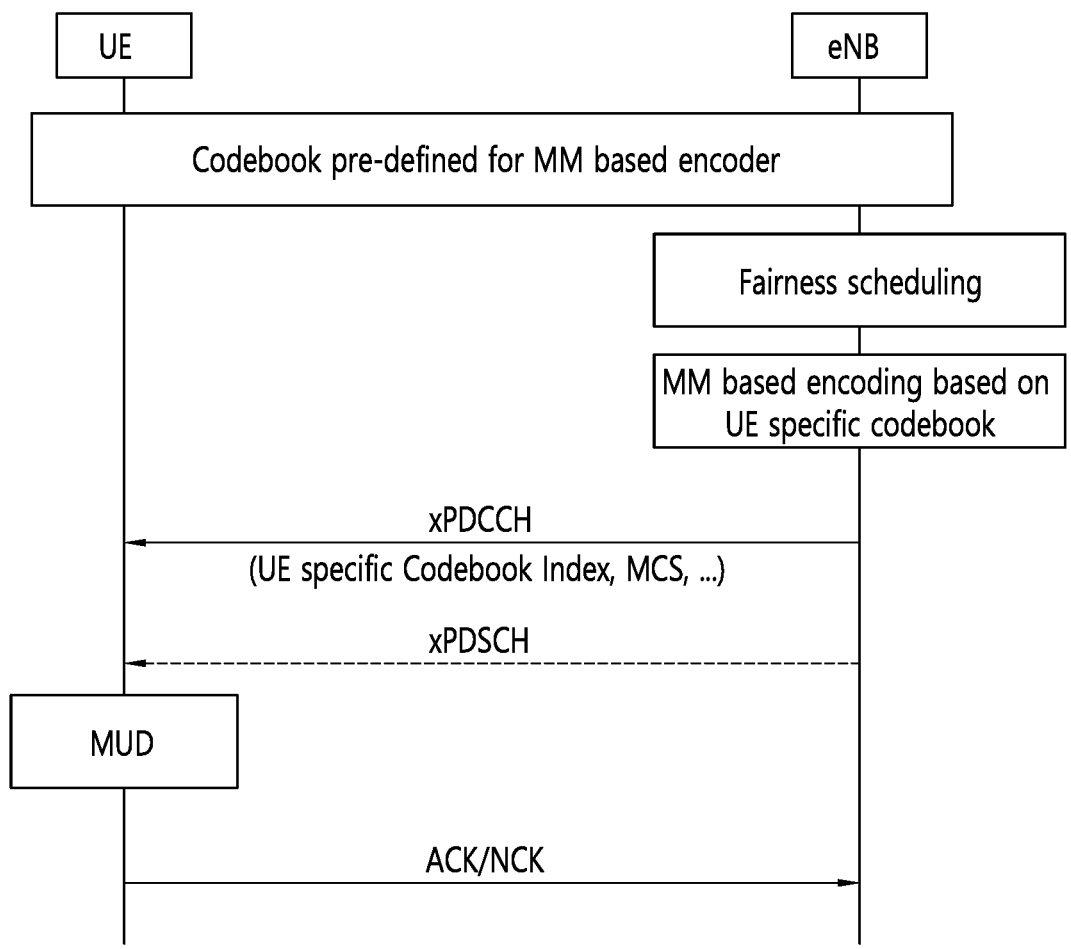
FIG. 22 shows a flow chart for transmitting a UE specific Codebook Index via control signaling in a downlink MM based NoMA system.

FIG. 22 shows a flow chart for transmitting a UE specific Codebook Index via control signaling in a downlink MM based NoMA system. And, FIG. 23 shows a flow chart for transmitting a UE specific Codebook Index via control signaling in an uplink MM based NoMA system.

Figure 23:
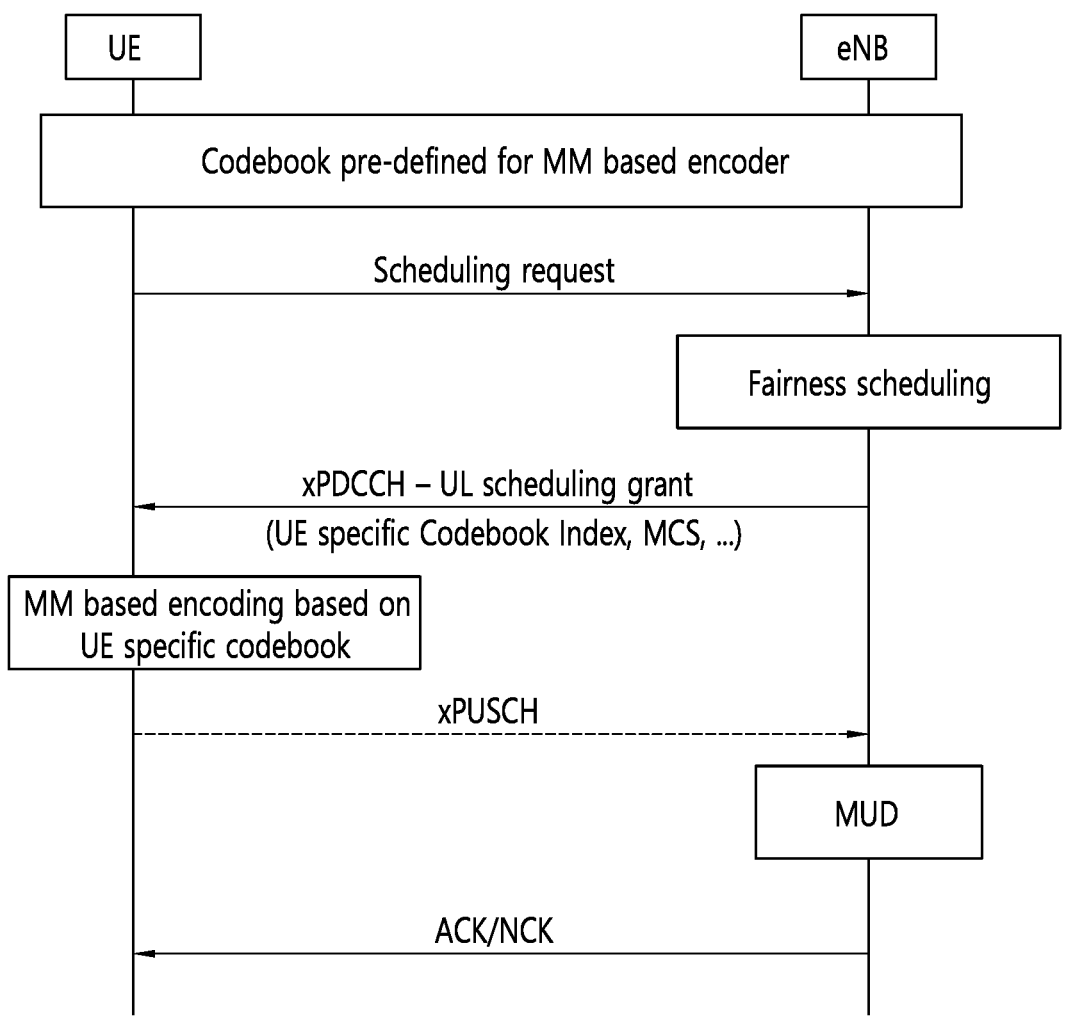
FIG. 23 shows a flow chart for transmitting a UE specific Codebook Index via control signaling in an uplink MM based NoMA system.

FIG. 22 and FIG. 23 show Downlink and Uplink Signal Flows of a MM based NoMA system. A user and a base station have MM based Codebook Set information that is pre-defined in advance. Herein, the MM based Codebook Set information exists as a set of UE specific Codebooks, and embodiments proposed in Method 1 may be used. At this point, there may exist various methods for having the pre-defined MM based Codebook Set information. For example, 1. An overall MM based Codebook Set, which is pre-arranged in advance, is stored via Offline.

2. The user may receive the overall MM based Codebook Set via RRC signaling in a step of performing initial access to a base station, a step of performing RRC, and so on.

In the above-described case, the user may receive only a UE specific Codebook Index via Control Signaling (e.g., xPDCCH or xPUCCH, and so on), thereby being capable of using the corresponding UE specific Codebook or the overall Codebook for performing Downlink signal decoding or Uplink signal transmission.

Figure 24:
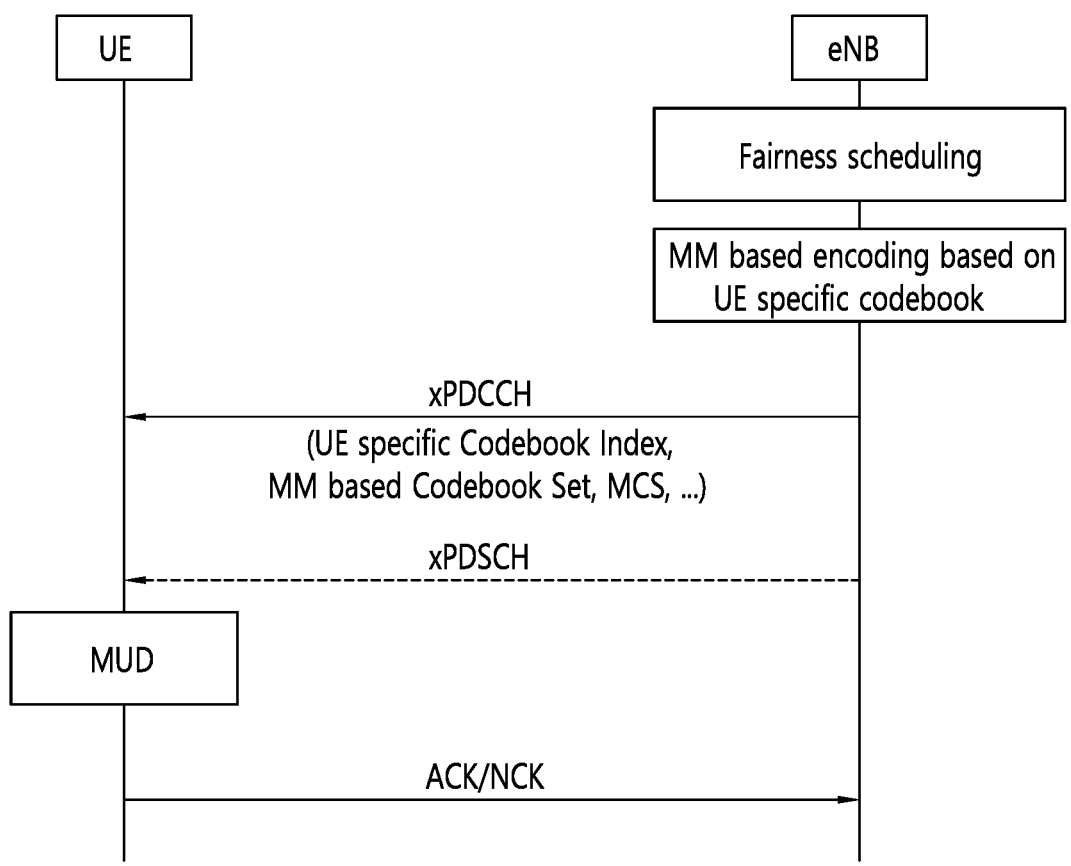
FIG. 24 shows a flow chart for transmitting a UE specific Codebook Index and a MM based Codebook Set via control signaling in a downlink MM based NoMA system.
Figure 25:
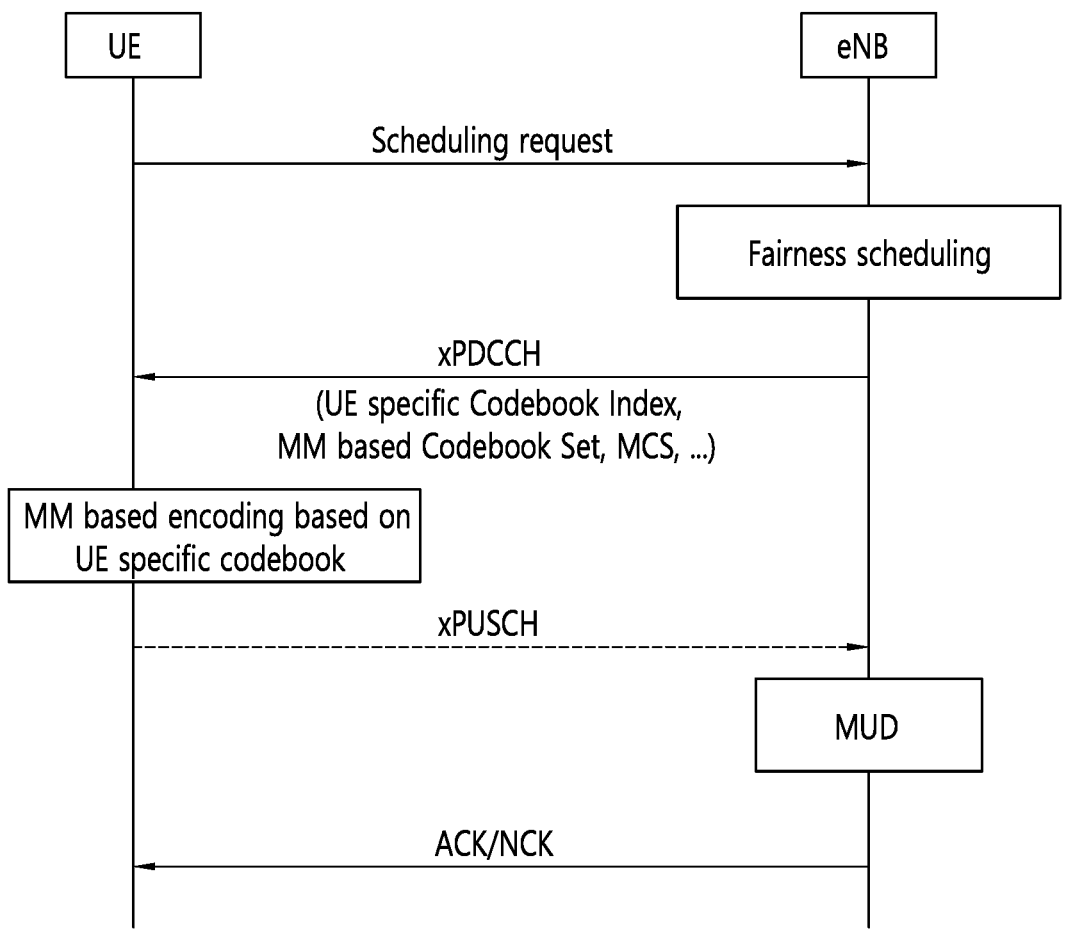
FIG. 25 shows a flow chart for transmitting a UE specific Codebook Index and a MM based Codebook Set via control signaling in an uplink MM based NoMA system.

Alternatively, as shown in FIG. 24 and FIG. 25, the UE specific Codebook Index and the overall MM based Codebook Set of each user may be received via Control Signaling when performing Downlink or Uplink. FIG. 24 shows a flow chart for transmitting a UE specific Codebook Index and a MM based Codebook Set via control signaling in a downlink MM based NoMA system. And, FIG. 25 shows a flow chart for transmitting a UE specific Codebook Index and a MM based Codebook Set via control signaling in an uplink MM based NoMA system.

More specifically, when a DL or UL information transmission request occurs, a Codebook Index corresponding to a UE Specific Codebook of each user may be transmitted to the user as Control information via Fairness Scheduling of the base station. The user uses the UE Specific Codebook for modulation or demodulation through the received Codebook Index. At this point, a number of Codebooks being allocated to each user may be equal to 1 codebook or may be equal to two or more codebooks. More specifically, it will be apparent that, in case of a user requiring a high Data Rate, two or more symbols may be simultaneously transmitted through two or more codebooks, so that two or more symbols can be demodulated in the receiving end. Additionally, J and K values, which determine the dimension of a Codebook, may be changed based on the system environment. The Codebook according to the changes in J and K may be generated or pre-defined according to a method proposed in Method 1.

The base station may perform Resource Management based on Fairness Scheduling, and the base station may determine a MCS level by using a MUI value obtained by the Codebook properties or an expected demodulation error rate. The base station may perform Fairness Scheduling based on the determined MCS level.

2.2. Contention Based Transmission

Figure 26:
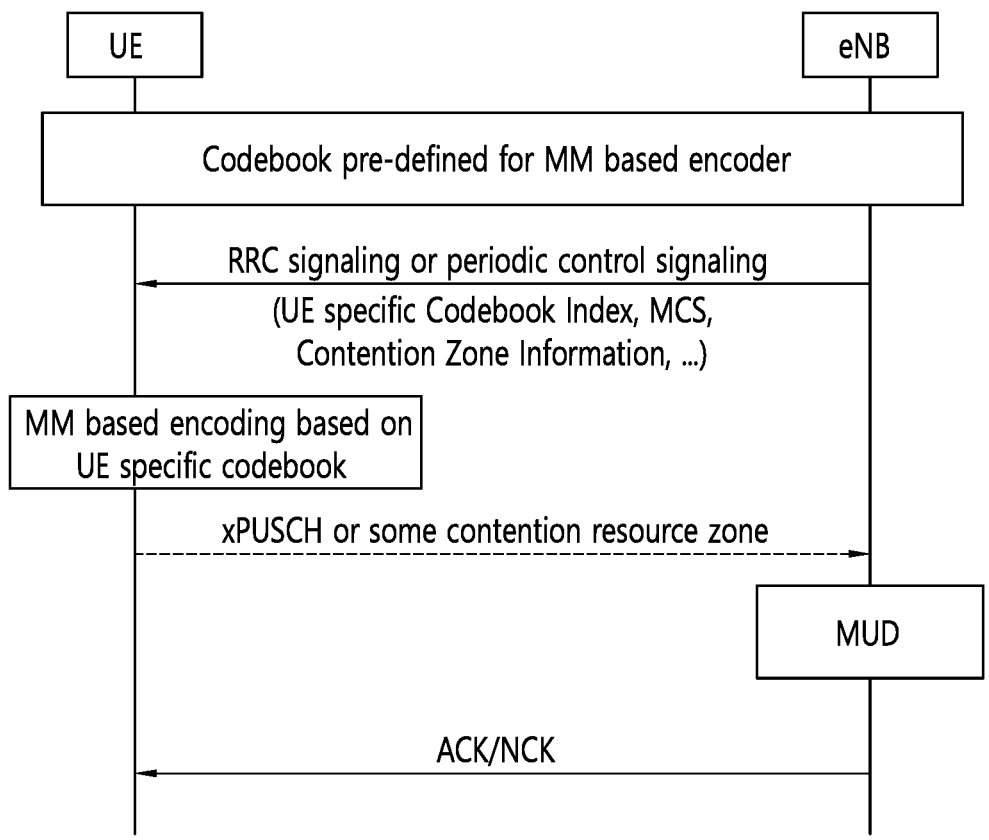
FIG. 26 shows a flow chart for performing UE specific Codebook allocation based contention based transmission in a MM based NoMA system.

FIG. 26 shows a flow chart for performing UE specific Codebook allocation based contention based transmission in a MM based NoMA system. And, FIG. 27 shows a flow chart for performing UE specific Codebook selection based contention based transmission in a MM based NoMA system.

Figure 27:
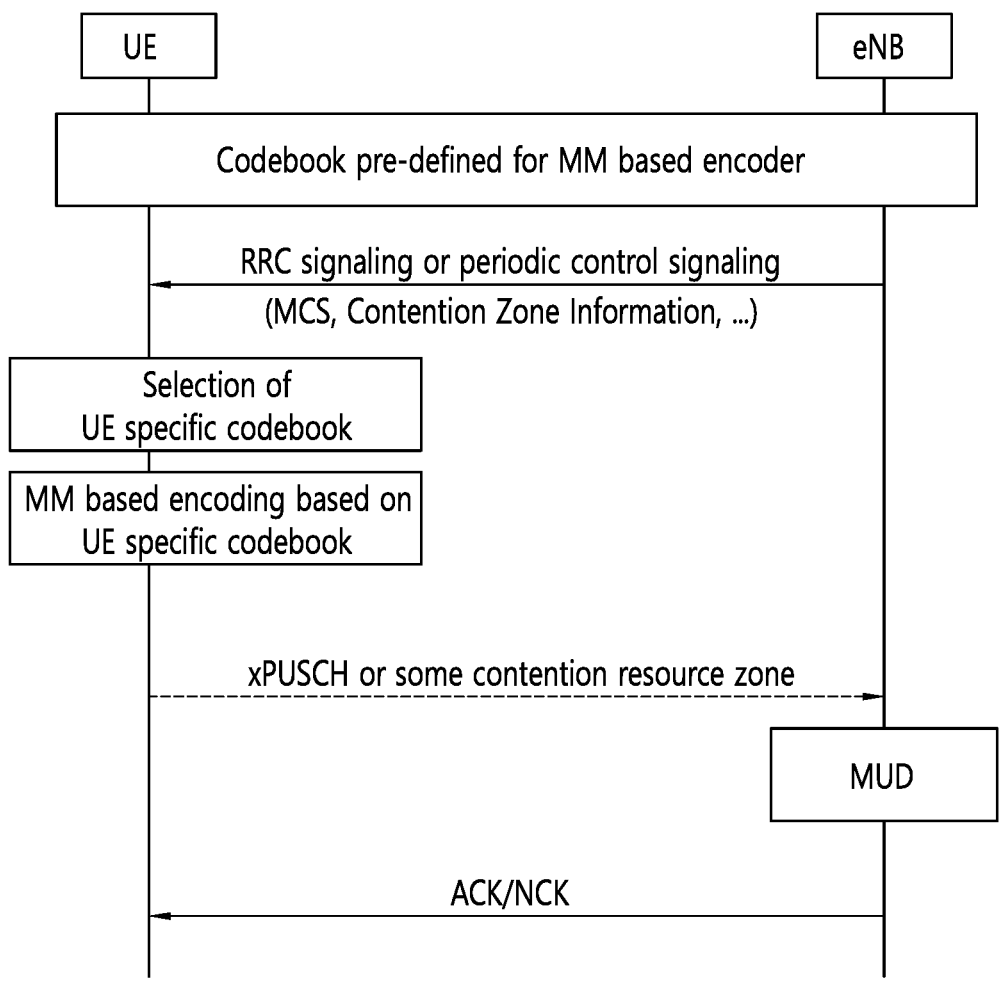
FIG. 27 shows a flow chart for performing UE specific Codebook selection based contention based transmission in a MM based NoMA system.

FIG. 26 and FIG. 27 show signal flows for a case where the base station allocates in advance a UE specific Codebook and a case where the user selects a UE specific Codebook during a Contention based transmission of a MM based NoMA system. At this point, the user and the base station have MM based Codebook Set information that is pre-defined in advance. Herein, the MM based Codebook Set information exists as a set of UE specific Codebooks, and embodiments proposed in Method 1 may be used. At this point, there may exist various methods for having the pre-defined MM based Codebook Set information. For example, 1. An overall MM based Codebook Set, which is pre-arranged in advance, is stored via Offline.

2. The user may receive the overall MM based Codebook Set via RRC signaling in a step of performing initial access to a base station, a step of performing RRC, and so on.

In the above described case, the user receives pre-defined information for Contention based transmission (MCS for Contention based transmission, Contention Resource Zone, Power Control) via RRC Signaling or Periodic Control Signaling, and so on. At this point, a UE specific Codebook Index may be received, and the user may perform MM based Encoding based on the UE specific Codebook Index, which is pre-allocated in advance, and may then perform Contention based Transmission. Conversely, in case the UE specific Codebook Index is not pre-allocated in advance, the user performs MM based Encoding by selecting a UE specific Codebook Index according to a predetermined rule and then performs Contention based Transmission. Various methods for selecting the UE specific Codebook Index may exist, such as (1) Randomly Selection, (2) UE specific Codebook Index(k)=mod(C-RNTI(k), Maximum Codebook Index), and so on. The base station performs MUD by Blind Detection without knowing which user has performed transmission to the Contention Zone, and, then, the base station decodes the received signal. At this point, a user may be specified by using a CRC check of the decoded signal and C-RNTI information included in the decoded signal.

In the present method, although the description is given based on Downlink and Uplink, and Contention based Transmission of a Cellular system, it will be apparent that the present method may also be applied to all systems using a multi-user access scheme, such as Machine Type Communication (MTC), Device-to-Device (D2D), Vehicle-to-Everything (V2X), and so on. Additionally, it will also be apparent that the Codebook properties may be used in a multi-antenna communication system using Multiple Input Multiple Output properties, in addition to the multi-user access schemes, or used as a Codebook for performing Multi-Layer/Hierarchical Layer transmission in Broadcasting.

In the Multi-dimensional Modulation based NoMA scheme, a design of a MM based Encoder determines a decoding performance of a receiving end. However, a MM based Encoder based Codebook design rule or an optimized codebook, which considers only the decoding performance of the receiving end, is not designed while considering the PAPR of a transmitting end. Due to problems of Power amp, and so on, of cell-edge users or devices, the PAPR issue of the transmitting end may be an important design issue.

Therefore, the present specification proposes a method for achieving PAPR reduction, a Codebook design method, and an optimized Codebook in the MM based Encoder based Codebook design method.

Method 1. Transceiver Design of MM Based NoMA for PAPR Reduction

Figure 28:
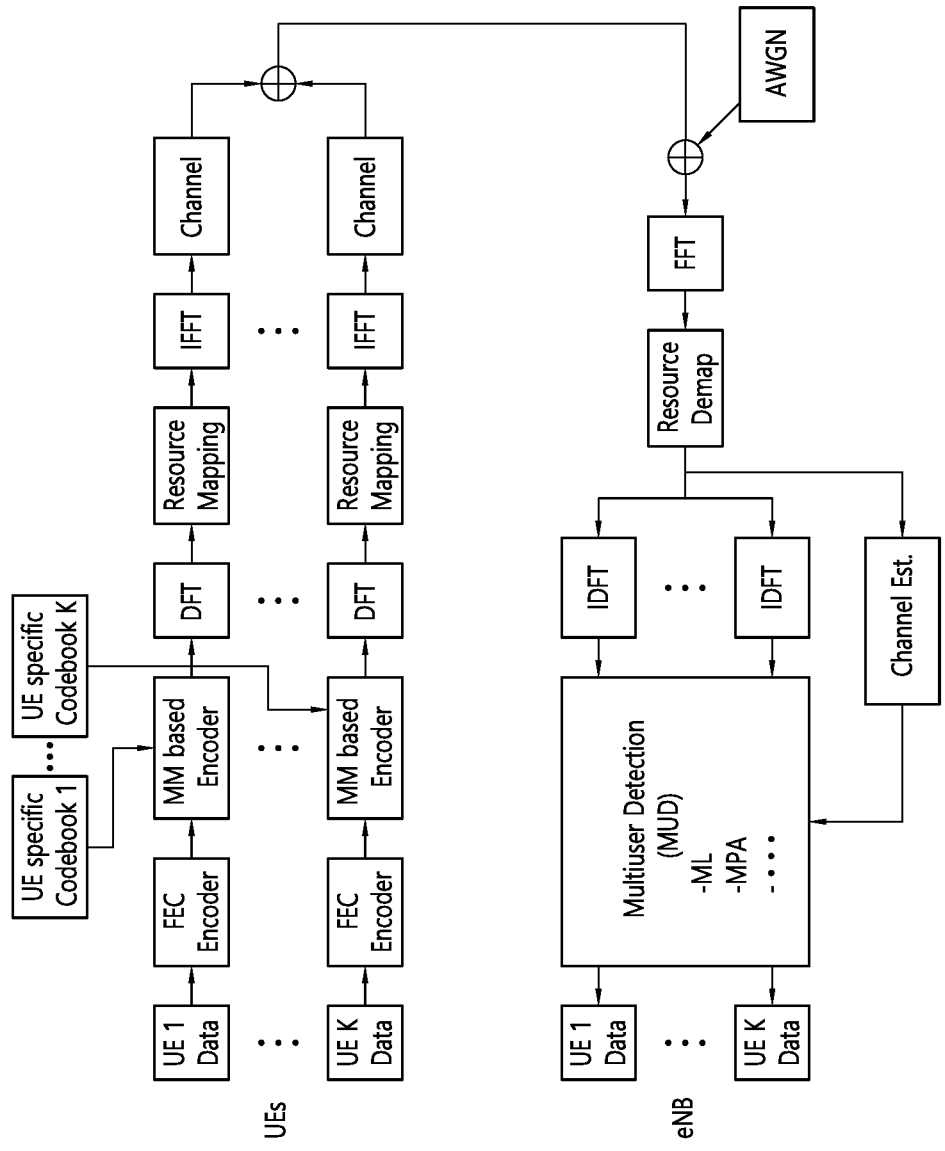
FIG. 28 shows an example of a Transceiver Design for PAPR Reduction in a MM based NoMA system.

A Transceiver Design for PAPR Reduction of a Multi-dimensional Modulation based NoMA scheme is as shown in FIG. 28. FIG. 28 shows an example of a Transceiver Design for PAPR Reduction in a MM based NoMA system.

In FIG. 28, based on a UE Specific Codebook for PAPR reduction, each transmitting end (UE) generates a transmission signal to the MM based Encoder. As a Time Domain signal, in the generated signal, a Coded bit may be configured of a Complex Modulated Symbol and a Zero Symbol according to the UE Specific Codebook. The generated Time Domain signal may be converted to a Frequency signal through DFT and may then be mapped to each Subcarrier via Resource Mapping. Accordingly, the transmitting end converts the Frequency signal back to a Time signal via IFFT based on a transmitting bandwidth and transmits the converted Time signal through a channel.

The receiving end (base station) performs FFT conversion on the received Time Domain signal and converts the signal to a Frequency signal and then compensates a channel effect through Channel Equalization (e.g., MMSE, ZF, . . . ) that is adequate for each transmitting end, and, then, converts the frequency signal based to the Time Domain signal via IDFT. Accordingly, in order to estimate a transmission signal based on the interference between the Time signals corresponding to each transmitting end, the data being transmitted from each transmitting end via Multiuser Detection is decoded.

In the above-described methods, a DFT size and an IFFT size may be different, and an FFT size and an IDFT size of the receiving end may be re-converted to the sizes used in the transmitting end.

The present specification proposes, for a PAPR reduction effect, a method of applying a MM based Encoder based NoMA technique in the Time Domain, using a UE specific Codebook considering DFT Processing, performing transmission after DFT and IFFT processing.

Additionally, when a UE specific Codebook considering DFT Processing is indicated or allocated, the UE activates a DFT Block and performs transmission.

Method 2. Codebook Design of MM Based NoMA for PAPR Reduction

A method for designing an overall Codebook Set of a UE specific codebook, a method for exchanging optimized Codebook set and Codebook information, and a signaling method are as described below. For a Codebook of a MM based NoMA scheme, a Codebook shall be designed based on the procedures described below.

1. (Conventional Rules) Generate a Codebook according to a Rule considering decoding performance and decoding complexity, and Contention based MA operation of MM based NoMA.

A. Follow the above-mentions (Rule 1) to (Rule 5).

B. However, since a NP-hard Problem satisfies all of the above-described conditions, Relaxation is performed on part of the Rule, so that a method for enhancing the decoding rate of a multi-user superposed signal via ML or MPA of the receiving end can be considered.

2. (Additional Rules for PAPR Reduction)

A. (Rule 6) Equalize a Mother Constellation size using DFT properties i. By equalizing the size of a Coefficient of all Mother Constellations being used for configuring a UE specific Codebook to a single size (e.g., |coefficient i|=|coefficient j|, for all i, j), a range of fluctuation (or change) in a Time Sample size of the transmitting end may be limited.

1. Herein, a Mother Constellation indicates coefficients excluding the Zero Coefficient.

2. Herein, |x| means a magnitude of x.

Figure 29:
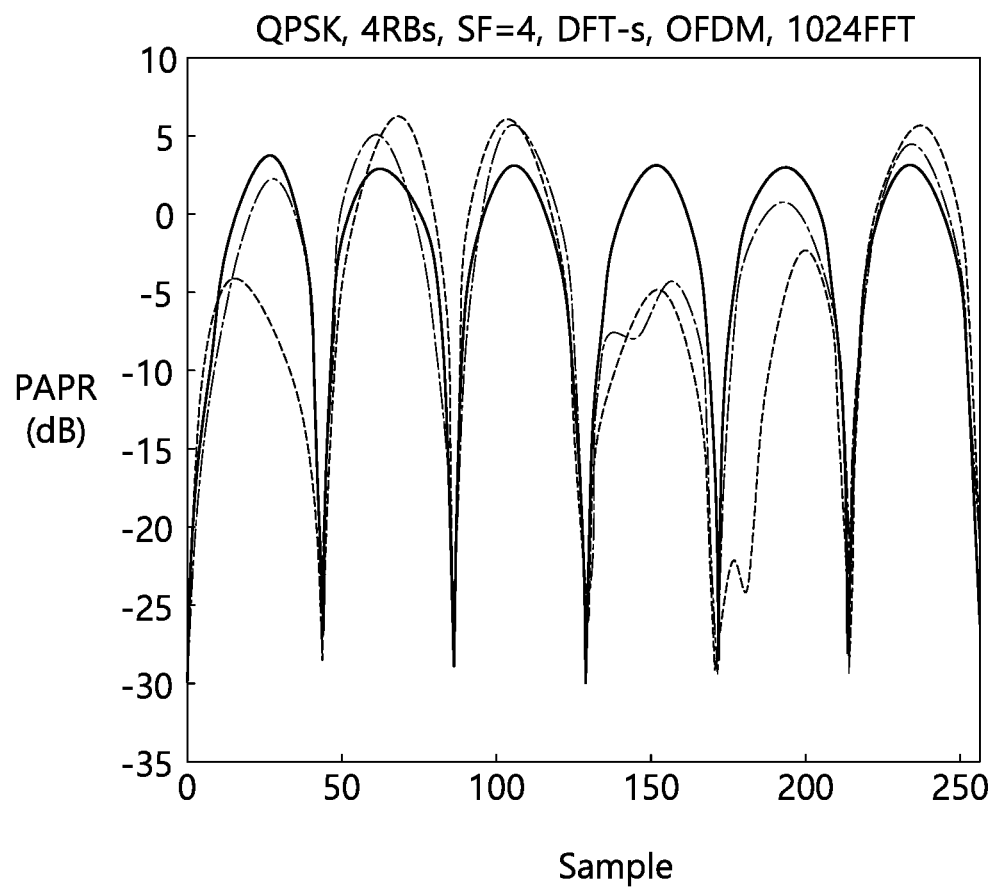
FIG. 29 is a graph showing a PAPR in view of a time sample by comparing an Unequal Power Case to an Equal Power Case.

For example, when a Mother Constellation is given as [a(1) a(2) a(3) a(4)] according to the Conventional Rules, the sizes of a(1) and a(2) may be different. In order to design a Mother Constellation for PAPR Reduction, $|a(1)|^2=|a(2)|^2=|a(3)|^2=|a(4)|^2$ may be configured. In the drawing shown below, Unequal Power Case 1 is $|a(1)|^2=|a(4)|^2=0.3019$ and $|a(2)|^2=|a(3)|^2=3.6981$, and Unequal Power Case 2 is $|a(1)|^2=|a(4)|^2=2.7692$ and $|a(2)|^2=|a(3)|^2=1.2308$. Conversely, an Equal Power Coefficient is $|a(1)|^2=|a(2)|^2=|a(3)|^2=|a(4)|^2=1$. Accordingly, PAPR properties in view of the Time Sample of the transmitting end may be indicated to have the same properties as FIG. 29. FIG. 29 is a graph showing a PAPR in view of a time sample by comparing an Unequal Power Case to an Equal Power Case. Referring to FIG. 29, in case of the Equal Power Case, it can be known that a maximum peak value in view of the Time Sample is more decreased than the Unequal Power Case.

B. (Rule 7) Cancel a Time Sample by using Phase inversion of a Coefficient in each Codeword of the UE specific Codebook.

i. Proposed herein a is method for reducing a Peak Power of the Time Sample based on a Phase inversion format between nearest Coefficients within the Codeword of a Time Domain Signal.

1. For example, in case 4 coefficients exists, the coefficients may be [1; −1; 1; −1].

ii. For example, when it is given that a Codeword included in a UE specific Codebook according to the Conventional Rules is [a(1); 0; c(1); 0], a phase of a(1) and a phase of c(1) are determined by the decoding performance of the conventional rules. When the phase of a(1) and the phase of c(1) are in a 180° relationship (phase inversion relationship, a(1)=−c(1)), a sum of phase inversions of a Sinusoid curve, which determines the Time Sample of the transmitting end, may be cancelled. More specifically, the size of the Time Sample may be configured to have an equal form.

iii. Relaxation may be performed on the Rule for orthogonality between Codewords within the UE specific Codebook. For example, a phase of a(1) and a phase of c(1) may be in a 90° relationship (a(1)=c(1)*exp(−j*pi/2)).

The above-mentioned Codebook design is a NP-hard Problem as a Non-convex optimization problem. Therefore, it is difficult to perform an optimal Codebook design that can satisfy all conditions. Therefore, through the following embodiments, a method of reducing PAPR of the transmitting end by performing Relaxation on part of the rules may be considered.

Embodiment 7. Optimization of Rule 6 and Relaxation of Rule 7 (Set 1)

In the present embodiment, Rule 1 is optimized for a case where, as described above, $$F(K = 4, J = 6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the Factor Graph, which is presented above, it will be apparent that the properties of Rule 1 do not change even though Rule 1 is changed by a linear combination of each column vector or row vector.

Figure 30:
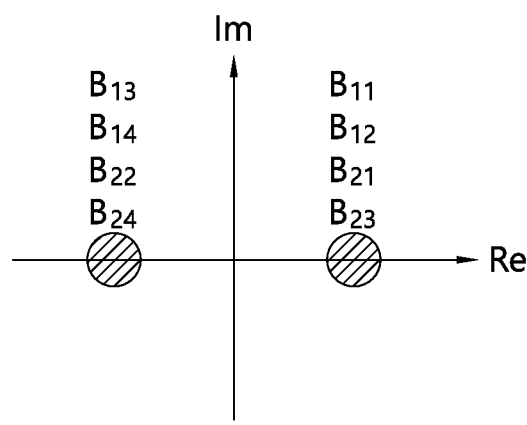
FIG. 30 shows an example of two Base Constellations and a Phase Rotation for an optimization of Rule 6.

Firstly, in order to optimize Rule 6, two Base Constellations and a Phase Rotation are proposed. FIG. 30 shows an example of two Base Constellations and a Phase Rotation for an optimization of Rule 6.

Base Constellation: B1=[$B_{11}$, $B_{12}$, $B_{13}$, $B_{14}$], where $B_{11}=1$, $B_{12}=1$, $B_{13}=-1$, $B_{14}=-1$.

Base Constellation: B2=[$B_{21}$, $B_{22}$, $B_{23}$, $B_{24}$], where $B_{21}=1$, $B_{22}=-1$, $B_{23}=1$, $B_{24}=-1$.

Phase Rotation:

$$\theta_i = \frac{i-1}{d_f} * \pi, \text{ where } i = 1, \ldots d_f$$

Figure 31:
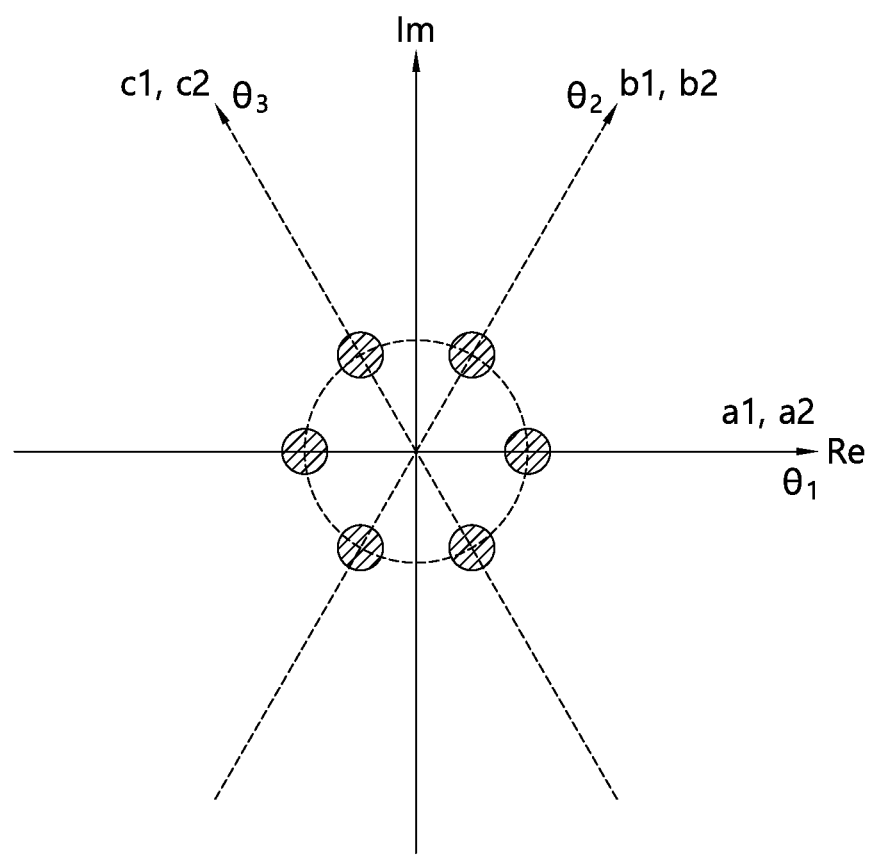
FIG. 31 shows an example of a Mother Constellation being configured by the Base Constellations and the Phase Rotation of FIG. 30.

Accordingly, the following Mother Constellation may be configured by the Base Constellations and Phase Rotation. FIG. 31 shows an example of a Mother Constellation being configured by the Base Constellations and the Phase Rotation of FIG. 30.

Mother Constellation 1: a1=B1*exp(j*$\theta_1$)=B1=[a1(1), a1(2), a1(3), a1(4)]

Mother Constellation 2: a2=B2*exp(j*$\theta_1$)=B2=[a2(1), a2(2), a2(3), a2(4)]

Mother Constellation 3: b1=B1*exp(j*$\theta_2$)=B1*exp(j*⅓π)=[b1(1), b1(2), b1(3), b1(4)]

Mother Constellation 4: b2=B2*exp(j*$\theta_2$)=B2*exp(j*⅓π)=[b2(1), b2(2), b2(3), b2(4)]

Mother Constellation 5: c1=B1*exp(j*$\theta_3$)=B1*exp(j*⅔π)=[c1(1), c1(2), c1(3), c1(4)]

Mother Constellation 6: c2=B2*exp(j*$\theta_3$)=B2*exp(j*⅔π)=[c2(1), c2(2), c2(3), c2(4)]

For the optimization of Rule 2, the Constellation may be mapped to the UE specific Codebook of each user, as shown below.

$$\text{Since } F(UE = 1) = \begin{bmatrix} 0 \\ 1 \\ 0 \\ 1 \end{bmatrix}, UE \text{ specific Codebook } 1 = \begin{bmatrix} 0 \\ a1 \\ 0 \\ a2 \end{bmatrix}$$

Since $F(UE=2) = \begin{bmatrix} 1 \\ 0 \\ 1 \\ 0 \end{bmatrix}$, UE specific Codebook 2 = $\begin{bmatrix} a1 \\ 0 \\ a2 \\ 0 \end{bmatrix}$ Since $F(UE=3) = \begin{bmatrix} 1 \\ 1 \\ 0 \\ 0 \end{bmatrix}$, UE specific Codebook 3 = $\begin{bmatrix} b1 \\ b2 \\ 0 \\ 0 \end{bmatrix}$ Since $F(UE=4) = \begin{bmatrix} 0 \\ 0 \\ 1 \\ 1 \end{bmatrix}$, UE specific Codebook 4 = $\begin{bmatrix} 0 \\ 0 \\ b1 \\ b2 \end{bmatrix}$ Since $F(UE=5) = \begin{bmatrix} 1 \\ 0 \\ 0 \\ 1 \end{bmatrix}$, UE specific Codebook 5 = $\begin{bmatrix} c1 \\ 0 \\ 0 \\ c2 \end{bmatrix}$ Since $F(UE=6) = \begin{bmatrix} 0 \\ 1 \\ 1 \\ 0 \end{bmatrix}$, UE specific Codebook 6 = $\begin{bmatrix} 0 \\ c1 \\ c2 \\ 0 \end{bmatrix}$ As described above, in order to enhance the UE specific Codebook decoding performance of each user, according to Rule 2, a Euclidean Distance between the complex vectors within the UE specific Codebook of each user is maximized. For example, since $$UE \text{ specific Codebook } 1 = \begin{bmatrix} 0 \\ a1 \\ 0 \\ a2 \end{bmatrix} = \begin{bmatrix} 0 & 0 & 0 & 0 \\ a1(1) & a1(2) & a1(3) & a1(4) \\ 0 & 0 & 0 & 0 \\ a2(1) & a2(2) & a2(3) & a2(4) \end{bmatrix},$$

if the column vectors within the Codebook are given as vectors 1, 2, 3, and 4, since a1(1)=−a1(4), a1(2)=−a1(3), a2(1)=−a2(4), and a2(2)=−a2(3), vector 1 and vector 4, vector 2 and vector 3 are in a phase inversion relationship. Additionally, since conjugate(a1(1))*a1(2)+conjugate(a2(1))*a2(2)=0, vector 1 and vector 2 are in an orthogonal relationship. Additionally, since a1(2)=−a2(2) and a1(3)=−a2(3), Rule 7 is optimized. However, since a1(1)=a2(1) and a1(4)=a2(4), Rule 7 is not optimized for part of the vectors. Since the relationship between the vectors is equally applied to all of the UE specific codebook, Rule 2 is optimized.

This may be arranged in a Factor Graph for bipartite matching, which is acquired in Rule 1, as shown below.

$$F(K=4, J=6) = \begin{bmatrix} 0 & a1 & b1 & 0 & c1 & 0 \\ a1 & 0 & b2 & 0 & 0 & c1 \\ 0 & a2 & 0 & b1 & 0 & c2 \\ a2 & 0 & 0 & b2 & c2 & 0 \end{bmatrix}$$

Conversely, in case of Rule 3, for the superposition of constellation (i, j, k), a total of $M^{(d_f)}$ number ($4^3$=64) of combinations may not be optimized according to a generated traffic combination of each user.

The overall codebook may be arranged as shown below.

$$F(K=4, J=6) = \begin{bmatrix} 0 & a1 & b1 & 0 & c1 & 0 \\ a1 & 0 & b2 & 0 & 0 & c1 \\ 0 & a2 & 0 & b1 & 0 & c2 \\ a2 & 0 & 0 & b2 & c2 & 0 \end{bmatrix}$$

$a1 = [1, 1, -1, -1], a2 = [1, -1, 1, -1]$ $b1 = [1, 1, -1, -1] * \exp(j * 1/3 \pi),$ $b2 = [1, -1, 1, -1] * \exp(j * 1/3 \pi)$ $c1 = [1, 1, -1, -1] * \exp(j * 2/3 \pi), c2 = [1, -1, 1, -1] * \exp(j * 2/3 \pi)$ UE specific Codebook k=$k^{th}$ column of F matrix (e.g., UE specific Codebook 1=$1^{st}$ column of $$F \text{ matrix} = \begin{bmatrix} 0 \\ a1 \\ 0 \\ a2 \end{bmatrix})$$

Normalized Codebook Sets

| UE index k | UE specific Codebook $k$ = $\begin{matrix} 00 & 01 & 10 & 11 \\ [vec\,1 & vec\,2 & vec\,3 & vec\,4] \end{matrix} * P_{no}$ |
|---|---|
| UE 1 | $\begin{bmatrix} 0 & 0 & 0 & 0 \\ 1 & 1 & -1 & -1 \\ 0 & 0 & 0 & 0 \\ 1 & -1 & 1 & -1 \end{bmatrix} * P_{no}$ |
| UE 2 | $\begin{bmatrix} 1 & 1 & -1 & -1 \\ 0 & 0 & 0 & 0 \\ 1 & -1 & 1 & -1 \\ 0 & 0 & 0 & 0 \end{bmatrix} * P_{no}$ |
| UE 3 | $\begin{bmatrix} 1*e^{j*\frac{1}{3}\pi} & 1*e^{j*\frac{1}{3}\pi} & -1*e^{j*\frac{1}{3}\pi} & -1*e^{j*\frac{1}{3}\pi} \\ 1*e^{j*\frac{1}{3}\pi} & -1*e^{j*\frac{1}{3}\pi} & 1*e^{j*\frac{1}{3}\pi} & -1*e^{j*\frac{1}{3}\pi} \\ 0 & 0 & 0 & 0 \\ 0 & 0 & 0 & 0 \end{bmatrix} * P_{no}$ |
| UE 4 | $\begin{bmatrix} 0 & 0 & 0 & 0 \\ 0 & 0 & 0 & 0 \\ 1*e^{j*\frac{1}{3}\pi} & 1*e^{j*\frac{1}{3}\pi} & -1*e^{j*\frac{1}{3}\pi} & -1*e^{j*\frac{1}{3}\pi} \\ 1*e^{j*\frac{1}{3}\pi} & -1*e^{j*\frac{1}{3}\pi} & 1*e^{j*\frac{1}{3}\pi} & -1*e^{j*\frac{1}{3}\pi} \end{bmatrix} * P_{no}$ |
| UE 5 | $\begin{bmatrix} 1*e^{j*\frac{2}{3}\pi} & 1*e^{j*\frac{2}{3}\pi} & -1*e^{j*\frac{2}{3}\pi} & -1*e^{j*\frac{2}{3}\pi} \\ 0 & 0 & 0 & 0 \\ 0 & 0 & 0 & 0 \\ 1*e^{j*\frac{2}{3}\pi} & -1*e^{j*\frac{2}{3}\pi} & 1*e^{j*\frac{2}{3}\pi} & -1*e^{j*\frac{2}{3}\pi} \end{bmatrix} * P_{no}$ |
| UE 6 | $\begin{bmatrix} 0 & 0 & 0 & 0 \\ 1*e^{j*\frac{2}{3}\pi} & 1*e^{j*\frac{2}{3}\pi} & -1*e^{j*\frac{2}{3}\pi} & -1*e^{j*\frac{2}{3}\pi} \\ 1*e^{j*\frac{2}{3}\pi} & -1*e^{j*\frac{2}{3}\pi} & 1*e^{j*\frac{2}{3}\pi} & -1*e^{j*\frac{2}{3}\pi} \\ 0 & 0 & 0 & 0 \end{bmatrix} * P_{no}$ |

Herein, $P_{no}$ is a matrix (M×M) that is normalized for power restriction. $P_{no}$ may be expressed in the form of an equation as follows:

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}..$$

At this point, $P_{no,m} = (1/|\text{vec } m|) \times \sqrt{K}$, for m=1, ..., M, where K=4, M=4.

Embodiment 8. Optimization of Rules 6 and 7 and Relaxation of Rule 2 (Set 2)

In the present embodiment, Rule 1 is optimized for a case where, as described above, $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the Factor Graph, which is presented above, it will be apparent that the properties of Rule 1 do not change even though Rule 1 is changed by a linear combination of each column vector or row vector.

Figure 32:
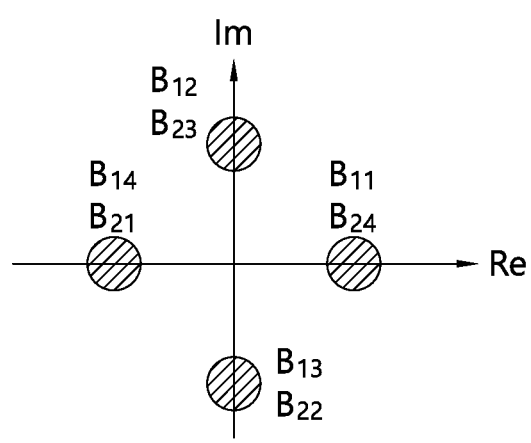
FIG. 32 shows an example of two Base Constellations and a Phase Rotation for an optimization of Rule 6.

Firstly, in order to optimize Rule 6, two Base Constellations and a Phase Rotation are proposed. FIG. 32 shows an example of two Base Constellations and a Phase Rotation for an optimization of Rule 6.

Base Constellation: B1=[$B_{11}$, $B_{12}$, $B_{13}$, $B_{14}$], where $B_{11}$=1, $B_{12}$=1, $B_{13}$=−i, $B_{14}$=−1.

Base Constellation: B2=[$B_{21}$, $B_{22}$, $B_{23}$, $B_{24}$], where $B_{21}$=−1, $B_{22}$=−i, $B_{23}$=i, $B_{24}$=1.

Phase Rotation:

$$\theta_i = \frac{i-1}{d_f} * \pi, \text{ where } i = 1, \ldots d_f.$$

Figure 33:
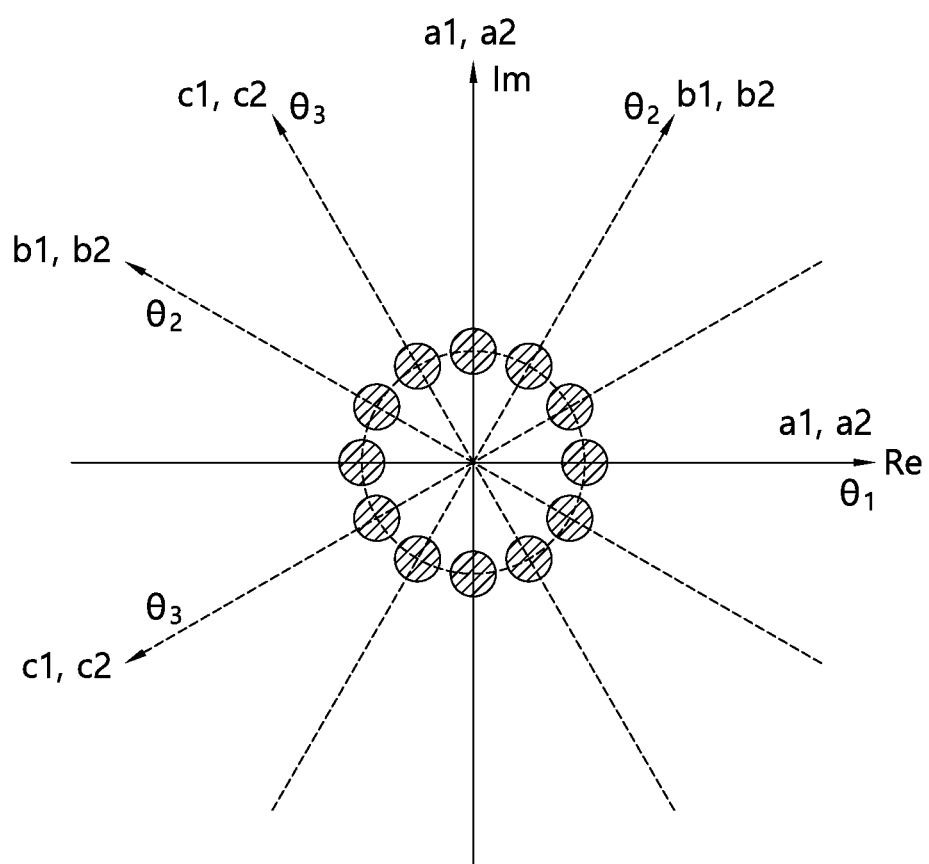
FIG. 33 shows an example of a Mother Constellation being configured by the Base Constellations and the Phase Rotation of FIG. 32.

Accordingly, the following Mother Constellation may be configured by the Base Constellations and Phase Rotation. FIG. 33 shows an example of a Mother Constellation being configured by the Base Constellations and the Phase Rotation of FIG. 32.

Mother Constellation 1: a1=B1*exp(j*$\theta_1$)=B1=[a1(1), a1(2), a1(3), a1(4)]

Mother Constellation 2: a2=B2*exp(j*$\theta_1$)=B2=[a2(1), a2(2), a2(3), a2(4)]

Mother Constellation 3: b1=B1*exp(j*$\theta_2$)=B1*exp(j*⅓π)=[b1(1), b1(2), b1(3), b1(4)]

Mother Constellation 4: b2=B2*exp(j*$\theta_2$)=B2*exp(j*⅓π)=[b2(1), b2(2), b2(3), b2(4)]

Mother Constellation 5: c1=B1*exp(j*$\theta_3$)=B1*exp(j*⅔π)=[c1(1), c1(2), c1(3), c1(4)]

Mother Constellation 6: c2=B2*exp(j*$\theta_3$)=B2*exp(j*⅔π)=[c2(1), c2(2), c2(3), c2(4)]

For the optimization of Rule 2, the Constellation may be mapped to the UE specific Codebook of each user, as shown below.

Since $F(UE=1) = \begin{bmatrix} 0 \\ 1 \\ 0 \\ 1 \end{bmatrix}$, UE specific Codebook 1 = $\begin{bmatrix} 0 \\ a1 \\ 0 \\ a2 \end{bmatrix}$ Since $F(UE=2) = \begin{bmatrix} 1 \\ 0 \\ 1 \\ 0 \end{bmatrix}$, UE specific Codebook 2 = $\begin{bmatrix} a1 \\ 0 \\ a2 \\ 0 \end{bmatrix}$ Since $F(UE=3) = \begin{bmatrix} 1 \\ 1 \\ 0 \\ 0 \end{bmatrix}$, UE specific Codebook 3 = $\begin{bmatrix} b1 \\ b2 \\ 0 \\ 0 \end{bmatrix}$ Since $F(UE=4) = \begin{bmatrix} 0 \\ 0 \\ 1 \\ 1 \end{bmatrix}$, UE specific Codebook 4 = $\begin{bmatrix} 0 \\ 0 \\ b1 \\ b2 \end{bmatrix}$ Since $F(UE=5) = \begin{bmatrix} 1 \\ 0 \\ 0 \\ 1 \end{bmatrix}$, UE specific Codebook 5 = $\begin{bmatrix} c1 \\ 0 \\ 0 \\ c2 \end{bmatrix}$ Since $F(UE=6) = \begin{bmatrix} 0 \\ 1 \\ 1 \\ 0 \end{bmatrix}$, UE specific Codebook 6 = $\begin{bmatrix} 0 \\ c1 \\ c2 \\ 0 \end{bmatrix}$.

As described above, in order to enhance the UE specific Codebook decoding performance of each user, according to Rule 2, a Euclidean Distance between the complex vectors within the UE specific Codebook of each user is maximized. For example, since $$\text{UE specific Codebook 1} = \begin{bmatrix} 0 \\ a1 \\ 0 \\ a2 \end{bmatrix} = \begin{bmatrix} 0 & 0 & 0 & 0 \\ a1(1) & a1(2) & a1(3) & a1(4) \\ 0 & 0 & 0 & 0 \\ a2(1) & a2(2) & a2(3) & a2(4) \end{bmatrix},$$

if the column vectors within the Codebook are given as vectors 1, 2, 3, and 4, since a1(1)=−a1(4), a1(2)=−a1(3), a2(1)=−a2(4), and a2(2)=−a2(3), vector 1 and vector 4, vector 2 and vector 3 are in a phase inversion relationship. Additionally, since conjugate(a1(1))*a1(2)+conjugate(a2(1))*a2(2)=2i, vector 1 and vector 2 are in a non-orthogonal relationship (Rule 2 is not optimized). Additionally, since a1(1)=−a2(1), a1(2)=−a2(2), a1(3)=−a2(3), and a1(4)=−a2(4), Rule 7 is optimized. Since the relationship between the vectors is equally applied to all of the UE specific codebook, Rule 7 is optimized.

This may be arranged in a Factor Graph for bipartite matching, which is acquired in Rule 1, as shown below.

$$F(K=4, J=6) = \begin{bmatrix} 0 & a1 & b1 & 0 & c1 & 0 \\ a1 & 0 & b2 & 0 & 0 & c1 \\ 0 & a2 & 0 & b1 & 0 & c2 \\ a2 & 0 & 0 & b2 & c2 & 0 \end{bmatrix}$$

Conversely, in case of Rule 3, for the superposition of constellation (i, j, k), a total of $M^{\wedge}(d_f)$ number ($4^3=64$) of combinations may not be optimized according to a generated traffic combination of each user.

The overall codebook may be arranged as shown below.

$$F(K=4, J=6) = \begin{bmatrix} 0 & a1 & b1 & 0 & c1 & 0 \\ a1 & 0 & b2 & 0 & 0 & c1 \\ 0 & a2 & 0 & b1 & 0 & c2 \\ a2 & 0 & 0 & b2 & c2 & 0 \end{bmatrix}$$

$a1 = [1, i, -i, -1], a2 = [1, -i, i, -1]$ $b1 = [1, i, -i, -1]*\exp(j*1/3\ \pi), b2 = [1, -i, i, -1]*\exp(j*1/3\ \pi)$ $c1 = [1, i, -i, -1]*\exp(j*2/3\ \pi), c2 = [1, -i, i, -1]*\exp(j*2/3\ \pi)$ UE specific Codebook k=kth column of F matrix (e.g., UE specific Codebook 1=1st column of $$F\ \text{matrix} = \begin{bmatrix} 0 \\ a1 \\ 0 \\ a2 \end{bmatrix})$$

Normalized Codebook Sets

| UE index k | UE specific Codebook $k = \dfrac{00\quad 01\quad 10\quad 11}{[vec\ 1\ \ vec\ 2\ \ vec\ 3\ \ vec\ 4]}*P_{no}$ |
|---|---|
| UE 1 | $\begin{bmatrix} 0 & 0 & 0 & 0 \\ 1 & i & -i & -1 \\ 0 & 0 & 0 & 0 \\ -1 & -i & i & 1 \end{bmatrix}*P_{no}$ |
| UE 2 | $\begin{bmatrix} 1 & i & -i & -1 \\ 0 & 0 & 0 & 0 \\ -1 & -i & i & 1 \\ 0 & 0 & 0 & 0 \end{bmatrix}*P_{no}$ |
| UE 3 | $\begin{bmatrix} 1*e^{j*\frac{1}{3}\pi} & i*e^{j*\frac{1}{3}\pi} & -i*e^{j*\frac{1}{3}\pi} & -1*e^{j*\frac{1}{3}\pi} \\ -1*e^{j*\frac{1}{3}\pi} & -i*e^{j*\frac{1}{3}\pi} & i*e^{j*\frac{1}{3}\pi} & 1*e^{j*\frac{1}{3}\pi} \\ 0 & 0 & 0 & 0 \\ 0 & 0 & 0 & 0 \end{bmatrix}*P_{no}$ |
| UE 4 | $\begin{bmatrix} 0 & 0 & 0 & 0 \\ 0 & 0 & 0 & 0 \\ 1*e^{j*\frac{1}{3}\pi} & i*e^{j*\frac{1}{3}\pi} & -i*e^{j*\frac{1}{3}\pi} & -1*e^{j*\frac{1}{3}\pi} \\ -1*e^{j*\frac{1}{3}\pi} & -i*e^{j*\frac{1}{3}\pi} & i*e^{j*\frac{1}{3}\pi} & 1*e^{j*\frac{1}{3}\pi} \end{bmatrix}*P_{no}$ |
| UE 5 | $\begin{bmatrix} 1*e^{j*\frac{2}{3}\pi} & i*e^{j*\frac{2}{3}\pi} & -i*e^{j*\frac{2}{3}\pi} & -1*e^{j*\frac{2}{3}\pi} \\ 0 & 0 & 0 & 0 \\ 0 & 0 & 0 & 0 \\ -1*e^{j*\frac{2}{3}\pi} & -i*e^{j*\frac{2}{3}\pi} & i*e^{j*\frac{2}{3}\pi} & 1*e^{j*\frac{2}{3}\pi} \end{bmatrix}*P_{no}$ |
| UE 6 | $\begin{bmatrix} 0 & 0 & 0 & 0 \\ 1*e^{j*\frac{2}{3}\pi} & i*e^{j*\frac{2}{3}\pi} & -i*e^{j*\frac{2}{3}\pi} & -1*e^{j*\frac{2}{3}\pi} \\ -1*e^{j*\frac{2}{3}\pi} & -i*e^{j*\frac{2}{3}\pi} & i*e^{j*\frac{2}{3}\pi} & 1*e^{j*\frac{2}{3}\pi} \\ 0 & 0 & 0 & 0 \end{bmatrix}*P_{no}$ |

Herein, $P_{no}$ is a matrix (M×M) that is normalized for power restriction. $P_{no}$ may be expressed in the form of an equation as follows.

Embodiment 9. Optimization of Rule 6 and Relaxation of Rule 7 (Set 3)

In the present embodiment, Rule 1 is optimized for a case where, as described above, $$F(K=4, J=6) = \begin{bmatrix} 0 & 1 & 1 & 0 & 1 & 0 \\ 1 & 0 & 1 & 0 & 0 & 1 \\ 0 & 1 & 0 & 1 & 0 & 1 \\ 1 & 0 & 0 & 1 & 1 & 0 \end{bmatrix},$$

$d_v=2$, and $d_f=3$. In the Factor Graph, which is presented above, it will be apparent that the properties of Rule 1 do not change even though Rule 1 is changed by a linear combination of each column vector or row vector.

Figure 34:
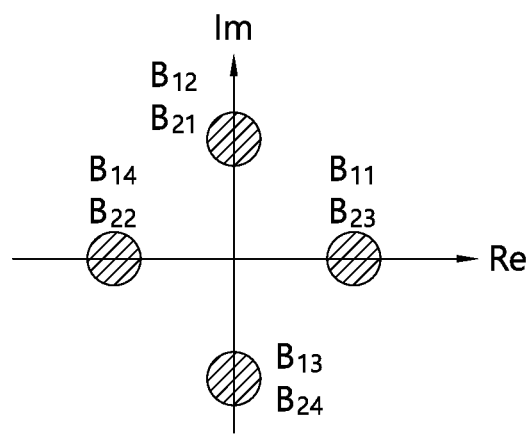
FIG. 34 shows an example of two Base Constellations and a Phase Rotation for an optimization of Rule 6.

Firstly, in order to optimize Rule 6, two Base Constellations and a Phase Rotation are proposed, as shown below. FIG. 34 shows an example of two Base Constellations and a Phase Rotation for an optimization of Rule 6.

Base Constellation: B1=[B11, B12, B13, B14], where B11=1, B12=i, B13=-i, B14=-1.

Base Constellation: B2=[B21, B22, B23, B24], where B21=i, B22=-1, B23=1, B24=-i.

Phase Rotation:

$$\theta_i = \dfrac{i-1}{d_f} *\pi, \text{ where } i=1,\ldots d_f.$$

Figure 35:
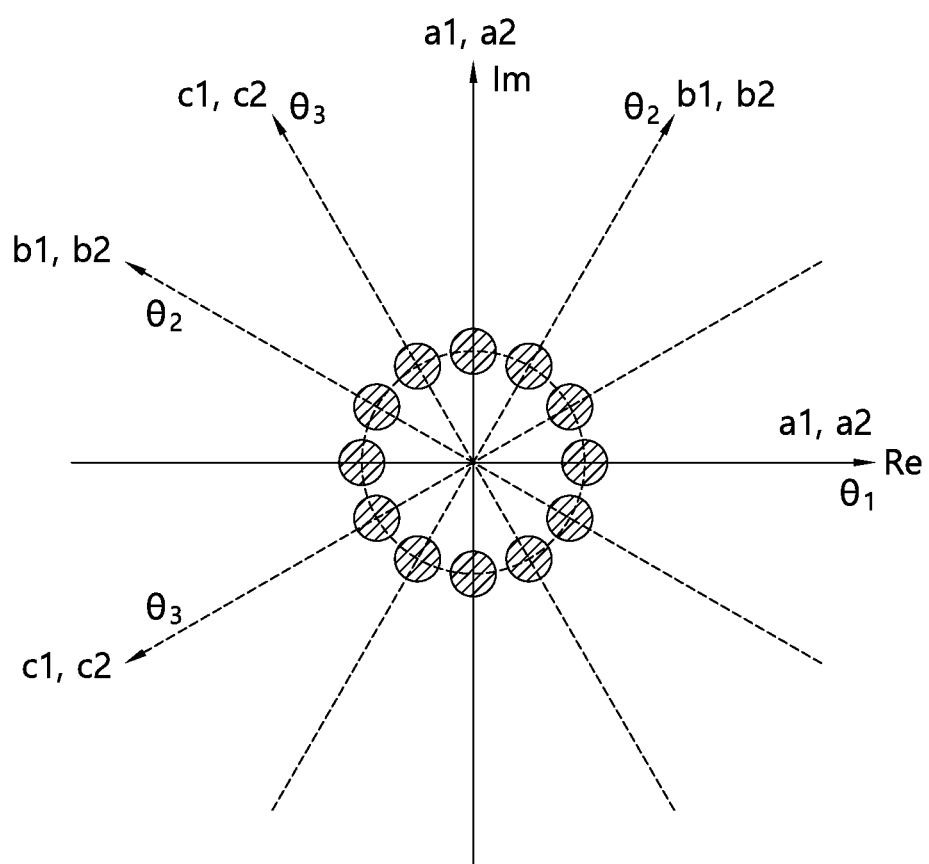
FIG. 35 shows an example of a Mother Constellation being configured by the Base Constellations and the Phase Rotation of FIG. 34.

Accordingly, the following Mother Constellation may be configured by the Base Constellations and Phase Rotation. FIG. 35 shows an example of a Mother Constellation being configured by the Base Constellations and the Phase Rotation of FIG. 34.

Mother Constellation 1: a1=B1*exp(j*$\theta_1$)=B1=[a1(1), a1(2), a1(3), a1(4)]

Mother Constellation 2: a2=B2*exp(j*$\theta_1$)=B2=[a2(1), a2(2), a2(3), a2(4)]

Mother Constellation 3: b1=B1*exp(j*$\theta_2$)=B1*exp(j*⅓π)=[b1(1), b1(2), b1(3), b1(4)]

Mother Constellation 4: b2=B2*exp(j*$\theta_2$)=B2*exp(j*⅓π)=[b2(1), b2(2), b2(3), b2(4)]

Mother Constellation 5: c1=B1*exp(j*$\theta_3$)=B1*exp(j*⅔π)=[c1(1), c1(2), c1(3), c1(4)]

Mother Constellation 6: c2=B2*exp(j*$\theta_3$)=B2*exp(j*⅔π)=[c2(1), c2(2), c2(3), c2(4)]

As described above, in order to enhance the UE specific Codebook decoding performance of each user, according to Rule 2, a Euclidean Distance between the complex vectors within the UE specific Codebook of each user is maximized. For example, since $$UE \text{ specific Codebook } 1 = \begin{bmatrix} 0 \\ a1 \\ 0 \\ a2 \end{bmatrix} = \begin{bmatrix} 0 & 0 & 0 & 0 \\ a1(1) & a1(2) & a1(3) & a1(4) \\ 0 & 0 & 0 & 0 \\ a2(1) & a2(2) & a2(3) & a2(4) \end{bmatrix},$$

if the column vectors within the Codebook are given as vectors 1, 2, 3, and 4, since a1(1)=−a1(4), a1(2)=−a1(3), a2(1)=−a2(4), and a2(2)=−a2(3), vector 1 and vector 4, vector 2 and vector 3 are in a phase inversion relationship. Additionally, conjugate(a1(1))*a1(2)+conjugate(a2(1))*a2(2)=0, vector 1 and vector 2 are in an orthogonal relationship. Additionally, since a1(1)=a2(1)*exp(j*¼ π), a1(2)=a2(2)*exp(j*¼π), a1(3)=a2(3)*exp(j*¼ π), and a1(4)=a2(4)*exp(j*¼π), Rule 7 is not optimized. However, an effect of Phase 90 degree rotation is gained. Since the relationship between the vectors is equally applied to all of the UE specific codebook, Rule 2 is optimized.

This may be arranged in a Factor Graph for bipartite matching, which is acquired in Rule 1, as shown below.

$$F(K = 4, J = 6) = \begin{bmatrix} 0 & a1 & b1 & 0 & c1 & 0 \\ a1 & 0 & b2 & 0 & 0 & c1 \\ 0 & a2 & 0 & b1 & 0 & c2 \\ a2 & 0 & 0 & b2 & c2 & 0 \end{bmatrix}$$

Conversely, in case of Rule 3, for the superposition of constellation (i, j, k), a total of M^(d_f) number (4³=64) of combinations may not be optimized according to a generated traffic combination of each user.

The overall codebook may be arranged as shown below.

$$F(K = 4, J = 6) = \begin{bmatrix} 0 & a1 & b1 & 0 & c1 & 0 \\ a1 & 0 & b2 & 0 & 0 & c1 \\ 0 & a2 & 0 & b1 & 0 & c2 \\ a2 & 0 & 0 & b2 & c2 & 0 \end{bmatrix}$$

$$a1 = [1, i, -i, -1], \ a2 = [i, -1, 1, -i]$$

$$b1 = [1, i, -i, -1]*\exp(j*1/3\ \pi), \ b2 = [i, -1, 1, -i]*\exp(j*1/3\ \pi)$$

$$c1 = [1, i, -i, -1]*\exp(j*2/3\ \pi), \ b2 = [i, -1, 1, -i]*\exp(j*2/3\ \pi)$$

UE specific Codebook k=kth column of F matrix (e.g., UE specific Codebook 1=1st column of $$F \text{ matrix} = \begin{bmatrix} 0 \\ a1 \\ 0 \\ a2 \end{bmatrix})$$

Normalized Codebook Sets

| UE index k | UE specific Codebook $k = [\text{vec}\,1 \ \text{vec}\,2 \ \text{vec}\,3 \ \text{vec}\,4]*P_{no}$ <br> 00 \ \ 01 \ \ 10 \ \ 11 |
|---|---|
| UE 1 | $\begin{bmatrix} 0 & 0 & 0 & 0 \\ 1 & i & -i & -1 \\ 0 & 0 & 0 & 0 \\ i & -1 & 1 & -i \end{bmatrix}*P_{no}$ |
| UE 2 | $\begin{bmatrix} 1 & i & -i & -1 \\ 0 & 0 & 0 & 0 \\ i & -1 & 1 & -i \\ 0 & 0 & 0 & 0 \end{bmatrix}*P_{no}$ |
| UE 3 | $\begin{bmatrix} 1*e^{j*\frac{1}{3}\pi} & i*e^{j*\frac{1}{3}\pi} & -i*e^{j*\frac{1}{3}\pi} & -1*e^{j*\frac{1}{3}\pi} \\ i*e^{j*\frac{1}{3}\pi} & -1*e^{j*\frac{1}{3}\pi} & 1*e^{j*\frac{1}{3}\pi} & -i*e^{j*\frac{1}{3}\pi} \\ 0 & 0 & 0 & 0 \\ 0 & 0 & 0 & 0 \end{bmatrix}*P_{no}$ |
| UE 4 | $\begin{bmatrix} 0 & 0 & 0 & 0 \\ 0 & 0 & 0 & 0 \\ 1*e^{j*\frac{1}{3}\pi} & i*e^{j*\frac{1}{3}\pi} & -i*e^{j*\frac{1}{3}\pi} & -1*e^{j*\frac{1}{3}\pi} \\ i*e^{j*\frac{1}{3}\pi} & -1*e^{j*\frac{1}{3}\pi} & 1*e^{j*\frac{1}{3}\pi} & -i*e^{j*\frac{1}{3}\pi} \end{bmatrix}*P_{no}$ |
| UE 5 | $\begin{bmatrix} 1*e^{j*\frac{2}{3}\pi} & i*e^{j*\frac{2}{3}\pi} & -i*e^{j*\frac{2}{3}\pi} & -1*e^{j*\frac{2}{3}\pi} \\ 0 & 0 & 0 & 0 \\ 0 & 0 & 0 & 0 \\ i*e^{j*\frac{2}{3}\pi} & -1*e^{j*\frac{2}{3}\pi} & 1*e^{j*\frac{2}{3}\pi} & -i*e^{j*\frac{2}{3}\pi} \end{bmatrix}*P_{no}$ |
| UE 6 | $\begin{bmatrix} 0 & 0 & 0 & 0 \\ 1*e^{j*\frac{2}{3}\pi} & i*e^{j*\frac{2}{3}\pi} & -i*e^{j*\frac{2}{3}\pi} & -1*e^{j*\frac{2}{3}\pi} \\ i*e^{j*\frac{2}{3}\pi} & -1*e^{j*\frac{2}{3}\pi} & 1*e^{j*\frac{2}{3}\pi} & -i*e^{j*\frac{2}{3}\pi} \\ 0 & 0 & 0 & 0 \end{bmatrix}*P_{no}$ |

Herein, $P_{no}$ is a matrix (M×M) that is normalized for power restriction. $P_{no}$ may be expressed in the form of an equation as follows:

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}..$$

At this point, $P_{no,m}=(1/|\text{vec m}|)\times\sqrt{K}$, for m=1, ..., M, where K=4, M=4.

Embodiment 10. Results of MPA Decoder Performance and PAPR Performance by Embodiment 2 and Embodiments 7, 8, and 9

Figure 36:
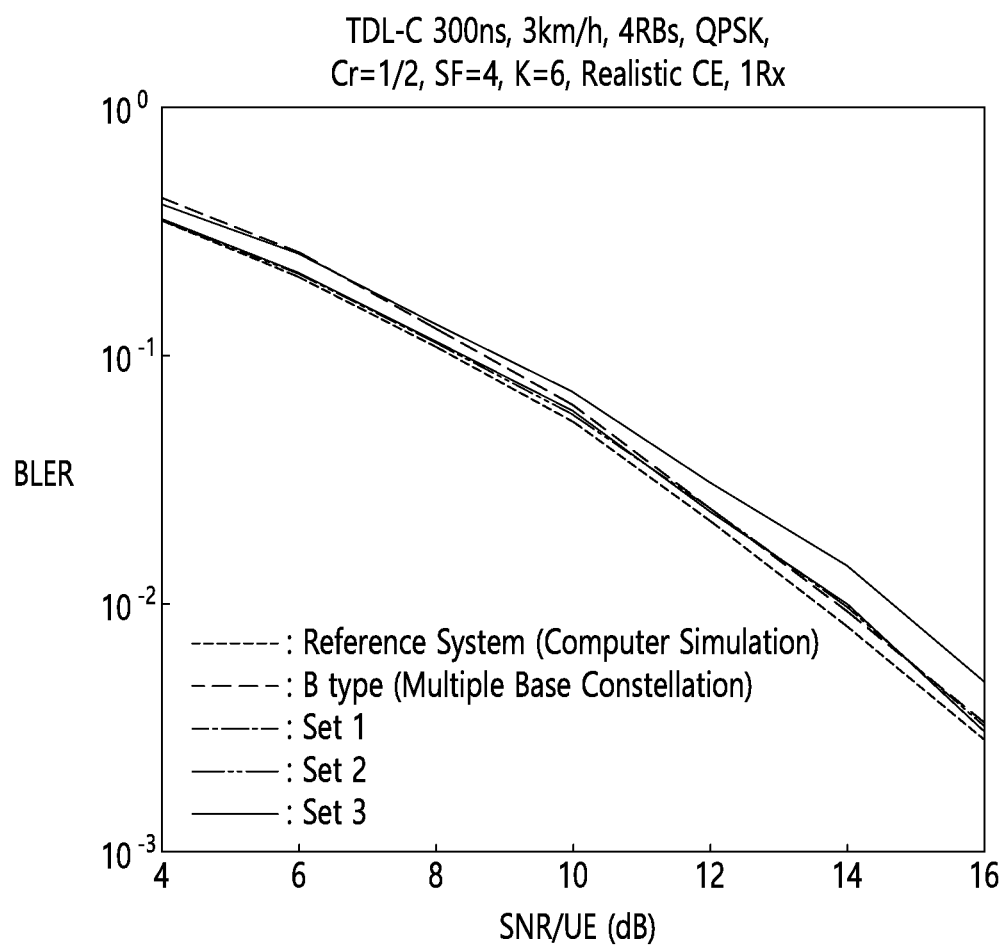
FIG. 36 is a graph showing results of an MPA decoder performance and PAPR performance according second to ninth embodiments.
Figure 37:
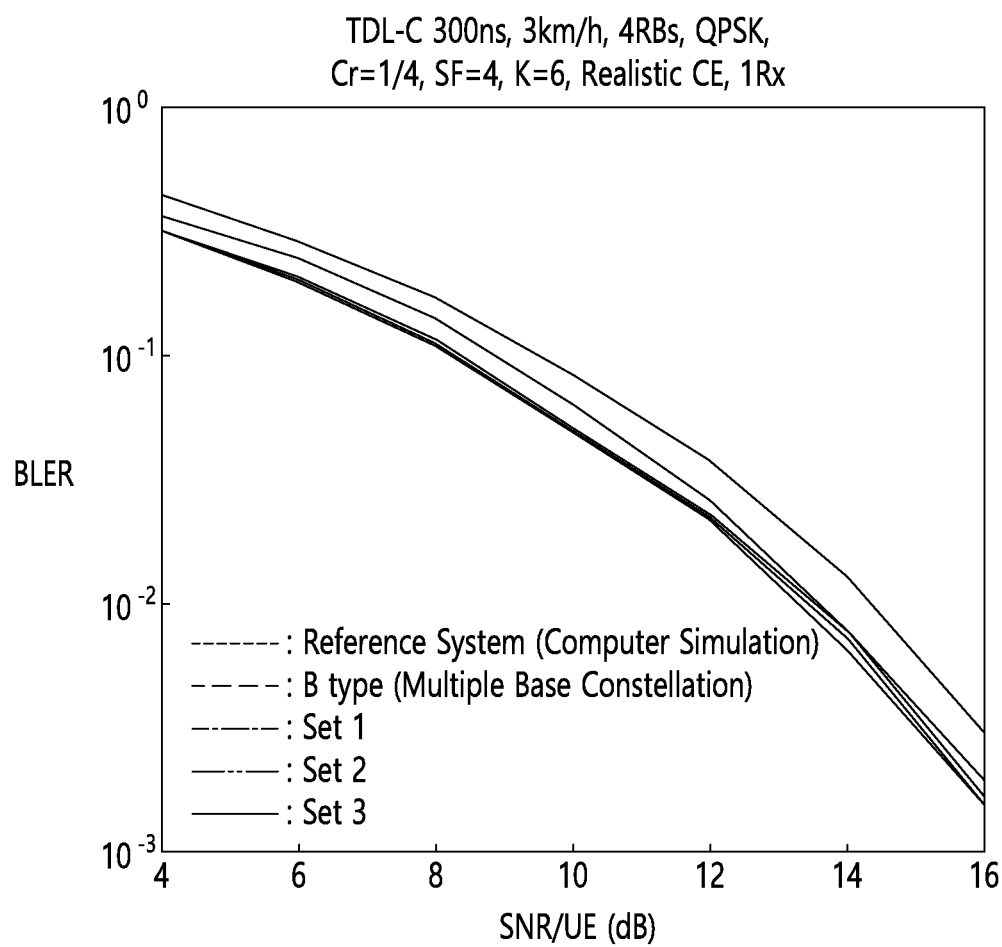
FIG. 37 is a graph showing results of an MPA decoder performance and PAPR performance according second to ninth embodiments.
Figure 38:
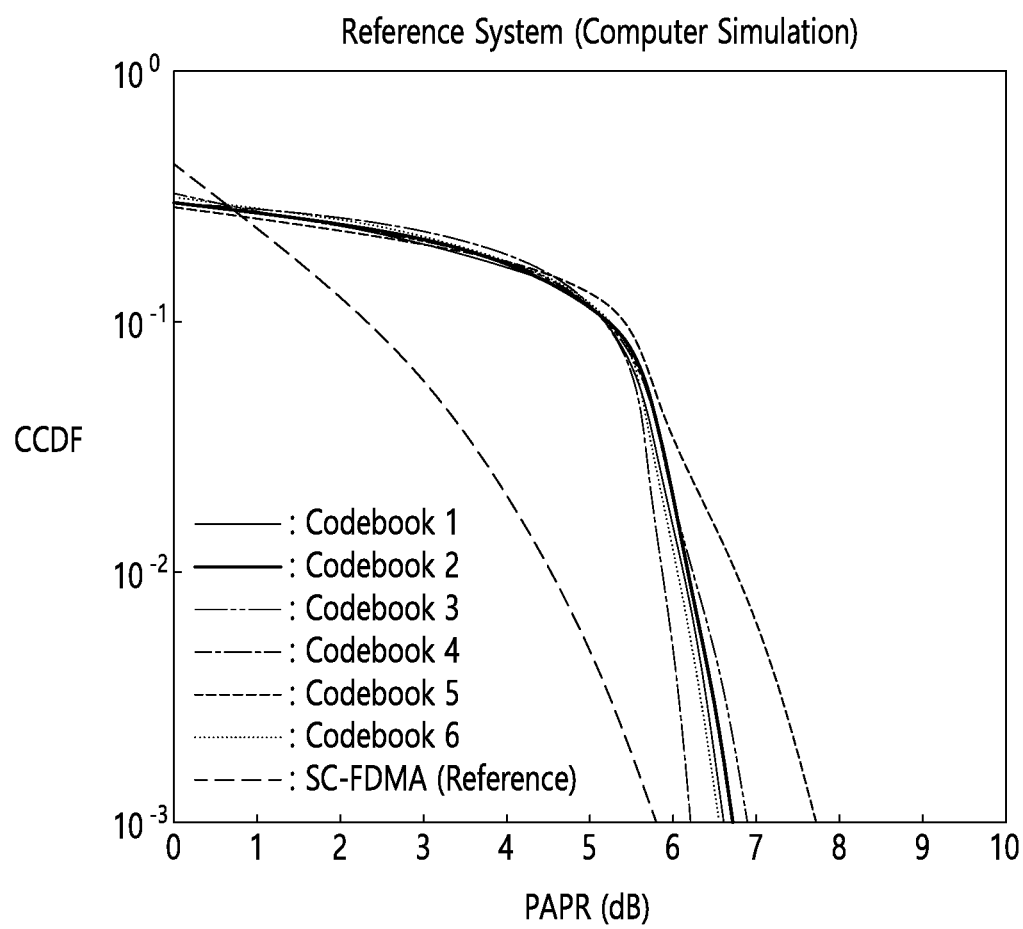
FIG. 38 is a graph showing PAPR per Codebook Set.
Figure 39:
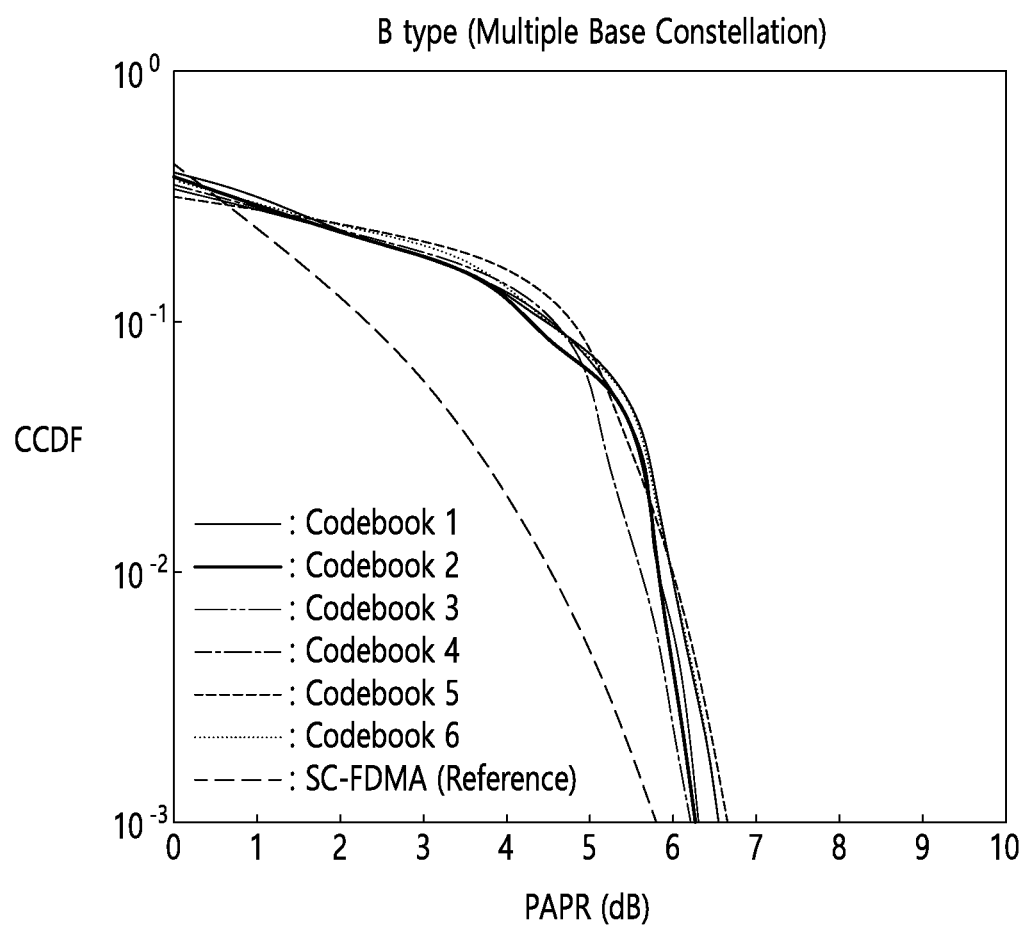
FIG. 39 is a graph showing PAPR per Codebook Set.
Figure 40:
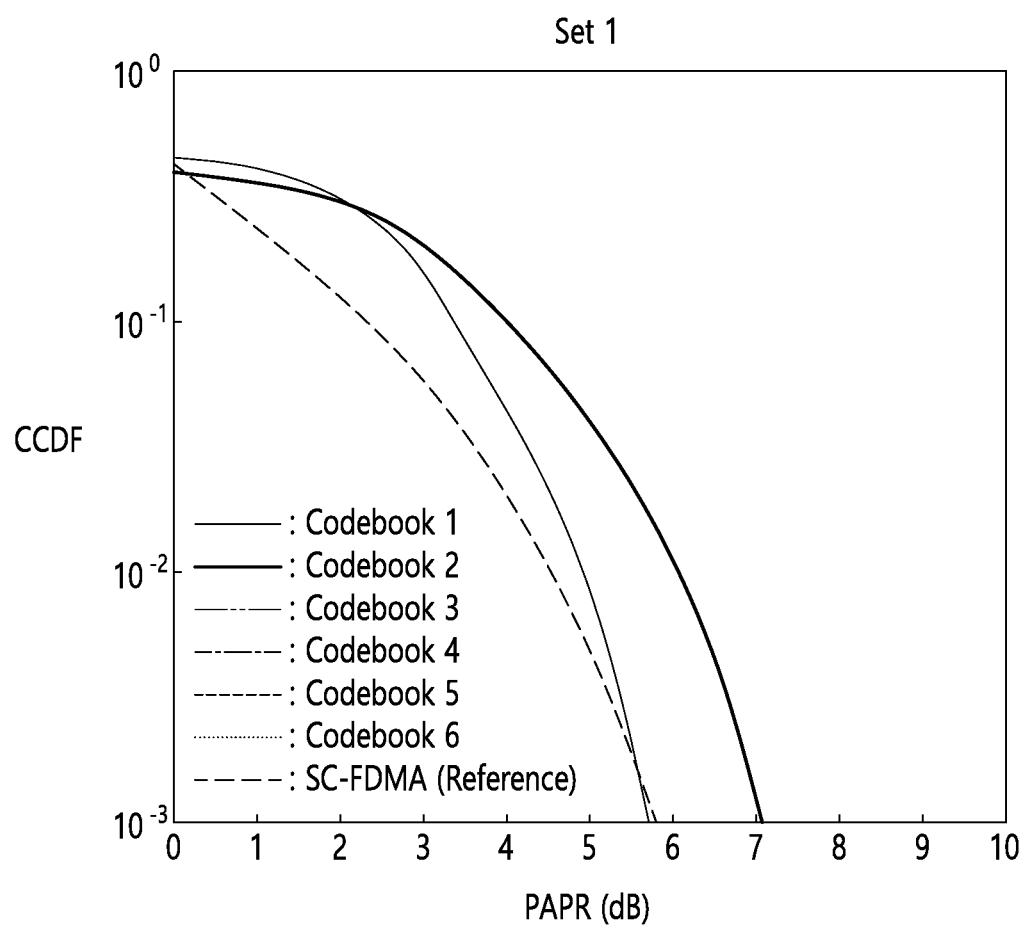
FIG. 40 is a graph showing PAPR per Codebook Set.
Figure 41:
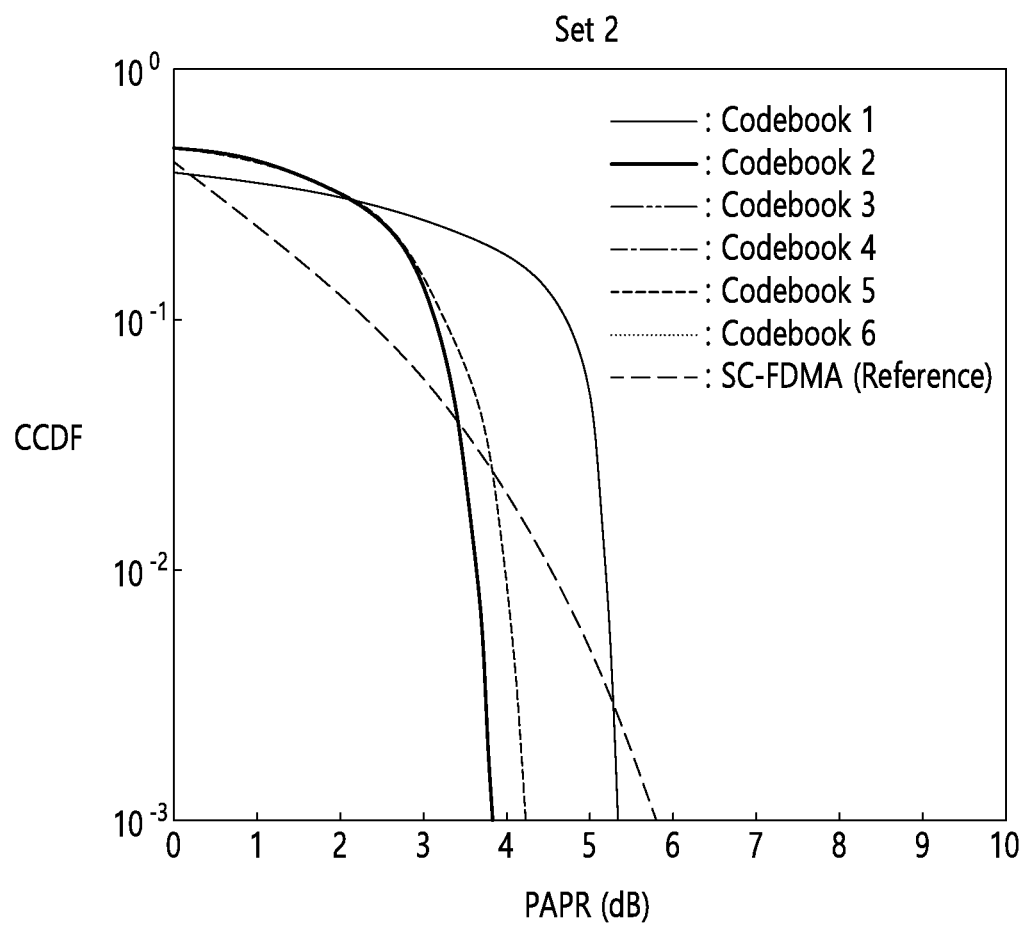
FIG. 41 is a graph showing PAPR per Codebook Set.
Figure 42:
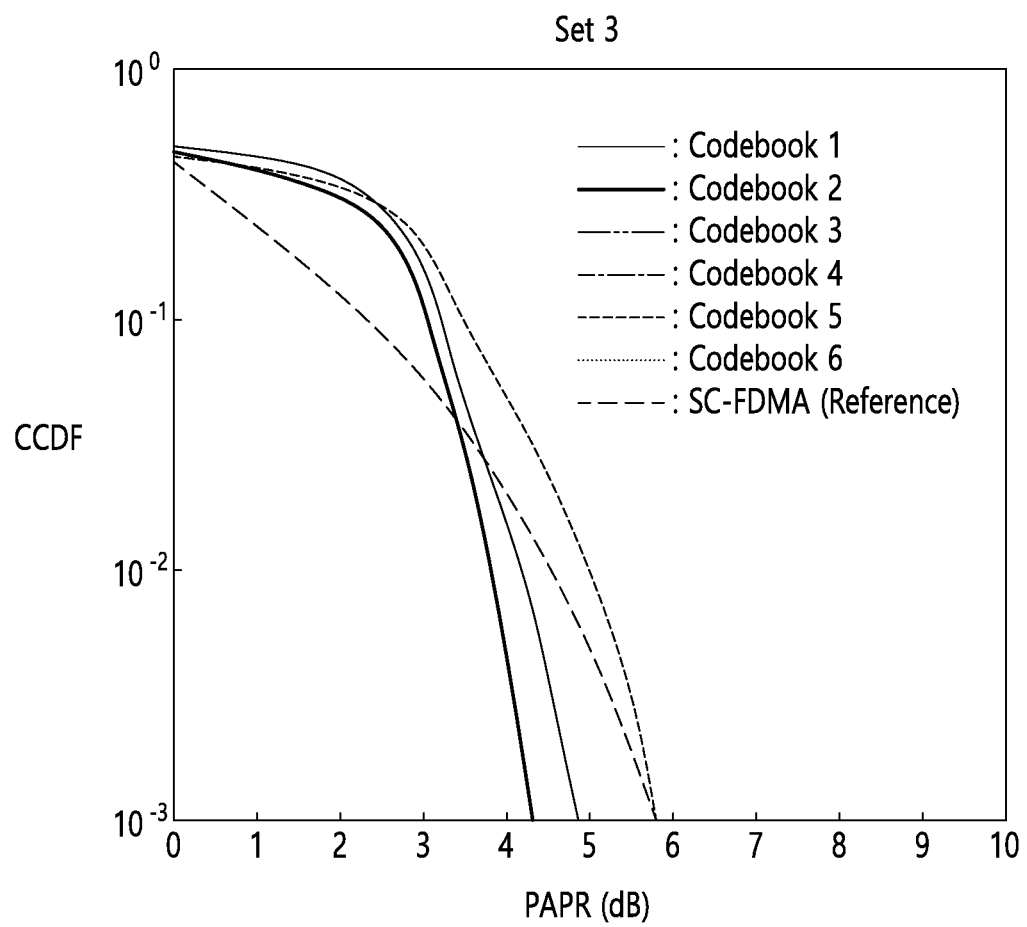
FIG. 42 is a graph showing PAPR per Codebook Set.

FIG. 36 and FIG. 37 are graphs showing results of an MPA decoder performance and PAPR performance according second to ninth embodiments. (Reference System—conventional codebook, B type—Embodiment 2, Set 1—Embodiment 7, Set 2—Embodiment 8, Set 3—Embodiment 9)

The results of FIG. 36 and FIG. 37 indicate a Block Error Rate (BLER) of a TDL-C 300 ns and 3 km/h environment, when using a multi-user superposed access method through a Codebook according to Embodiment 2 and Embodiments 7, 8, and 9. The proposed codebooks have BLER Performances of 1~2 dB or below per Codebook Set as compared to the already-presented codebooks, which are derived through computer simulation.

Conversely, the PAPR may result in a gain of 2~3 dB per Codebook Set, as shown in FIG. 38 to FIG. 42. FIG. 38 to FIG. 42 are graphs showing PAPR per Codebook Set.

As it may be verified in FIG. 38 to FIG. 42, through the proposed MM based NoMA Codebook Set, the PAPR performance as compared to the SC-FDMA of the Legacy LTE may be enhanced or maintained. Thus, for cell-edge UEs, for which the PAPR performance is important, the PAPR performance may be optimized. A difference in PAPR of the transmitting may be verified according to the UE specific Codebook of MM based NoMA through the above-mentioned results. A specific Codebook has excellent PAPR as compared to a Reference, whereas a specific Codebook has poor PAPR as compared to a Reference. In the multi-user superposed access scheme, since multiple users in the same time-frequency resource perform synchronized transmission through their UE specific Codebook, various geometry may exist within the cell of the users. The PAPR is more important when uplink is performed at a cell-edge than when performing uplink at a cell-center. A user performing uplink at the cell-center may be capable of performing transmission at a lower power level in view of Power Control for the decoding process of a receiving end. Conversely, a user performing uplink at the cell-edge may require a higher power level in order to be capable of overcoming Propagation Loss in view of Power Control for the decoding process of the receiving end. However, since a Maximum Transmit Power Constraint of a UE exists, there may be limitations is increasing the power level in the aspect of energy efficiency. Additionally, the PAPR may be a very important Metric according to a power amp performance of the transmitting end. Therefore, for the cell-edge user, a system having a low PAPR is more advantageous.

Based on the above-described properties, proposed herein is a system where a cell-edge user may use, select or be allocated with a UE specific Codebook having a low PAPR, and where a cell-center user may use, select or be allocated with a UE specific Codebook having a high PAPR.

It will be apparent that all of the above-described embodiments may generate a Codebook not only by a single Codebook but also through a combination of the embodiments. For example, the Codebook design may be performed by combining Multiple Base Constellations of Embodiment 2 and methods for optimizing the PAPR based on Embodiments 7, 8, and 9.

In all of the above-described methods and examples, it will be apparent that a codeword, which is a column vector of the Codebook being used by the transmitting end, is normalized by a transmission power.

It will be apparent that the Codebook design method and Codebook proposed in all of the above-described methods and examples include a Codebook that is converted by a permutation between vectors in a row or column domain of the codebook.

It will be apparent that the Codebook design method, which is proposed in all of the above-described embodiments, will not be limited only to the above-described embodiments. Therefore, it will be apparent that anyone being skilled and having ordinary knowledge in the field may derive other combination results (Linear Combination of a Factor Graph, or Linear Scaling of a Mother Constellation, and so on) by using the same design method.

Method 3. Signal Flow for Multi-Dimensional Modulation Based NoMA for PAPR Reduction In order to perform Method 1 based on a Codebook Set, which is based on Method 2, a method of performing Codebook information exchange and Signaling for Multi-dimensional Modulation based NoMA is needed. Proposed in the present method is the method of performing Codebook information exchange and Signaling for Multi-dimensional Modulation based NoMA, which is proposed in Method 2.

3.1. Scheduling Based Transmission

Figure 43:
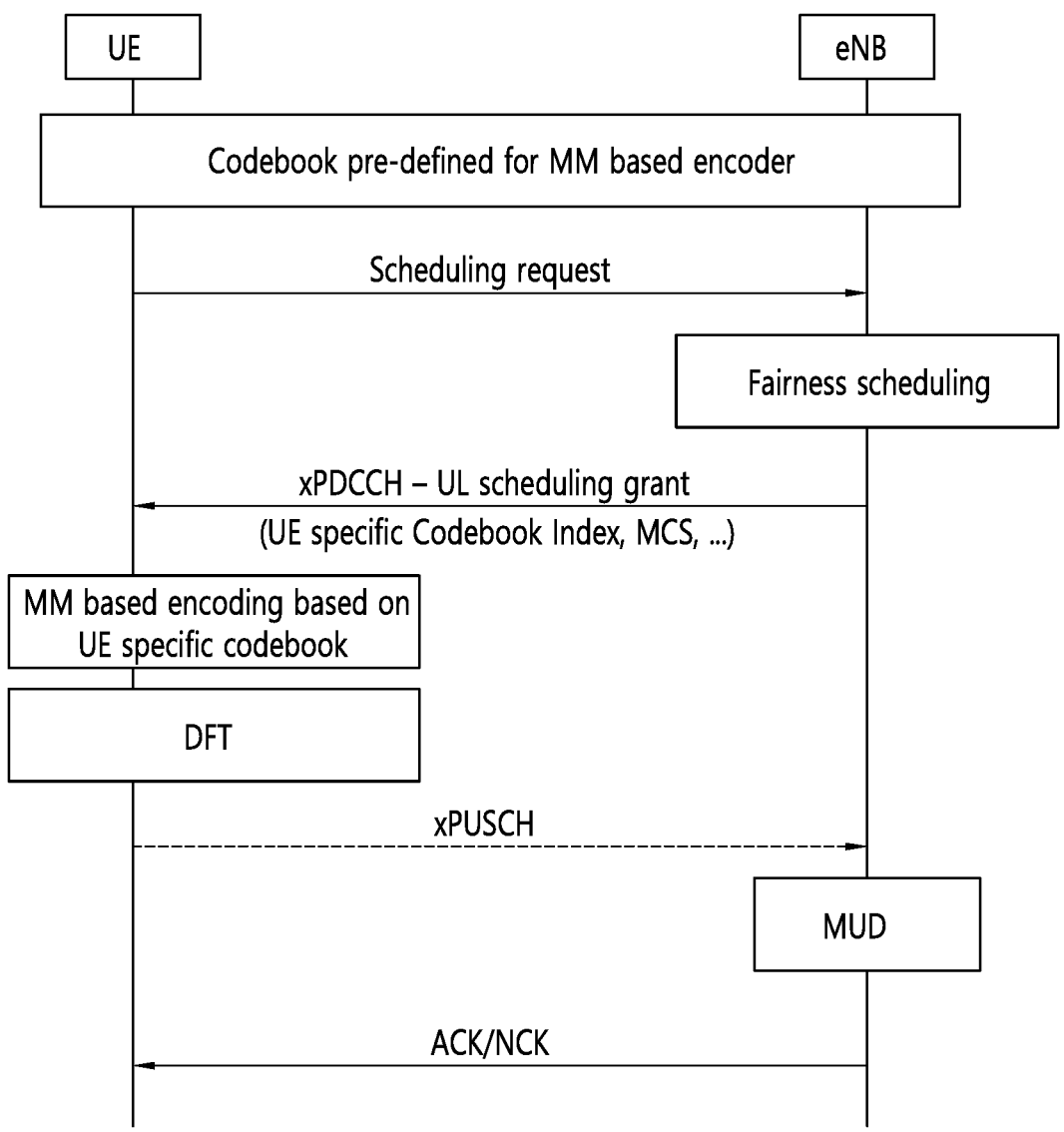
FIG. 43 shows a flow chart for transmitting a UE specific Codebook Index via control signaling in an uplink MM based NoMA system.

FIG. 43 shows a flow chart for transmitting a UE specific Codebook Index via control signaling in an uplink MM based NoMA system.

FIG. 43 shows an Uplink Signal Flow of a MM based NoMA system. A user and a base station have MM based Codebook Set information that is pre-defined in advance. Herein, the MM based Codebook Set information exists as a set of UE specific Codebooks, and embodiments proposed in Method 2 may be used. At this point, there may exist various methods for having the pre-defined MM based Codebook Set information. For example, 1. An overall MM based Codebook Set, which is pre-arranged in advance, is stored via Offline.

2. The user may receive the overall MM based Codebook Set via RRC signaling in a step of performing initial access to a base station, a step of performing RRC, and so on.

In the above-described case, the user may receive only a UE specific Codebook Index via Control Signaling (e.g., xPDCCH or xPUCCH, and so on), thereby being capable of using the corresponding UE specific Codebook or the overall Codebook for performing Downlink signal decoding or Uplink signal transmission.

Figure 44:
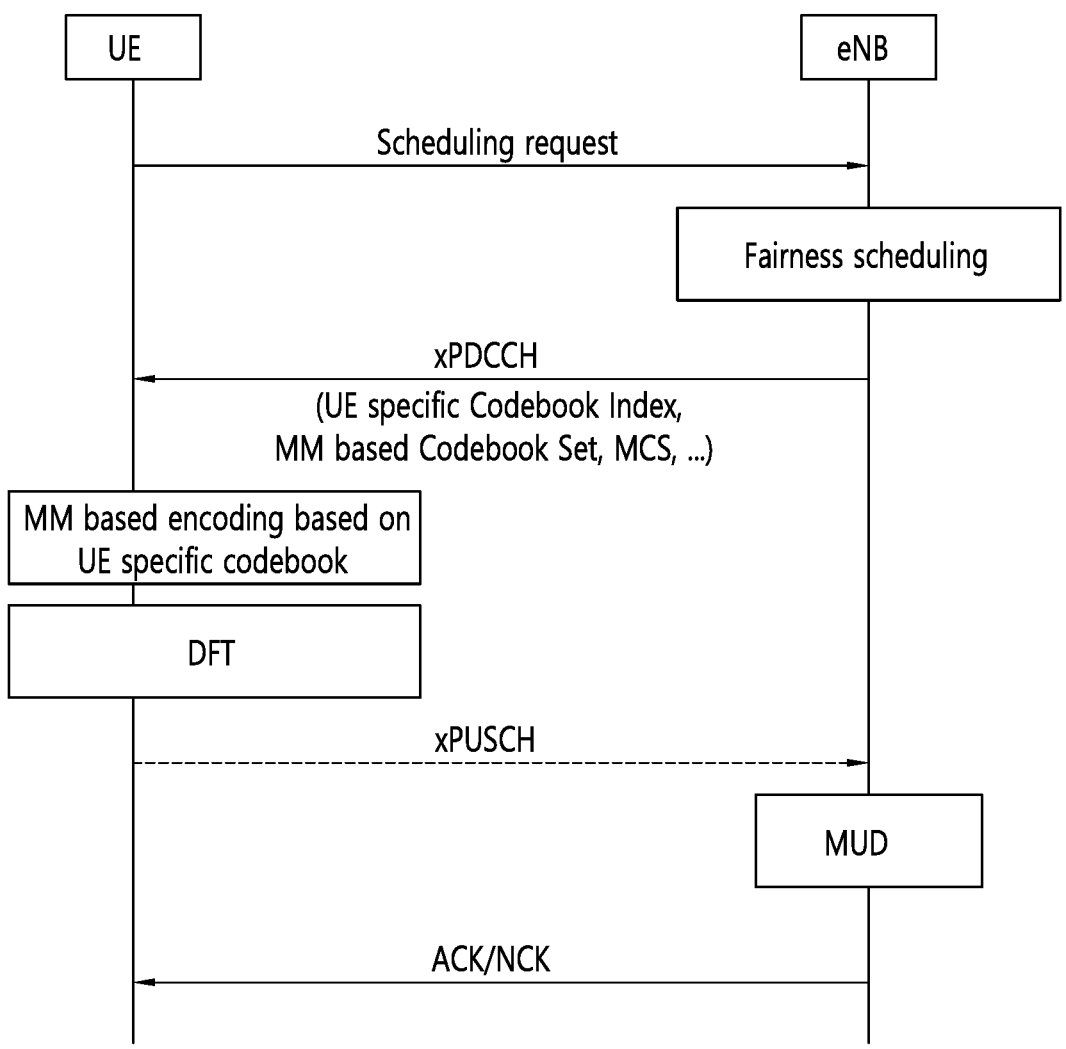
FIG. 44 shows a flow chart for transmitting a UE specific Codebook Index and a MM based Codebook Set via control signaling in an uplink MM based NoMA system.

Alternatively, as shown in FIG. 44, the UE specific Codebook Index and the overall MM based Codebook Set of each user may be received via Control Signaling when performing Downlink or Uplink. FIG. 44 shows a flow chart for transmitting a UE specific Codebook Index and a MM based Codebook Set via control signaling in an uplink MM based NoMA system.

More specifically, when a DL or UL information transmission request occurs, a Codebook Index corresponding to a UE Specific Codebook of each user may be transmitted to the user as Control information via Fairness Scheduling of the base station. The user uses the UE Specific Codebook for modulation or demodulation through the received Codebook Index. At this point, a number of Codebooks being allocated to each user may be equal to 1 codebook or may be equal to two or more codebooks. More specifically, it will be apparent that, in case of a user requiring a high Data Rate, two or more symbols may be simultaneously transmitted through two or more codebooks, so that two or more symbols can be demodulated in the receiving end. Additionally, J and K values, which determine the dimension of a Codebook, may be changed based on the system environment. The Codebook according to the changes in J and K may be generated or pre-defined according to a method proposed in Method 2.

The base station may perform Resource Management based on Fairness Scheduling, and the base station may determine a MCS level by using a MUI value obtained by the Codebook properties or an expected demodulation error rate. The base station may perform Fairness Scheduling based on the determined MCS level.

3.2. Contention Based Transmission

Figure 45:
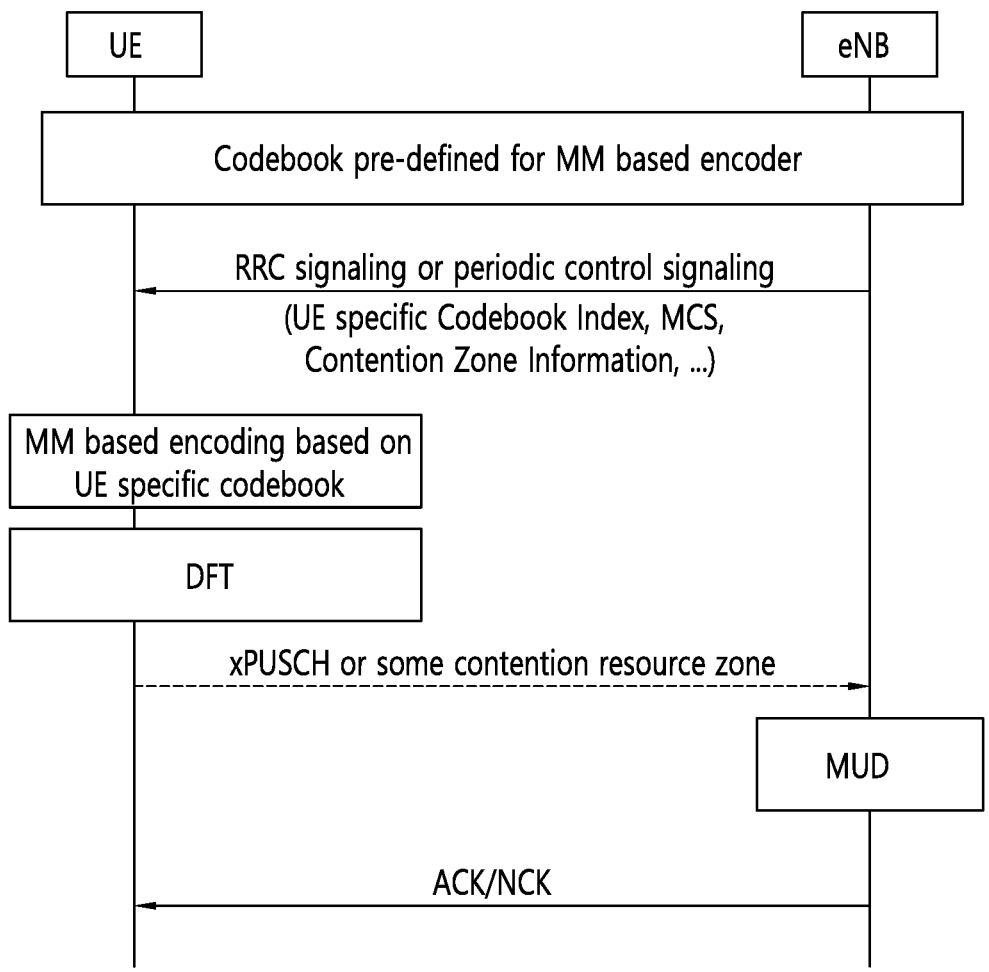
FIG. 45 shows a flow chart for performing UE specific Codebook allocation based contention based transmission in a MM based NoMA system.

FIG. 45 shows a flow chart for performing UE specific Codebook allocation based contention based transmission in a MM based NoMA system. And, FIG. 46 shows a flow chart for performing UE specific Codebook selection based contention based transmission in a MM based NoMA system.

Figure 46:
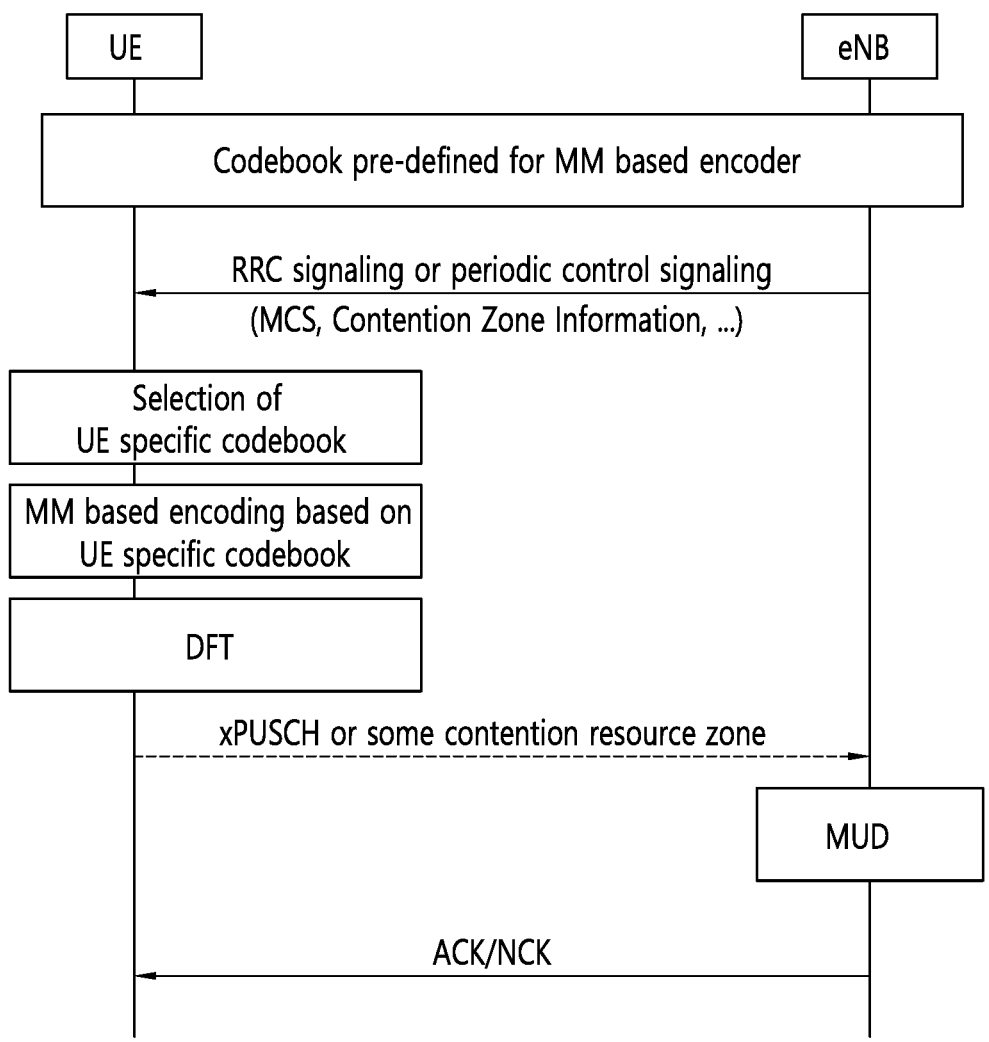
FIG. 46 shows a flow chart for performing UE specific Codebook selection based contention based transmission in a MM based NoMA system.

FIG. 45 and FIG. 46 show signal flows for a case where the base station allocates in advance a UE specific Codebook and a case where the user selects a UE specific Codebook during a Contention based transmission of a MM based NoMA system. At this point, the user and the base station have MM based Codebook Set information that is pre-defined in advance. Herein, the MM based Codebook Set information exists as a set of UE specific Codebooks, and embodiments proposed in Method 2 may be used. At this point, there may exist various methods for having the pre-defined MM based Codebook Set information. For example, 1. An overall MM based Codebook Set, which is pre-arranged in advance, is stored via Offline.

2. The user may receive the overall MM based Codebook Set via RRC signaling in a step of performing initial access to a base station, a step of performing RRC, and so on.

In the above described case, the user receives pre-defined information for Contention based transmission (MCS for Contention based transmission, Contention Resource Zone, Power Control) via RRC Signaling or Periodic Control Signaling, and so on. At this point, a UE specific Codebook Index may be received, and the user may perform MM based Encoding based on the UE specific Codebook Index, which is pre-allocated in advance, and may then perform Contention based Transmission. Conversely, in case the UE specific Codebook Index is not pre-allocated in advance, the user performs MM based Encoding by selecting a UE specific Codebook Index according to a predetermined rule and then performs Contention based Transmission. Various methods for selecting the UE specific Codebook Index may exist, such as (1) Randomly Selection, (2) UE specific Codebook Index(k)=mod(C-RNTI(k), Maximum Codebook Index), and so on. The base station performs MUD by Blind Detection without knowing which user has performed transmission to the Contention Zone, and, then, the base station decodes the received signal. At this point, a user may be specified by using a CRC check of the decoded signal and C-RNTI information included in the decoded signal.

3.2. Mode Selection of a Codebook Set Based DFT Block

In the Proposed Methods 3.1 or 3.2, when performing UL of a UE based on a Codebook Set, a DFT Block may be Active/In-active. For example, as shown below, according to the Codebook Set, the DFT operation may be tied.

TABLE 1

| Indicated or Selected or Allocated Codebook Set Index | DFT Block |
| --- | --- |
| Codebook Set 1, 2, 3, 4 (e.g., Type A, B, C, D) | In-active |
| Codebook Set 5, 6, 7, 8 (e.g., Set 1, 2, 3) | Active |

More specifically, proposed herein is a system in which a UE activates or in-activates (or de-activates) a DFT Block according to a used, selected, or allocated UE specific Codebook Set. In the present method, although the description is given based on an Uplink and Contention based Transmission of a Cellular system, it will be apparent that the present method may also be applied to all systems using a multi-user access scheme, such as Downlink and SPS environment, Machine Type Communication (MTC), Device-to-Device (D2D), Vehicle-to-Everything (V2X), and so on. Additionally, it will also be apparent that the Codebook properties may be used in a multi-antenna communication system using Multiple Input Multiple Output properties, in addition to the multi-user access schemes, or used as a Codebook for performing Multi-Layer/Hierarchical Layer transmission in Broadcasting.

Figure 47:
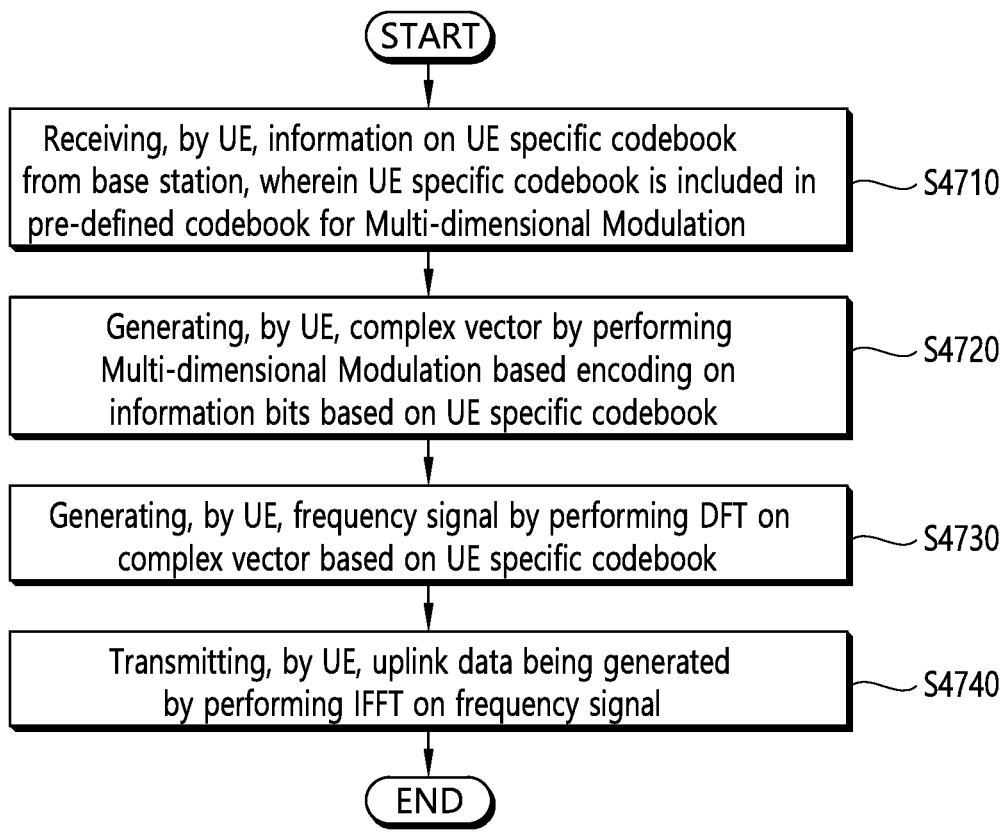
FIG. 47 is a procedural flowchart showing a procedure of transmitting uplink data by using a non-orthogonal multiple-access scheme according to the present embodiment.

FIG. 47 is a procedural flowchart showing a procedure of transmitting uplink data by using a non-orthogonal multiple-access scheme according to the present embodiment.

More specifically, a wireless communication system environment using a Non-orthogonal Multiple Access (NoMA) scheme considering multi-dimensional modulation is assumed in the present embodiment. More specifically, proposed herein is a Non-orthogonal Multiple Access (NoMA) scheme as a method for performing superposed transmission of signals for multi-users to the same time-frequency resource. The Non-orthogonal Multiple Access (NoMA) scheme considering multi-dimensional modulation may correspond to a NoMA scheme spreading bitstreams being encoded based on a modulation scheme and a non-orthogonal codebook to complex symbol vectors.

In step S4710, a UE receives information on a UE specific codebook from a base station. The UE specific codebook is included in a codebook for pre-defined Multi-dimensional Modulation. The codebook for pre-defined Multi-dimensional Modulation may be pre-arranged in advance between the UE and the base station, or may be received via RRC signaling (a case where the UE is in a step of performing initial access to the base station, or in a RRC step). Alternatively, the codebook for Multi-dimensional Modulation may be received together with a UE specific codebook index via control signaling.

In step S4720, the UE performs Multi-dimensional Modulation based encoding on information bits based on the UE specific Codebook so as to generate a complex vector. The UE may generate a transmission signal by using a Multi-dimensional Modulation based encoder. As a time domain signal, the transmission signal may be configured of a complex modulation symbol and a zero symbol according to the UE specific Codebook. For example, the complex vector may be configured of four complex modulation symbols based on a coding bit having the information bits channel-coded therein.

In step S4730, the UE generates a frequency signal by performing Discrete Fourier Transform (DFT) based on the UE specific Codebook for the complex vector. More specifically, the UE may convert the previously generated transmission signal to a frequency domain signal by performing DFT.

In step S4740, the UE transmits uplink data, which is generated by performing Inverse Fast Fourier Transform (IFFT) on the frequency signal. The UE may perform IFFT once again on the frequency domain signal, so as to convert the frequency domain signal to a time domain signal, and may then transmit the converted time domain signal through a channel.

Additionally, a method for designing and determining a UE specific codebook that is used in a Multi-dimensional Modulation based Non-orthogonal Multiple Access (NoMA) scheme may be proposed.

According to a first embodiment, the UE specific codebook may be determined as one of first to sixth codebooks. More specifically, the first Codebook may be defined as shown below.

$$\begin{bmatrix} 0 & 0 & 0 & 0 \\ 1 & 1 & -1 & -1 \\ 0 & 0 & 0 & 0 \\ 1 & -1 & 1 & -1 \end{bmatrix} * P_{no}$$

The second Codebook may be defined as shown below.

$$\begin{bmatrix} 1 & 1 & -1 & -1 \\ 0 & 0 & 0 & 0 \\ 1 & -1 & 1 & -1 \\ 0 & 0 & 0 & 0 \end{bmatrix} * P_{no}$$

The third Codebook may be defined as shown below.

$$\begin{bmatrix} 1*e^{j*\frac{1}{3}\pi} & 1*e^{j*\frac{1}{3}\pi} & -1*e^{j*\frac{1}{3}\pi} & -1*e^{j*\frac{1}{3}\pi} \\ 1*e^{j*\frac{1}{3}\pi} & -1*e^{j*\frac{1}{3}\pi} & 1*e^{j*\frac{1}{3}\pi} & -1*e^{j*\frac{1}{3}\pi} \\ 0 & 0 & 0 & 0 \\ 0 & 0 & 0 & 0 \end{bmatrix} * P_{no}$$

The fourth Codebook may be defined as shown below.

$$\begin{bmatrix} 0 & 0 & 0 & 0 \\ 0 & 0 & 0 & 0 \\ 1*e^{j*\frac{1}{3}\pi} & 1*e^{j*\frac{1}{3}\pi} & -1*e^{j*\frac{1}{3}\pi} & -1*e^{j*\frac{1}{3}\pi} \\ 1*e^{j*\frac{1}{3}\pi} & -1*e^{j*\frac{1}{3}\pi} & 1*e^{j*\frac{1}{3}\pi} & -1*e^{j*\frac{1}{3}\pi} \end{bmatrix} * P_{no}$$

The fifth Codebook may be defined as shown below.

$$\begin{bmatrix} 1*e^{j*\frac{2}{3}\pi} & 1*e^{j*\frac{2}{3}\pi} & -1*e^{j*\frac{2}{3}\pi} & -1*e^{j*\frac{2}{3}\pi} \\ 0 & 0 & 0 & 0 \\ 0 & 0 & 0 & 0 \\ 1*e^{j*\frac{2}{3}\pi} & -1*e^{j*\frac{2}{3}\pi} & 1*e^{j*\frac{2}{3}\pi} & -1*e^{j*\frac{2}{3}\pi} \end{bmatrix} * P_{no}$$

The sixth Codebook may be defined as shown below.

$$\begin{bmatrix} 0 & 0 & 0 & 0 \\ 1*e^{j*\frac{2}{3}\pi} & 1*e^{j*\frac{2}{3}\pi} & -1*e^{j*\frac{2}{3}\pi} & -1*e^{j*\frac{2}{3}\pi} \\ 1*e^{j*\frac{2}{3}\pi} & -1*e^{j*\frac{2}{3}\pi} & 1*e^{j*\frac{2}{3}\pi} & -1*e^{j*\frac{2}{3}\pi} \\ 0 & 0 & 0 & 0 \end{bmatrix} * P_{no}$$

According to the first embodiment, a size of each coefficient within a mother constellation being used for configuring the first to sixth codebooks may be equal. Thus, a maximum peak value in view of the Time Sample is more decreased as compared to when the size of each coefficient is not equal, which may be more advantageous in the aspect of PAPR. This may be a method that optimizes the above-described Rule 6.

At this point, the mother constellation may be a row vector of the first to sixth codebooks having a non-zero coefficient. More specifically, according to the first embodiment, a size of configuration elements in the row vector of the first to sixth codebooks may be equal. For example, it may be known that a size of each configuration element (each coefficient->1, 1, −1, −1) of a second row vector on the first codebook is all equal to 1.

Additionally, a codeword of the first to sixth codebook may be a column vector of the first to sixth codebooks. At this point, among the codewords, some codewords may include non-zero coefficients having inverted phases and being adjacent. More specifically, not all of the codewords may include non-zero coefficients having inverted phases and being adjacent. This may be a method mitigating the above-described Rule 7.

For example, since adjacent non-zero coefficients of a second column vector and a third column vector from a left-side of the first codebook are 1 and −1, this may indicate that the coefficients have a phase inversion relationship. However, since adjacent non-zero coefficients of a first column vector and a fourth column vector from a left-side of the first codebook are 1 and 1, or −1 and −1, this may indicate that the coefficients have the same phase.

According to a second embodiment, the UE specific codebook may be determined as one of first to sixth codebooks. More specifically, the first Codebook may be defined as shown below.

$$\begin{bmatrix} 0 & 0 & 0 & 0 \\ 1 & i & -i & -1 \\ 0 & 0 & 0 & 0 \\ -1 & -i & i & 1 \end{bmatrix} * P_{no}$$

The second Codebook may be defined as shown below.

$$\begin{bmatrix} 1 & i & -i & -1 \\ 0 & 0 & 0 & 0 \\ -1 & -i & i & 1 \\ 0 & 0 & 0 & 0 \end{bmatrix} * P_{no}$$

The third Codebook may be defined as shown below.

$$\begin{bmatrix} 1*e^{j*\frac{1}{3}\pi} & i*e^{j*\frac{1}{3}\pi} & -i*e^{j*\frac{1}{3}\pi} & -1*e^{j*\frac{1}{3}\pi} \\ -1*e^{j*\frac{1}{3}\pi} & -i*e^{j*\frac{1}{3}\pi} & i*e^{j*\frac{1}{3}\pi} & 1*e^{j*\frac{1}{3}\pi} \\ 0 & 0 & 0 & 0 \\ 0 & 0 & 0 & 0 \end{bmatrix} * P_{no}$$

The fourth Codebook may be defined as shown below.

$$\begin{bmatrix} 0 & 0 & 0 & 0 \\ 0 & 0 & 0 & 0 \\ 1*e^{j*\frac{1}{3}\pi} & i*e^{j*\frac{1}{3}\pi} & -i*e^{j*\frac{1}{3}\pi} & -1*e^{j*\frac{1}{3}\pi} \\ -1*e^{j*\frac{1}{3}\pi} & -i*e^{j*\frac{1}{3}\pi} & i*e^{j*\frac{1}{3}\pi} & 1*e^{j*\frac{1}{3}\pi} \end{bmatrix} * P_{no}$$

The fifth Codebook may be defined as shown below.

$$\begin{bmatrix} 1*e^{j*\frac{2}{3}\pi} & i*e^{j*\frac{2}{3}\pi} & -i*e^{j*\frac{2}{3}\pi} & -1*e^{j*\frac{2}{3}\pi} \\ 0 & 0 & 0 & 0 \\ 0 & 0 & 0 & 0 \\ -1*e^{j*\frac{2}{3}\pi} & -i*e^{j*\frac{2}{3}\pi} & i*e^{j*\frac{2}{3}\pi} & 1*e^{j*\frac{2}{3}\pi} \end{bmatrix} *P_{no}$$

The sixth Codebook may be defined as shown below.

$$\begin{bmatrix} 0 & 0 & 0 & 0 \\ 1*e^{j*\frac{2}{3}\pi} & i*e^{j*\frac{2}{3}\pi} & -i*e^{j*\frac{2}{3}\pi} & -1*e^{j*\frac{2}{3}\pi} \\ -1*e^{j*\frac{2}{3}\pi} & -i*e^{j*\frac{2}{3}\pi} & i*e^{j*\frac{2}{3}\pi} & 1*e^{j*\frac{2}{3}\pi} \\ 0 & 0 & 0 & 0 \end{bmatrix} *P_{no}$$

According to the second embodiment, a size of each coefficient within a mother constellation being used for configuring the first to sixth codebooks may be equal. Thus, a maximum peak value in view of the Time Sample is more decreased as compared to when the size of each coefficient is not equal, which may be more advantageous in the aspect of PAPR. This may be a method that optimizes the above-described Rule 6.

At this point, the mother constellation may be a row vector of the first to sixth codebooks having a non-zero coefficient. More specifically, according to the first embodiment, a size of configuration elements in the row vector of the first to sixth codebooks may be equal. For example, it may be known that a size of each configuration element (each coefficient->1, i, -i, -1) of a second row vector on the first codebook is all equal to 1.

Additionally, a codeword of the first to sixth codebook may be a column vector of the first to sixth codebooks. At this point, the codeword may include non-zero coefficients having inverted phases and being adjacent. More specifically, all of the codewords may include non-zero coefficients having inverted phases and being adjacent. This may be a method optimizing the above-described Rule 7.

For example, since adjacent non-zero coefficients of each column vector of the first codebook are 1 and -1, i and -i, -i and i, -1 and 1, this may indicate that the coefficients have a phase inversion relationship.

According to a third embodiment, the UE specific codebook may be determined as one of first to sixth codebooks. More specifically, the first Codebook may be defined as shown below.

$$\begin{bmatrix} 0 & 0 & 0 & 0 \\ 1 & i & -i & -1 \\ 0 & 0 & 0 & 0 \\ i & -1 & 1 & -i \end{bmatrix} *P_{no}$$

The second Codebook may be defined as shown below.

$$\begin{bmatrix} 1 & i & -i & -1 \\ 0 & 0 & 0 & 0 \\ i & -1 & 1 & -i \\ 0 & 0 & 0 & 0 \end{bmatrix} *P_{no}$$

The third Codebook may be defined as shown below.

$$\begin{bmatrix} 1*e^{j*\frac{1}{3}\pi} & i*e^{j*\frac{1}{3}\pi} & -i*e^{j*\frac{1}{3}\pi} & -1*e^{j*\frac{1}{3}\pi} \\ i*e^{j*\frac{1}{3}\pi} & -1*e^{j*\frac{1}{3}\pi} & 1*e^{j*\frac{1}{3}\pi} & -i*e^{j*\frac{1}{3}\pi} \\ 0 & 0 & 0 & 0 \\ 0 & 0 & 0 & 0 \end{bmatrix} *P_{no}$$

The fourth Codebook may be defined as shown below.

$$\begin{bmatrix} 0 & 0 & 0 & 0 \\ 0 & 0 & 0 & 0 \\ 1*e^{j*\frac{1}{3}\pi} & i*e^{j*\frac{1}{3}\pi} & -i*e^{j*\frac{1}{3}\pi} & -1*e^{j*\frac{1}{3}\pi} \\ i*e^{j*\frac{1}{3}\pi} & -1*e^{j*\frac{1}{3}\pi} & 1*e^{j*\frac{1}{3}\pi} & -i*e^{j*\frac{1}{3}\pi} \end{bmatrix} *P_{no}$$

The fifth Codebook may be defined as shown below.

$$\begin{bmatrix} 1*e^{j*\frac{2}{3}\pi} & i*e^{j*\frac{2}{3}\pi} & -i*e^{j*\frac{2}{3}\pi} & -1*e^{j*\frac{2}{3}\pi} \\ 0 & 0 & 0 & 0 \\ 0 & 0 & 0 & 0 \\ i*e^{j*\frac{2}{3}\pi} & -1*e^{j*\frac{2}{3}\pi} & 1*e^{j*\frac{2}{3}\pi} & -i*e^{j*\frac{2}{3}\pi} \end{bmatrix} *P_{no}$$

The sixth Codebook may be defined as shown below.

$$\begin{bmatrix} 0 & 0 & 0 & 0 \\ 1*e^{j*\frac{2}{3}\pi} & i*e^{j*\frac{2}{3}\pi} & -i*e^{j*\frac{2}{3}\pi} & -1*e^{j*\frac{2}{3}\pi} \\ i*e^{j*\frac{2}{3}\pi} & -1*e^{j*\frac{2}{3}\pi} & 1*e^{j*\frac{2}{3}\pi} & -i*e^{j*\frac{2}{3}\pi} \\ 0 & 0 & 0 & 0 \end{bmatrix} *P_{no}$$

According to the third embodiment, a size of each coefficient within a mother constellation being used for configuring the first to sixth codebooks may be equal. Thus, a maximum peak value in view of the Time Sample is more decreased as compared to when the size of each coefficient is not equal, which may be more advantageous in the aspect of PAPR. This may be a method that optimizes the above-described Rule 6.

At this point, the mother constellation may be a row vector of the first to sixth codebooks having a non-zero coefficient. More specifically, according to the first embodiment, a size of configuration elements in the row vector of the first to sixth codebooks may be equal. For example, it may be known that a size of each configuration element (each coefficient->1, i, -i, -1) of a second row vector on the first codebook is all equal to 1.

Additionally, a codeword of the first to sixth codebook may be a column vector of the first to sixth codebooks. At this point, the codeword may include non-zero coefficients having phases rotated to 90 degrees and being adjacent. More specifically, all of the codewords may include non-zero coefficients having phases rotated to 90 degrees and being adjacent. This may be a method mitigating the above-described Rule 7.

For example, since adjacent non-zero coefficients of each column vector are 1 and i, i and -1, -i and 1, -1 and -i, this may indicate that the coefficients have a relationship wherein the phase is rotated to 90 degrees.

The $P_{no}$ is an M×M matrix that is normalized for power restriction and may be defined as shown below.

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix}.$$

The $P_{no,m}$, may be defined as shown below.
$P_{no,m}=(1/|vec\ m|) \times \sqrt{K}$, for m=1, . . . , M, where K=4, M=4.

Additionally, in case the UE is located on a cell-edge, the UE specific codebook may be determined as a Codebook having a low Peak-to-Average Power Ratio (PAPR) value. In case the UE is located on a cell-center, the UE specific codebook may be determined as a Codebook having a high PAPR value. A geometry within the cell of the UEs may be various. By considering the characteristic of the PAPR being more important when uplink communication is performed at a cell-edge than when performing uplink communication at a cell-center, a codebook that is optimized for the PAPR may be determined.

Additionally, the DFT may be performed in a case where the DFT block of the UE is active. The DFT block of the UE may be active or in-active based on a UE specific codebook that is included in a codebook being pre-defined for the multi-dimensional modulation. More specifically, the DFT operation and the codebook index may be tied.

Figure 48:
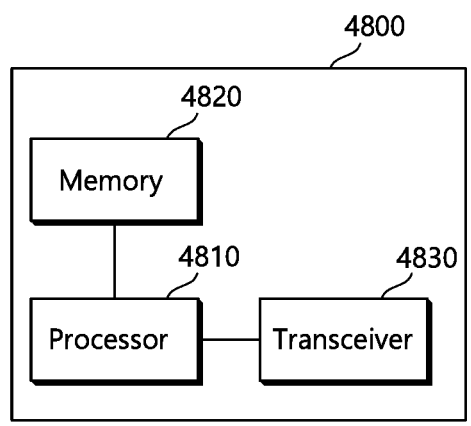
FIG. 48 is a block diagram showing an apparatus for wireless communication for implementing an embodiment of the present specification.

FIG. 48 is a block diagram showing a wireless device to which an exemplary embodiment of this specification can be applied.

Referring to FIG. 48, as a station (STA) that can implement the above-described exemplary embodiment, the wireless device may operate as an AP or a non-AP STA. Additionally, the wireless device may correspond to a user, or the user may correspond to a transmitting device transmitting a signal to the receiving device.

As shown in the drawing, the wireless device of FIG. 48 includes a processor (4810), a memory (4820), and a transceiver (4830). Each of the processor (4810), memory (4820), and transceiver (4830) shown in FIG. 48 may be implemented as a separate chip, or at least two or more blocks/functions may be implemented through a single chip.

The transceiver (4830) is a device including a transmitter and a receiver, and when a specific operation is performed, the transceiver (4830) may perform the operations of any one of the transmitter and the receiver, or the transceiver may perform the operations of both the transmitter and the receiver. The transceiver (4830) may include one or more antennas transmitting and/or receiving radio signals. Additionally, the transceiver (4830) may include an amplifier for amplifying a reception signal and/or a transmission signal and a band-pass filter for performing transmission over a specific frequency band.

The processor (4810) may implement functions, processes, and/or methods proposed in this specification. For example, the processor (4810) may perform operations according to the above0described exemplary embodiment of this specification. More specifically, the processor (4810) may perform the operations disclosed in the exemplary embodiment shown in FIG. 1 to FIG. 47.

The processor (4810) may include an application-specific integrated circuit (ASIC), a separate chipset, a logic circuit, a data processing unit, and/or a converter inter-converting baseband signals and radio signals. The memory (4820) may include a read-only memory (ROM), a random access memory (RAM), a flash memory, a memory card, a storage medium, and/or other equivalent storage devices.

Figure 49:
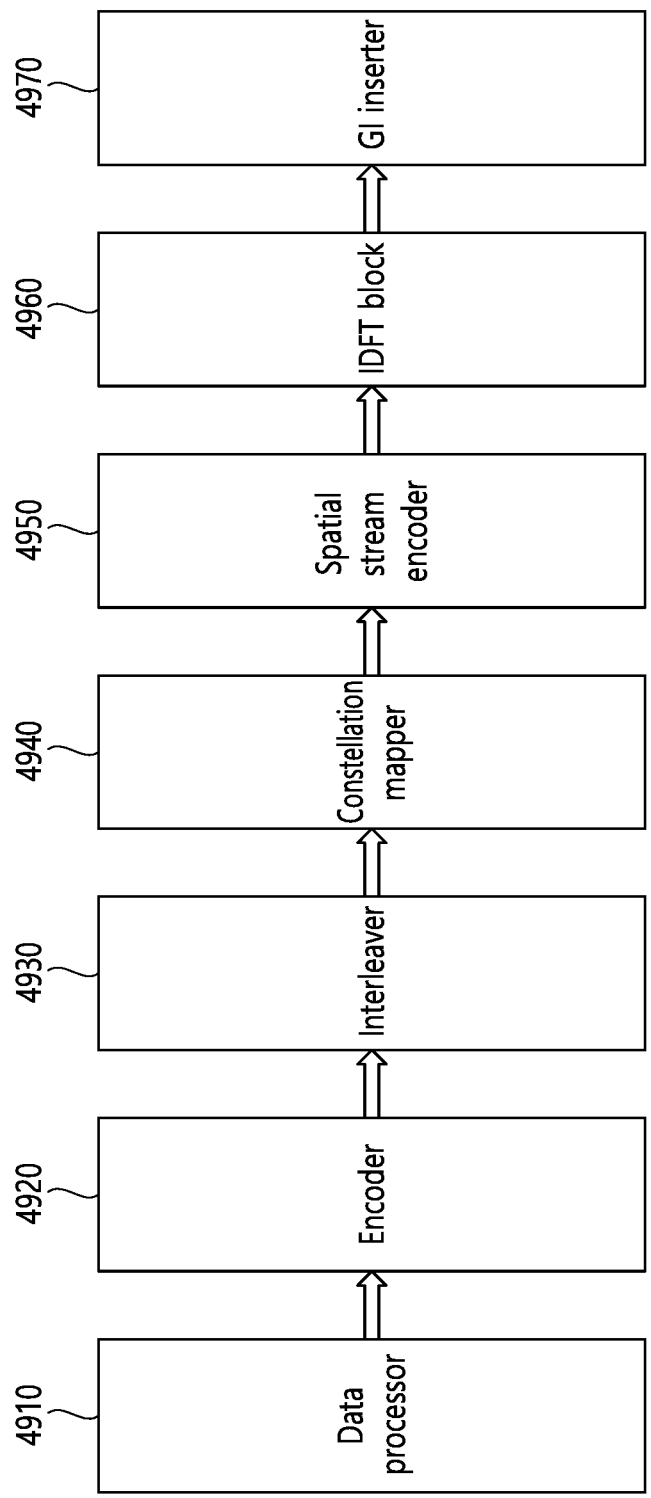
FIG. 49 is a block diagram showing an example of a device being included in a processor.

FIG. 49 is a block diagram showing an example of a device being included in a processor. For simplicity in the description, although an example of FIG. 49 is described based on a block for a transmission signal, it will be apparent that a reception signal may be processed by using the corresponding block.

A data processing unit (4910) shown in FIG. 49 generates transmission data (control data and/or user data) corresponding to a transmission signal. An output of the data processing unit (4910) may be inputted to an encoder (4920). The encoder (4920) may perform coding by using binary convolutional code (BCC) or low-density parity-check (LDPC) coding schemes. At least one encoder (4920) may be included herein, and the number of encoders (4920) may be determined based on diverse information (e.g., number of data streams).

An output of the encoder (4920) may be inputted to an interleaver (4930). The interleaver (4930) may perform operations of distributing consecutive bit signals within a radio resource (e.g., time and/or frequency) in order to prevent any burst error, which is caused by fading, and so on. At least one interleaver (4930) may be included herein, and the number of interleavers (4930) may be determined based on diverse information (e.g., number of spatial streams).

An output of the interleaver (4930) may be inputted to a constellation mapper (4940). The constellation mapper (4940) may perform constellation mapping, such as biphase shift keying (BPSK), Quadrature Phase Shift Keying (QPSK), n-quadrature amplitude modulation (QAM), and so on.

An output of the constellation mapper (4940) may be inputted to a spatial stream encoder (4950). The spatial stream encoder (4950) performs data processing in order to transmit a transmission signal via at least one spatial stream. For example, the spatial stream encoder (4950) may perform at least one of space-time block coding (STBC), Cyclic shift diversity (CSD) insertion, and spatial mapping on the transmission signal.

An output of the spatial stream encoder (4950) may be inputted to an IDFT (4960) block. The IDFT (4960) block may perform inverse discrete Fourier transform (IDFT) or inverse Fast Fourier transform (IFFT).

An output of the IDFT (4960) block is inputted to a Guard Interval (GI) inserter (4970), and an output of the GI inserter (4970) is inputted to the transceiver (4830) of FIG. 48.

What is claimed is:

1. A method for transmitting uplink data based on Non-orthogonal Multiple Access (NoMA) in a wireless communication system, comprising:
   receiving, by a user equipment (UE), information on a UE specific codebook from a base station, wherein the UE specific codebook is included in a pre-defined codebook for Multi-dimensional Modulation;
   generating, by the UE, a complex vector by performing Multi-dimensional Modulation based encoding on information bits based on the UE specific codebook;
   generating, by the UE, a frequency signal by performing Discrete Fourier Transform (DFT) on the complex vector based on the UE specific codebook; and transmitting, by the UE, uplink data being generated by performing Inverse Fast Fourier Transform (IFFT) on the frequency signal, wherein the UE specific codebook is determined as one of first to sixth codebooks, wherein the first codebook is defined as shown below:

$$\begin{bmatrix} 0 & 0 & 0 & 0 \\ 1 & 1 & -1 & -1 \\ 0 & 0 & 0 & 0 \\ 1 & -1 & 1 & -1 \end{bmatrix} * P_{no},$$

wherein the second codebook is defined as shown below:

$$\begin{bmatrix} 1 & 1 & -1 & -1 \\ 0 & 0 & 0 & 0 \\ 1 & -1 & 1 & -1 \\ 0 & 0 & 0 & 0 \end{bmatrix} * P_{no},$$

wherein the third codebook is defined as shown below:

$$\begin{bmatrix} 1*e^{j*\frac{1}{3}\pi} & 1*e^{j*\frac{1}{3}\pi} & -1*e^{j*\frac{1}{3}\pi} & -1*e^{j*\frac{1}{3}\pi} \\ 1*e^{j*\frac{1}{3}\pi} & -1*e^{j*\frac{1}{3}\pi} & 1*e^{j*\frac{1}{3}\pi} & -1*e^{j*\frac{1}{3}\pi} \\ 0 & 0 & 0 & 0 \\ 0 & 0 & 0 & 0 \end{bmatrix} * P_{no},$$

wherein the fourth codebook is defined as shown below:

$$\begin{bmatrix} 0 & 0 & 0 & 0 \\ 0 & 0 & 0 & 0 \\ 1*e^{j*\frac{1}{3}\pi} & 1*e^{j*\frac{1}{3}\pi} & -1*e^{j*\frac{1}{3}\pi} & -1*e^{j*\frac{1}{3}\pi} \\ 1*e^{j*\frac{1}{3}\pi} & -1*e^{j*\frac{1}{3}\pi} & 1*e^{j*\frac{1}{3}\pi} & -1*e^{j*\frac{1}{3}\pi} \end{bmatrix} * P_{no},$$

wherein the fifth codebook is defined as shown below:

$$\begin{bmatrix} 1*e^{j*\frac{2}{3}\pi} & 1*e^{j*\frac{2}{3}\pi} & -1*e^{j*\frac{2}{3}\pi} & -1*e^{j*\frac{2}{3}\pi} \\ 0 & 0 & 0 & 0 \\ 0 & 0 & 0 & 0 \\ 1*e^{j*\frac{2}{3}\pi} & -1*e^{j*\frac{2}{3}\pi} & 1*e^{j*\frac{2}{3}\pi} & -1*e^{j*\frac{2}{3}\pi} \end{bmatrix} * P_{no},$$

wherein the sixth codebook is defined as shown below:

$$\begin{bmatrix} 0 & 0 & 0 & 0 \\ 1*e^{j*\frac{2}{3}\pi} & 1*e^{j*\frac{2}{3}\pi} & -1*e^{j*\frac{2}{3}\pi} & -1*e^{j*\frac{2}{3}\pi} \\ 1*e^{j*\frac{2}{3}\pi} & -1*e^{j*\frac{2}{3}\pi} & 1*e^{j*\frac{2}{3}\pi} & -1*e^{j*\frac{2}{3}\pi} \\ 0 & 0 & 0 & 0 \end{bmatrix} * P_{no},$$

wherein the $P_{no}$ is a M×M matrix being normalized for power limitation and defined as shown below:

$$P_{no} = \begin{bmatrix} P_{no,1} & l & 0 & 0 & 0 \\ 0 & P_{no,2} & 0 & 0 \\ 0 & 0 & P_{no,3} & 0 \\ 0 & 0 & 0 & P_{no,4} \end{bmatrix},$$

wherein a size of each coefficient is equal in a mother constellation being used for configuring the first to sixth codebooks, and wherein the mother constellation is a row vector of the first to sixth codebooks having non-zero coefficients, and wherein the $P_{no,m}$ is defined as shown below:
$P_{no,m} = (1/|\text{vec } m|) \times \sqrt{K}$, for m=1, . . . , M, where K=4, M=4.

2. The method of claim 1, wherein a codeword of the first to sixth codebooks is a column vector of the first to sixth codebooks, and wherein, among the codewords, part of the codewords include non-zero coefficients having inverted phases and being adjacent.

3. The method of claim 1, wherein, in case the UE is located on a cell-edge, the UE specific codebook is determined as a codebook having a low Peak-to-Average Power Ratio (PAPR) value, and wherein, in case the UE is located on a cell-center, the UE specific codebook is determined as a codebook having a high PAPR value.

4. The method of claim 1, wherein the DFT is performed in a case where a DFT block of the UE is active, and wherein the DFT block of the UE is active or in-active based on a UE specific codebook being included in a codebook being pre-defined for the Multi-dimensional Modulation.

5. A user equipment (UE) for transmitting uplink data based on Non-orthogonal Multiple Access (NoMA) in a wireless communication system, comprising:

a transceiver transmitting and receiving radio signals; and
a processor being operatively connected to the transceiver, wherein the processor is configured:

to receive information on a UE specific codebook from a base station, wherein the UE specific codebook is included in a pre-defined codebook for Multi-dimensional Modulation, to generate a complex vector by performing Multi-dimensional Modulation based encoding on information bits based on the UE specific codebook, to generate a frequency signal by performing Discrete Fourier Transform (DFT) on the complex vector based on the UE specific codebook, and to transmit uplink data being generated by performing Inverse Fast Fourier Transform (IFFT) on the frequency signal, wherein the UE specific codebook is determined as one of first to sixth codebooks, wherein the first codebook is defined as shown below:

$$\begin{bmatrix} 0 & 0 & 0 & 0 \\ 1 & 1 & -1 & -1 \\ 0 & 0 & 0 & 0 \\ 1 & -1 & 1 & -1 \end{bmatrix} * P_{no},$$

wherein the second codebook is defined as shown below:

$$\begin{bmatrix} 1 & 1 & -1 & -1 \\ 0 & 0 & 0 & 0 \\ 1 & -1 & 1 & -1 \\ 0 & 0 & 0 & 0 \end{bmatrix} * P_{no},$$

wherein the third codebook is defined as shown below:

$$\begin{bmatrix} 1*e^{j*\frac{1}{3}\pi} & 1*e^{j*\frac{1}{3}\pi} & -1*e^{j*\frac{1}{3}\pi} & -1*e^{j*\frac{1}{3}\pi} \\ 1*e^{j*\frac{1}{3}\pi} & -1*e^{j*\frac{1}{3}\pi} & 1*e^{j*\frac{1}{3}\pi} & -1*e^{j*\frac{1}{3}\pi} \\ 0 & 0 & 0 & 0 \\ 0 & 0 & 0 & 0 \end{bmatrix} * P_{no},$$

wherein the fourth codebook is defined as shown below:

$$\begin{bmatrix} 0 & 0 & 0 & 0 \\ 0 & 0 & 0 & 0 \\ 1*e^{j*\frac{1}{3}\pi} & 1*e^{j*\frac{1}{3}\pi} & -1*e^{j*\frac{1}{3}\pi} & -1*e^{j*\frac{1}{3}\pi} \\ 1*e^{j*\frac{1}{3}\pi} & -1*e^{j*\frac{1}{3}\pi} & 1*e^{j*\frac{1}{3}\pi} & -1*e^{j*\frac{1}{3}\pi} \end{bmatrix} * P_{no},$$

wherein the fifth codebook is defined as shown below:

$$\begin{bmatrix} 1*e^{j*\frac{2}{3}\pi} & 1*e^{j*\frac{2}{3}\pi} & -1*e^{j*\frac{2}{3}\pi} & -1*e^{j*\frac{2}{3}\pi} \\ 0 & 0 & 0 & 0 \\ 0 & 0 & 0 & 0 \\ 1*e^{j*\frac{2}{3}\pi} & -1*e^{j*\frac{2}{3}\pi} & 1*e^{j*\frac{2}{3}\pi} & -1*e^{j*\frac{2}{3}\pi} \end{bmatrix} * P_{no},$$

wherein the sixth codebook is defined as shown below:

$$\begin{bmatrix} 0 & 0 & 0 & 0 \\ 1*e^{j*\frac{2}{3}\pi} & 1*e^{j*\frac{2}{3}\pi} & -1*e^{j*\frac{2}{3}\pi} & -1*e^{j*\frac{2}{3}\pi} \\ 1*e^{j*\frac{2}{3}\pi} & -1*e^{j*\frac{2}{3}\pi} & 1*e^{j*\frac{2}{3}\pi} & -1*e^{j*\frac{2}{3}\pi} \\ 0 & 0 & 0 & 0 \end{bmatrix} * P_{no},$$

wherein the $P_{no}$ is a M×M matrix being normalized for power limitation and defined as shown below:

$$P_{no} = \begin{bmatrix} P_{no,1} & 0 & 0 & 0 \\ 0 & P_{no,2} & 0 & 0 \\ 0 & 0 & P_{no,3} & 0 \\ 0 & 0 & 0 & P_{no,4} \end{bmatrix},$$

wherein a size of each coefficient is equal in a mother constellation being used for configuring the first to sixth codebooks, and wherein the mother constellation is a row vector of the first to sixth codebooks having non-zero coefficients, and wherein the $P_{no,m}$ is defined as shown below:

$P_{no,m} = (1/|\text{vec } m|) \times \sqrt{K}$, for m=1, ..., M, where K=4, M=4.

* * * * *